(12) United States Patent
Lee

(10) Patent No.: US 7,542,788 B2
(45) Date of Patent: Jun. 2, 2009

(54) SLIDING MECHANISM APPARATUS AND APPLIANCE INTEGRATED WITH THE SAME

(75) Inventor: Han Sang Lee, 102-103, Gyeongnam Apt., 967, Dogok-dong, Gangnam-gu, Seoul (KR) 135-270

(73) Assignees: P & Tel Inc. (KR); Han Sang Lee (KR)

( * ) Notice: Subject to any disclaimer, the term of this patent is extended or adjusted under 35 U.S.C. 154(b) by 261 days.

(21) Appl. No.: 10/589,010

(22) PCT Filed: Feb. 11, 2005

(86) PCT No.: PCT/KR2005/000389

§ 371 (c)(1),
(2), (4) Date: Aug. 10, 2006

(87) PCT Pub. No.: WO2005/091515

PCT Pub. Date: Sep. 29, 2005

(65) Prior Publication Data

US 2007/0091555 A1    Apr. 26, 2007

(30) Foreign Application Priority Data

| Feb. 10, 2004 | (KR) | .............. 10-2004-0008663 |
| Apr. 9, 2004 | (KR) | .............. 10-2004-0024432 |
| Oct. 1, 2004 | (KR) | .............. 10-2004-0078473 |
| Dec. 2, 2004 | (KR) | .............. 10-2004-0100583 |

(51) Int. Cl.
H04M 1/00        (2006.01)

(52) U.S. Cl. .............. 455/575.4; 455/575.1; 455/575.8; 455/90.3

(58) Field of Classification Search .............. 455/575.4, 455/575.8, 325, 556.1, 550.1, 90.1, 575.1; 369/282, 291, 253, 44.16, 75.5; 70/357, 70/367, 406, 381, 491

See application file for complete search history.

(56) References Cited

U.S. PATENT DOCUMENTS 4,866,551 A * 9/1989 Kishimoto et al. ....... 360/96.51

(Continued)

FOREIGN PATENT DOCUMENTS

| JP | 10-042022 | 2/1998 |
| KR | 200319967 | 7/2003 |
| KR | 2003-0090549 A | 11/2003 |
| KR | 10-2004-0008240 | 1/2004 |

(Continued)

*Primary Examiner*—Tan Trinh
(74) *Attorney, Agent, or Firm*—Ostrolenk, Faber, Gerb & Soffen, LLP

(57) ABSTRACT

Disclosed is a sliding mechanism apparatus used for slidably opening and closing a slider-type cellular phone. A guide member and a slider member are engaged with each other so as to enable to slide relative to each other. The end of one arm of a first torsion spring is connected to the slider member near the left edge thereof. The end of the other arm thereof is coupled to the right half area of the guide member. The end of one arm of a second torsion spring is connected to the slider member near the right edge thereof. The end of the other arm thereof is coupled to the left half area of the guide member. From the expanded original state of the first and second torsion springs, if an external force is exerted on the slider member or the guide member, the torsion springs are compressed into an acute angle and then spread again by means of the elastic force thereof. In this way, the slider member can move to the lowermost position or the lowermost position. In the first and second torsion springs, the distance between the ends of two arms is larger than at least half of the width of the slider member. Therefore, the first and second torsion springs can maximally utilize the width of the guide member while turning, thereby extending the maximum travel distance of the slider member.

16 Claims, 37 Drawing Sheets

U.S. PATENT DOCUMENTS

| | | | |
|---|---|---|---|
| 6,073,027 A | 6/2000 | Norman et al. | 455/550 |
| 2003/0064688 A1* | 4/2003 | Mizuta et al. | 455/90 |
| 2004/0198437 A1* | 10/2004 | Yamamoto et al. | 455/556.1 |
| 2004/0204001 A1* | 10/2004 | Chen et al. | 455/550.1 |
| 2005/0189777 A1* | 9/2005 | Rasmussen | 296/26.01 |
| 2005/0221873 A1* | 10/2005 | Kameyama et al. | 455/575.4 |

FOREIGN PATENT DOCUMENTS

| | | |
|---|---|---|
| KR | 2004-0006977 A | 1/2004 |
| KR | 2004-0008240 A | 1/2004 |
| KR | 0338941 Y | 1/2004 |
| KR | 200362164 | 9/2004 |

* cited by examiner upwards ⟸      ⟹ downwards upwards ⇐         ⇒ downwards

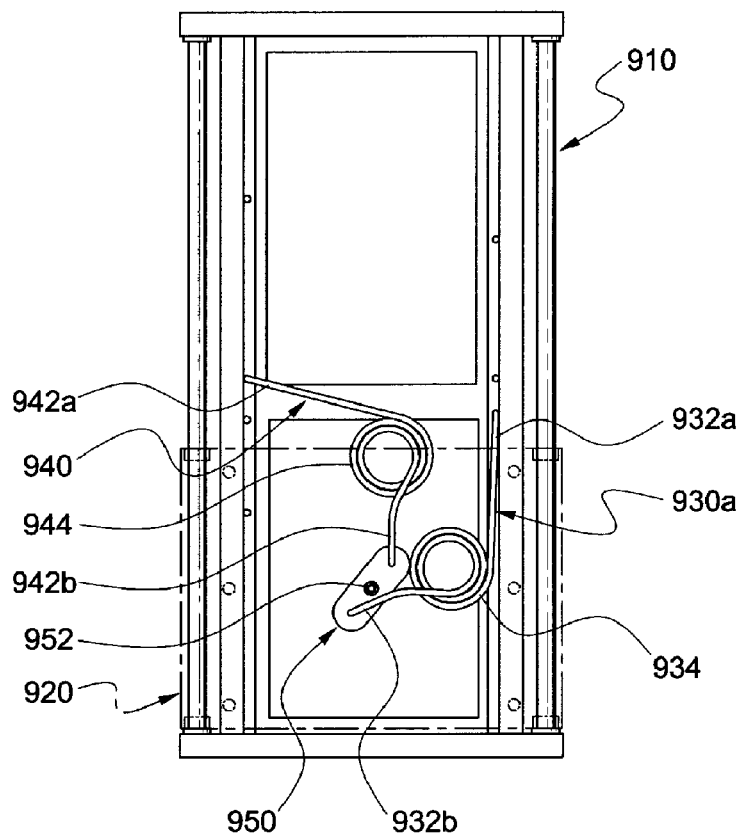
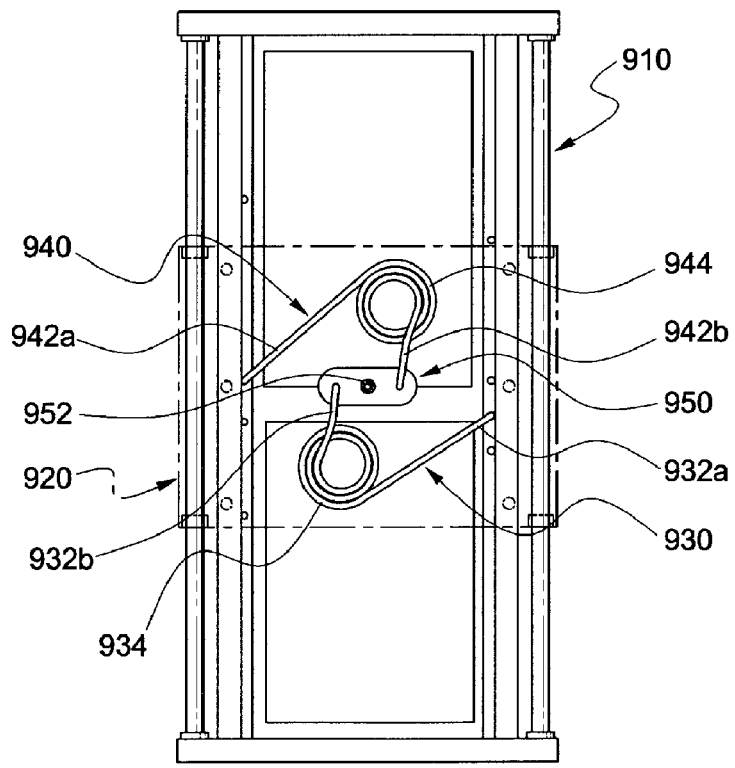

025
SLIDING MECHANISM APPARATUS AND APPLIANCE INTEGRATED WITH THE SAME

CROSS REFERENCE TO RELATED APPLICATION

The present application is a 35 U.S.C. §§ 371 national phase conversion of PCT/KR2005/000389, filed 11 Feb. 2005, which claims priority of Korean Patent Application No. 10-2004-0008663 filed 10 Feb. 2004; Korean Patent Application No. 10-2004-0024432 filed 9 Apr. 2004; Korean Patent Application No. 10-2004-0078473 filed 1 Oct. 2004; and Korean Patent Application No. 10-2004-0100583 filed 2 Dec. 2004. The PCT International Application was published in the English language.

TECHNICAL FIELD

The present invention relates to a sliding mechanism apparatus and an appliance thereof. More specifically, the invention relates to a sliding mechanism apparatus applicable to various slider-type devices such as a wireless communication terminal, in which the resilient force of a torsion spring is utilized to thereby improve the operational convenience thereof, and an appliance using such a sliding mechanism apparatus.

BACKGROUND ART

Portable communication terminals such as a cellular phone have been changing its external form or shape. For example, a flip-type, a bar-type, and a folder-type cellular phone have been known. Recently, a slider-type cellular phone has been commercialized and attracted attentions. In general, a slider-type portable terminal is comprised of a main body and a cover slidably engaged with the main body. That is, the cover opens and closes the main body while sliding upwards and downwards along the main body.

Regarding the sliding mechanism enabling such a sliding movement, also various modes have been proposed. It includes a sliding mechanism using a sliding space and a guide rail, a sliding mechanism using a rack and a pinion, an especially designed sliding mechanism using a slider structure supported by a base plate, a guide hole for guiding the slider structure and a leaf spring. For example, U.S. Pat. No. 6,073,027 discloses a sliding mechanism, where a cover including a latch, a latch catch and an actuator is slidably coupled to a housing such that the cover is opened and closed by means of a tension spring.

However, the conventional sliding mechanisms do not have any means for providing a moving force for sliding, and thus the slider cover is made to move only as much as a user pushes up or down. That is, it can travel only a short distance at a time. In addition, the main body and the cover of a cellular phone are combined with each other through a single sliding structure. Thus, the sliding structure may be easily damaged by an external impact so that the cover can be released from the main body, thereby failing to provide a good durability.

Furthermore, the above conventional sliding device is composed of a guiding base member and a slider member slidably engaged therewith. Commonly, the guiding base member is coupled to the rear face of the cover of a cellular phone and the slider member is attached to the upper portion of the front face in the main body thereof. That is, the guiding base member and the slider member are fabricated separately from the main body and the cover of a cellular phone and then combined thereto respectively using a bolt. Accordingly, the main body and the cover of the cellular phone must be provided with resting places for the guiding base and slider members and also bolt holes for connection with each other. Therefore, it leads to a complicated coupling structure, which will result in complicated molding dies, thereby consequently increasing the manufacturing cost of the sliding device and extending the assembling time therefor.

The above matters are considered as fundamental problems with the conventional sliding mechanisms. As such, there is a need to provide a novel sliding mechanism and an appliance implementing the novel mechanism, which has a more simplified structure and provides an improved assembling efficiency.

DISCLOSURE OF THE INVENTION

Technical Problem

Accordingly, the present invention has been made in order to solve the above problems in the prior art, and it is an object of the invention to provide a sliding mechanism apparatus suitable for manufacturing a miniaturized cellular phone, in which a slider member and a guide member are engaged with each other so as to perform a relative sliding, a user moves the slider member by a certain distance along the guide member and then the slider member spontaneously runs the remaining distance by the elastic force of a torsion spring, and in particular, a long moving distance can be achieved, relatively to the width of the slider member.

A second object of the invention is to provide a sliding mechanism apparatus, in which a slider member and a guide member are engaged with each other so as to perform a relative sliding, a user moves the slider member by a certain distance along the guide member and then the slider member spontaneously runs the remaining distance i.e., to the destination position by means of the elastic force of a torsion spring, and in particular, a coupling and guide structure comprised of a guide bar and a guide hole is provided, along with a guide dam and a guide rail engaged therewith, thereby avoiding an escape and distortion while sliding, and thus enabling a more firm and stable operation of the mechanism.

A third object of the invention is to provide a sliding mechanism apparatus, in which a resilient contact plate is interposed so that an electrical contact can be maintained between the slider member and the guide member while sliding relative to each other, thereby avoiding disturbance caused by electromagnetic waves.

A fourth object of the invention is to provide a sliding mechanism apparatus, in which one end of a pair of torsion springs is pivotably attached to both end of a variable link such that a dead point occurring at a balancing area of the elastic forces of the two torsion springs can be minimized to thereby prevent a halting phenomenon and extend the operable distance.

A fifth object of the invention is to provide an appliance integrated with a sliding mechanism apparatus, in which a guide rail structure and a slider structure slidably engaged with the guide rail structure are integrally formed and coupled to the main body and the cover of the device so as to correspond to each other, thereby simplifying the structure of device and improving the assembling efficiency therefor.

Technical Solution

In order to accomplish the above objects, according to one aspect of the invention, there is provided a sliding mechanism apparatus comprising: a guide member; a slider member coupled to the guide member so as to enable to slide thereon in a linear direction; a first torsion spring including a first coil wound in a circular form and two first arms extended from both ends of the first coil by a certain length, wherein the first torsion spring is disposed in a space between the slider member and the guide member, the end of one of the two first arms is connected to a first position placed near a left edge of the guide member, and the end of the other first arm is connected to a second position placed within a right half area of the slider member; and a second torsion spring including a second coil wound in a circular form and two second arms extended from both ends of the second coil by a certain length, wherein the second torsion spring is disposed in a space between the slider member and the guide member, the end of one of the two second arms is connected to a third position placed near a right edge of the guide member, and the end of the other second arm is connected to a fourth position placed within a left half area of the slider member.

In the above sliding mechanism apparatus, a distance between the first position and the second position is preferred to be substantially the same as a distance between the third position and the fourth position.

In a preferred embodiment of the sliding mechanism apparatus, the guide member formed of a first rectangular plate is provided with a first and second guide rail extended along a left and right edge on the top face of the first rectangular plate and having a height so as to allow for a free movement for the first and second torsion spring, the first and second guide rail is provided with a first and second guide rail groove extended along the outer lateral face thereof, and a first connection hole and a second connection hole are formed respectively in the first position of the first guide rail and the third position of the second guide rail. In addition, the slider member formed of a second rectangular plate is provided with a first and second rail formed along a left and right edge on the bottom face of the second rectangular plate so as to be engaged with the first and second guide rail groove respectively, and a third and fourth connection hole is formed respectively in the second and fourth position of the second rectangular plate such that a bent end portion of the first and second torsion spring is inserted respectively into the third and fourth connection hole.

In a further preferred embodiment of the sliding mechanism apparatus, the guide member is provided with a first and second guide bar extended along both lateral faces of a first rectangular plate, and a first connection hole and a second connection hole are formed in the first position and the third position placed in both edges of the first rectangular plate. In addition, the slider member is provided with a coupling hand formed in a left and right edge of a second rectangular plate so as to slidably grip the first and second guide bar, and a third and fourth connection hole is formed respectively in the second and fourth position placed in the second rectangular plate.

In the above sliding mechanism apparatus, the slider member and the guide member are provided, in the outer face thereof, with a plurality of screw holes for attaching respectively a first and second component of an appliance using a screw. On the other hand, the slider member and the guide member may constitute part of a first and second component of an appliance such that the first and second components of the appliance can be opened and closed relatively to each other in a sliding mode.

As described above, in the sliding mechanism apparatus of the invention, when no external force is exerted, the slider member remains placed in the uppermost position or the lowermost position, relative to the guide member, and the first and second torsion spring remains in its original state, i.e., spread adequately at a desired obtuse angle. At this state, if an external force is exerted on the slider member or the guide member, the two arms of the first and second torsion springs coupled to the slider member are turned and folded into an acute angle. As the external force is continued to the extent to overcome the elastic force of the first and second torsion spring, the turning angle of the first and second torsion spring becomes at least 90~180 degrees, relatively to the original state, and the torsion springs spread again into the original obtuse angle, due to the elastic force thereof. Through this course of action, the slider member travels to the lowermost position or the uppermost position. That is, when an external force is exerted to the extent to overcome the elastic force of the first and second torsion springs, the slider member comes to run from the uppermost position to the lowermost position, or vice versa.

In particular, the positions in the slider member, to which the first and second torsion spring is coupled, correspond to beyond the widthwise centerline of the guide member, as viewed from the end of one arm connected near the edge of the guide member. Therefore, the first and second torsion spring can be turned and pivoted while maximally utilizing the width of the guide member. As the result, the moving distance of the slider member, i.e., the distance between the uppermost position and the lowermost position can become extended, relatively to the width of the slider member. In this way, the sliding mechanism apparatus is applied to a slider-type cellular phone, thereby enabling the design of a shorter, smaller, thinner cellular phone.

According to another aspect of the invention, there is provided a sliding mechanism apparatus comprising: a guide member including a rectangular plate having a first and second guide dam along both longitudinal edges thereof, and a first and second guide bar installed in parallel to the first and second guide dam; a slider member coupled with the guide member so as to enable a relative linear movement with respect to each other, wherein the slider member is provided with a first and second slide-coupling hand formed to the left and right thereof, the first and second slide-coupling hand including a first and second guide hole inserted respectively into the first and second guide bar and a first and second rail engaged with the first and second guide dam provided in the left and right side so as to face each other; a first torsion spring including a first coil wound in a circular form and two first arms extended from both ends of the first coil by a certain length, wherein the first torsion spring is disposed in a space between the slider member and the guide member, the end of one of the two first arms is connected to a first position placed near a left edge of the guide member, and the end of the other first arm is connected to a second position placed within a right half area of the slider member; and a second torsion spring including a second coil wound in a circular form and two second arms extended from both ends of the second coil by a certain length, wherein the second torsion spring is disposed in a space between the slider member and the guide member, the end of one of the two second arms is connected to a third position placed near a right edge of the guide member, and the end of the other second arm is connected to a fourth position placed in the slider member.

In the above sliding mechanism apparatus, the first and second guide dam are structured in such a manner i) that the dam is protruded along both lateral edges of the rectangular plate in the form of a continuous straight line, or ii) that the dam is divided into an upper portion and a lower portion along both lateral edges of the rectangular plate such that the upper portion is protruded rearwards of the lateral face to thereby support a bottom face of the first and second slide-coupling hand and the lower portion is protruded frontward of the lateral face to thereby be inserted into the first and second rail.

In the above sliding mechanism apparatus, the first and second guide hole for the first and second guide bar to be inserted thereinto is provided with a cylinder-shape bearing in the inner wall thereof so as to allow for a smooth sliding movement of the guide bar, and the first and second guide bar each is provided with a buffer rubber at both end portions thereof such that the buffer rubber is hit with an end of the bearing when the slider member slides and hits the top face or the bottom face of the guide member, thereby alleviating sliding impact between the slider member and the guide member.

According to another aspect of the invention, there is provided a device using a sliding mechanism apparatus. The sliding mechanism apparatus includes a guide member and a slider member engaged with the guide member so as to slide linearly thereon, wherein a resilient contact plate is fixed to a certain desired area in an inner face of at least one of the guide member and the slider member, the slider member and the guide member remain in an electrical contact with each other by means of the contact plate even when in a relative sliding motion, and at least one of the guide member and the slider member is electrically connected to a reference potential point of the device.

According to another aspect of the invention, there is provided a sliding mechanism apparatus in which a slider member slides linearly on a guide member including a rectangular plate. The mechanism of the invention comprises: a first and second guide bar installed in parallel along both lateral edges of the guide member; and a first and second slide-coupling hand positioned respectively in a left and right edge of the slider member and including a first and second guide hole into which the first and second guide bar is inserted respectively so as to allow for a sliding movement of the slider member.

In the above sliding mechanism apparatus, the first and second guide bar are attached to both lateral edges of the rectangular plate in such a way to be closely contacted thereto or spaced apart therefrom, and the first and second guide hole are opened at one end thereof so as to wrap around a certain portion of the first and second guide bar.

According to another aspect of the invention, there is provided a sliding mechanism apparatus comprising: a guide member formed of a plate material having generally a rectangular shape; a slider member engaged with the guide member so as to enable a relative linear sliding movement; a variable link fixed to a central position of the slider member in such a way that the center portion of the link is rotatably fixed through a link shaft thereof, the variable link having two arms extended to the left and right from the center potion thereof by a certain length; a first torsion spring including a first coil wound in a circular form and a first fixed and first variable arm extended from both ends of the first coil by a certain length, wherein the first torsion spring is placed between the slider member and the guide member, a fixed end of the first fixed arm is connected near a right edge of one of the guide member and slider member, and a fixed end of the first variable arm is pivotably connected to the left end portion of the variable link; and a second torsion spring including a second coil wound in a circular form and a second fixed and second variable arm extended from both ends of the second coil by a certain length, wherein the second torsion spring is placed between the slider member and the guide member, a fixed end of the second fixed arm is connected to a left edge of the other one of the guide member and the slider member, and a fixed end of the second variable arm is pivotably connected to the right end portion of the variable link.

In the above sliding mechanism apparatus, the guide member and the slider member are slidably engaged in such a manner i) that the rectangular plate of the guide member is provided with a first and second guide dam at the left and right side thereof, and the slider member is provided with a first and second rail at the left and right side thereof so as to slidably engaged with the first and second guide dam; and/or ii) that the guide member is provided with a first and second guide bar installed in parallel at the left and right side of the rectangular plate, and the slider member is provided with a first and second guide hole to be inserted respectively into the first and second guide bar.

According to another aspect of the invention, there is provided a sliding mechanism apparatus comprising: a guide member formed of a plate material having generally a rectangular shape; a slider member engaged with the guide member so as to enable a relative linear sliding movement; and a cylinder-type spring disposed between the slider member and the guide member and structured such that the length thereof can be extended and retracted resiliently, wherein both ends of the cylinder-type spring are pivotably connected to the left and right side edge or the right and left side edge of the guide member and the slider member.

In the above sliding mechanism apparatus, the cylinder-type spring comprises a cylinder connected to one of the guide member and the slider member, a coil spring housed inside the cylinder, and a rod resiliently supported by the coil spring and connected to the other one of the guide member and the slider member. Alternatively, the cylinder-type spring may comprise a cylinder connected to one of the guide member and the slider member, a coil spring housed inside the cylinder, a rod resiliently supported by the coil spring, and a variable link rotatably connected to the other one of the guide member and the slider member through a link shaft positioned in the center of the variable link and pivotably connected to the rod at a position spaced apart from the link shaft in such a way as to move with the rod.

According to another aspect of the invention, there is provided a sliding mechanism apparatus comprising: a guide member formed of a plate having generally a rectangular shape; a slider member engaged with the guide member so as to enable a relative linear sliding movement; a first cylinder-type spring disposed between the slider member and the guide member and structured such that the length thereof can be extended and retracted resiliently, wherein both ends of the first cylinder-type spring are pivotably connected respectively to a first position placed near a right edge of the guide member and to a second position placed within a left half area of the slider member; and a second cylinder-type spring disposed between the slider member and the guide member and structured such that the length thereof can be extended and retracted resiliently, wherein both ends of the second cylinder-type spring are pivotably connected respectively to a third position placed near a left edge of the guide member and to a fourth position placed within a right half area of the slider member.

In the above sliding mechanism apparatus, the first and second cylinder-type spring each comprises a cylinder connected to one of the guide member and the slider member, a coil spring housed inside the cylinder, and a rod resiliently supported by the coil spring and connected to the other one of the guide member and the slider member. Alternatively, the first and second cylinder-type spring each may comprise a cylinder connected to one of the guide member and the slider member, a coil spring housed inside the cylinder, a rod resiliently supported by the coil spring, and a variable link rotatably connected to the other one of the guide member and the slider member through a link shaft positioned in the center of the variable link and pivotably connected to the rod at a position spaced apart from the link shaft in such a way as to move with the rod.

According to a further aspect of the invention, there is provided an appliance integrated with a sliding mechanism apparatus. The appliance comprises: a main body including at least one coupling hand, the coupling hand being protruded frontward and having a guide hole in a sliding direction; and a cover having a sliding space depressed in the rear face thereof so as to slidably accommodate the coupling hand of the main body, wherein the sliding space is provided with at least one guide bar, which is inserted into the guide hole of the coupling hand to thereby guide sliding of the main body.

In the above appliance, the cover is provided with a guide rail in the sliding space of the rear face thereof so as to be protruded along the sliding direction, and the main body is provided with a guide dam formed at a lateral face of the coupling hand thereof so as to be engaged with the guide rail.

In the above appliance, at least one torsion spring is disposed in the sliding space, and one end of the torsion spring is pivotably coupled to the main body and the other end thereof is pivotably coupled to the cover.

According to a further aspect of the invention, there is provided an appliance integrated with a sliding mechanism apparatus. The appliance comprises: a main body having buttons and at least one straight sliding space in a sliding direction, the sliding space being formed in either the right or left side or both sides of the front face of the main body along the peripheral area thereof, a guide bar being mounted in the sliding space along the sliding direction; and a cover having at least one coupling hand in the rear face thereof, the coupling hand being received inside the sliding space of the main body and having a guide hole formed so as to be inserted into the guide bar, which thereby is slid and guided.

In the above appliance, the sliding space is formed, in pairs, in the left and right side of the main body in such a way to be depressed so as to have a "U" shaped cross-section, and the coupling hand is formed, in pairs, at a position corresponding to the sliding space, the lateral face of the coupling hand being placed inwards of the lateral face of the cover. Alternatively, the sliding space may be formed, in pairs, in a left and right side of the main body in such a way to be depressed to have an "L" shaped cross-section and be opened to the left and right lateral face, and the coupling hand is formed, in pairs, at a position corresponding to the sliding space, the lateral face of the coupling hand being aligned with the lateral face of the cover.

According to another embodiment of the invention, there is provided a slider-type appliance having a main body and a cover to be opened and closed while sliding on the main body, wherein at least one straight sliding space is provided in a sliding direction along at least one of the left and right lateral faces of one of the main body and the cover, and a guide bar is installed in the sliding space along the sliding direction; and wherein the other one of the main body and the cover is received inside the sliding space while wrapping around a certain portion of the lateral face of the one of the main body and the cover, and at least one coupling hand is provided in the rear face thereof, the coupling hand having a guide hole formed so as to be inserted into the guide bar and slidably guided.

In the above appliance, the sliding space is formed, in pairs, in the left and right thereof in such a way to be depressed so as to have a "☐" shaped cross-section, and the coupling hand is formed, in pairs, in a position corresponding to the sliding space in such a way to enclose the pair of sliding spaces.

Advantageous Effects

As described above, according to the invention, a cellular phone having a relatively small width W can achieve a desired maximum sliding distance L, thereby enabling to meet recent design requirements for cellular phones, pursuing a shorter, smaller and thinner type.

In addition, when the upper body of the cellular phone is tried to be pushed up to the uppermost state from the lowermost state, or vice versa, a user does not need to push up the upper body all the way up to the uppermost position or the lowermost position. That is, if the user pushed up or down the slider or guide member approximately halfway the maximum travel distance L, the slider or guide member can travel the remaining distance to thereby reach the uppermost or lowermost position, by means of the resilient force of the torsion spring. Thus, an operational convenience is provided when in use.

In particular, when sliding, the first and second guide bar and the first and second guide hole are mainly cooperated with each other to move relatively to each other, and the first and second guide dam and the first and second guide rail are also cooperated with each other so as not to be deviated or distorted from the horizontal movement thereof, thereby enabling a smooth and stable sliding motion of the slider and guide members.

Furthermore, the guide bar of the guide member and the guide hole of the slider member are provided with a bearing and a buffer rubber respectively, thereby alleviating contacting impact when sliding, and reducing noise therefrom.

In addition, a resilient contact plate is interposed between the slider member and the guide member so that the electrical contact therebetween can be maintained while sliding, thereby avoiding communication disorders, which may be caused by electromagnetic waves.

In the sliding mechanism apparatus of the invention, a pair of torsion springs is provided. The end portions of a variable arm are pivotably connected to both end of a variable link, which is provided in the slider member or the guide member. Thus, a dead point, which is likely to occur at a balancing area between elastic forces of the two torsion springs, can be minimized, thereby avoiding the halting phenomenon when sliding and thus extending the operational distance thereof. In addition, the variable arms of the torsion springs are bent outwardly at a certain angle such that the space required for pivot movement of the torsion springs can be minimized, thereby providing benefits in miniaturization therefor and reducing spring fatigue.

According to the invention, the end portions of the fixed arms in the torsion springs are bent beforehand to form a latching tip, and the guide member or the slider member is provided with an elongated hole formed in a radial direction of rotation circle of the fixed arm. Then, the latching tip is inserted into the elongated hole, thereby simplifying the assembling work and not necessitating a clearance between the elongated hole and the fixed arm. Thus, when the fixed arm turns, wobbling phenomenon can be avoided and thus friction can be minimized, along with reduction in the noises and fatigue.

Furthermore, the rail in the slider member, which is slidably engaged with the guide dam in the guide member, is structured in such a manner that it is protruded so as to be engaged with the guide dam only at the front and rearward certain portions thereof, i.e. the intermediate portion of the rail is omitted. Thus, a slight distortion or bending in the guide member having an elongated rectangular plate shape does not interrupt the smooth sliding of the slider member, thereby enhancing the flexibility of the guide and coupling configuration thereof.

BRIEF DESCRIPTION OF THE DRAWINGS

Further objects and advantages of the invention can be more fully understood from the following detailed description taken in conjunction with the accompanying drawings in which:

FIGS. 30 to 32 are plan views explaining a sliding mechanism apparatus according to a ninth embodiment of the invention;

BEST MODE FOR CARRYING OUT THE INVENTION

The preferred embodiments of the invention will be hereafter described in detail with reference to the accompanying drawings.

Figure 1:
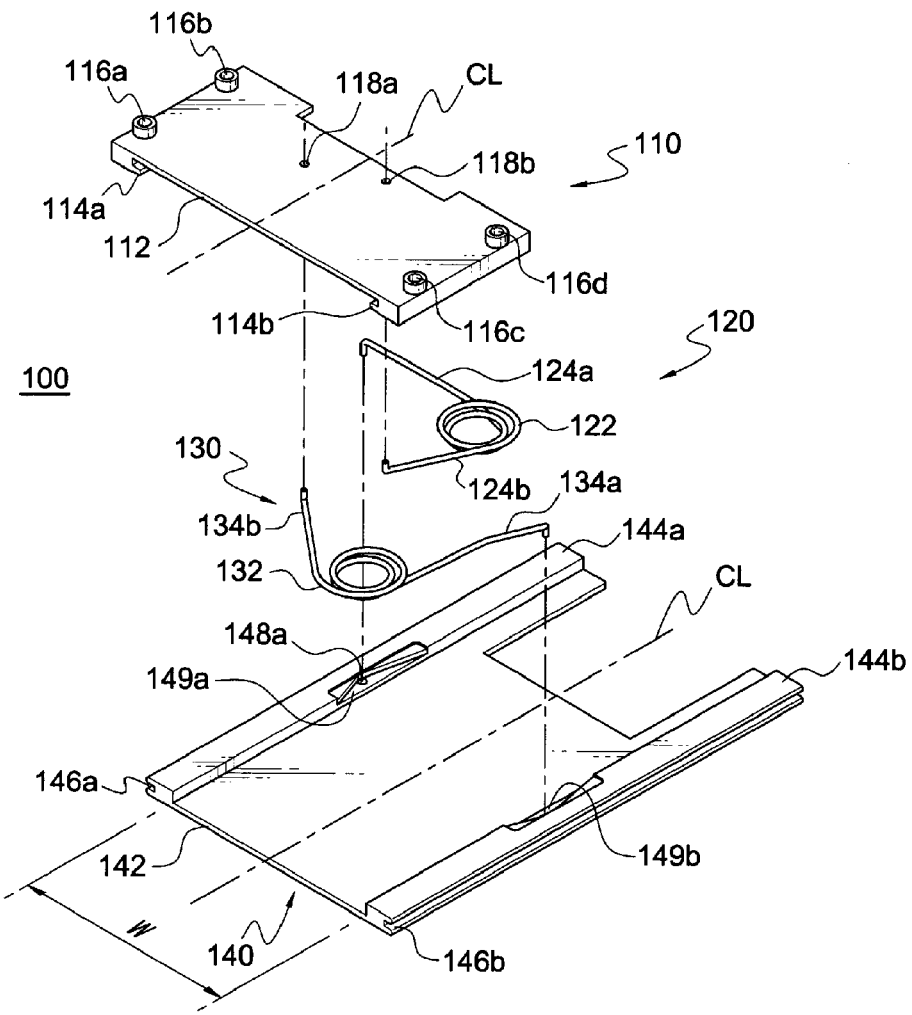
FIG. 1 is an exploded perspective view of a sliding mechanism apparatus according to a first embodiment of the invention.

FIG. 1 is an exploded perspective view of a sliding mechanism apparatus according to a first embodiment of the invention, where the sliding mechanism apparatus of the invention is denoted at 100. The sliding mechanism apparatus 100 of this embodiment includes a slider member 110, a first torsion spring 120, a second torsion spring 130, and a guide member 140.

The guide member 140 is comprised of a rectangular plate 142 and a first and second guide rails 144a and 144b elongated along both opposing parallel edges thereof. The first and second guide rails have a desired width and height respectively. In the outer face of the first guide rail 144a and the second guide rail 144b is formed respectively a first and second guide rail groove 146a, 146b in the longitudinal direction thereof. In addition, approximately in the middle of the first guide rail 144a is formed a V-shape groove 149a, and a connection hole 148a is formed at the apex of the V-shape groove 149a. Similarly, in the second guide rail 144b are formed a V-shape groove 149b and a connection hole 148a. However, the positions of the two connection holes 148a and 148b are offset by a certain length. The V-shape grooves 149a and 149b formed in front of the connection holes 148a and 148b functions not to impede the pivot motion of the first torsion spring 120 and the second torsion spring 130. In the rear face of the guide member 140 is formed a connection hole for fixing the upper body of a cellular phone (a cover: not shown), for example, a plurality of connection holes having a thread formed therein (not shown, refer to a connection hole 245 formed a guide member 249 in FIG. 7).

The slider member 110 is coupled to the guide member 140 so as to enable to slide in a linear direction. For this purpose, the slider member 110 is comprised of a rectangular plate 112 and a first and second rail 114a, 114b protruded along both opposing parallel edges thereof. The first rail 114a and the second rail 114b are slidably engaged respectively with the first guide rail groove 146a and the second guide rail groove 146b of the guide member 140. The rectangular plate 112 of the slider member 110 has two connection holes 118a and 118b formed near the central area thereof so as to be placed spaced apart from each other having a central line CL inbetween, which divides the width of the slider member into two equal portions. In the rear face of the slider member 110 are formed a plurality of connection holes 116a to 116d for fixing the lower body (a main body: not shown) of a cellular phone.

The first torsion spring 120 includes a first coil 122 wound generally in a circular form, and two arms 124a and 124b extended from both ends of the first coil 122 by a certain length respectively. The end portion of the two arms 124a and 124b are bent at a right angle. The first torsion spring 120 is to be disposed in a space formed between the slider member 110 and the guide member 140 when they are engaged with each other. In addition, in the first torsion spring 120, the end portion of one arm 124a thereof is pivotably inserted into the connection hole 148a and the end portion of the other arm 124b is pivotably inserted into the connection hole 118b of the slider member 110.

Similar to the first torsion spring 120, the second torsion spring 130 is comprised of a second coil 132 and two arms 134a and 134b extended therefrom by a certain distance. The end portion of the arm 134a, 134b is bent. In the second torsion spring 130, the end portion of one arm 134a is pivotably inserted into the connection hole 148b of the guide member 140 and the end portion of the other arm 134b is pivotably inserted into the connection hole 118a of the slider member 110.

In the first torsion spring 120, the angle formed by the two arms 124a and 124b is preferred to be as wide as possible when no external force is exerted thereto. The second torsion spring 130 is the same as above. It is because the wider the angle between the two arms is, the longer distance the slider member 120 can run.

As described above, the sliding mechanism apparatus 100 is assembled and then the upper body and the lower body of a cellular phone are thread-connected to the guide member 140 and the slider member 110 respectively, thereby completing a slider-type cellular phone (not shown).

Figure 2:
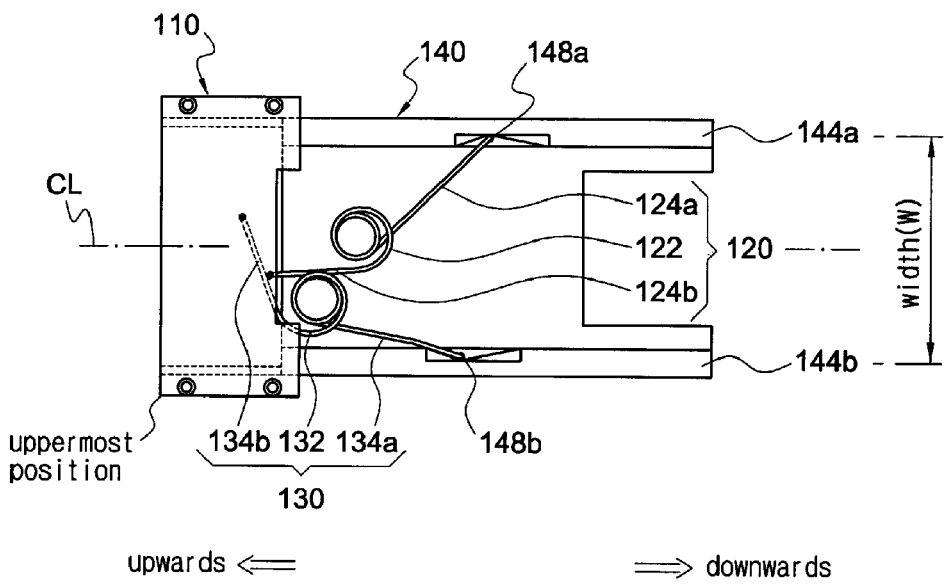
FIGS. 2 to 5 are plan views showing the assembled sliding mechanism apparatus of FIG. 1, running between the uppermost position and the lowermost position thereof.
Figure 3:
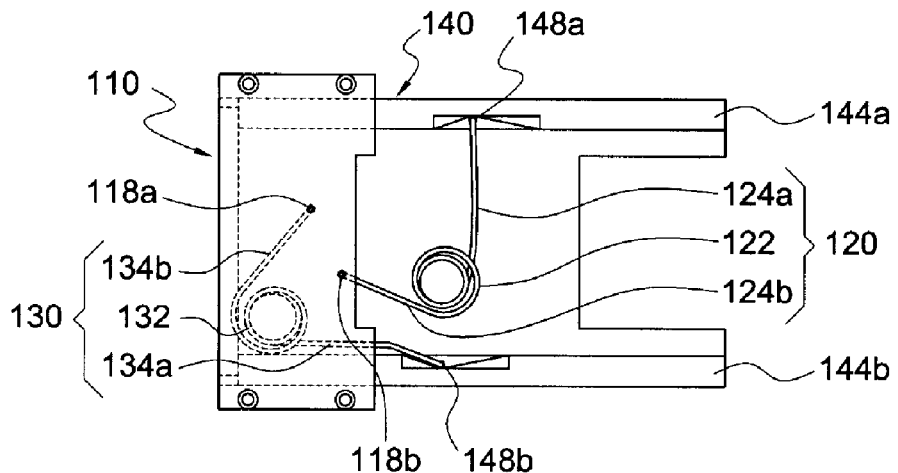
Figure 4:
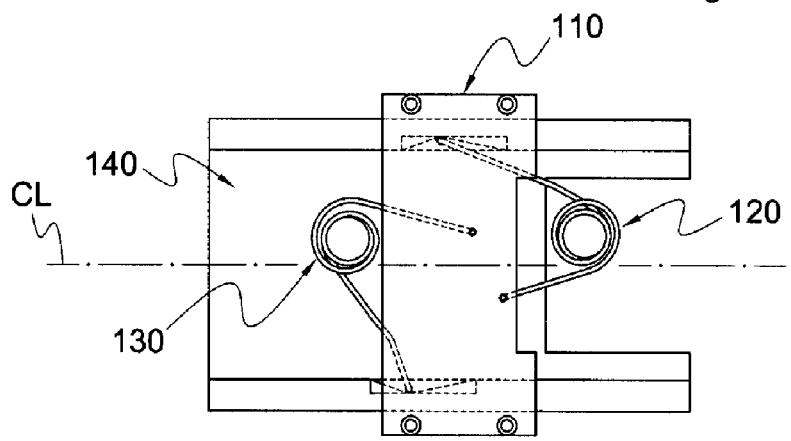
Figure 5:
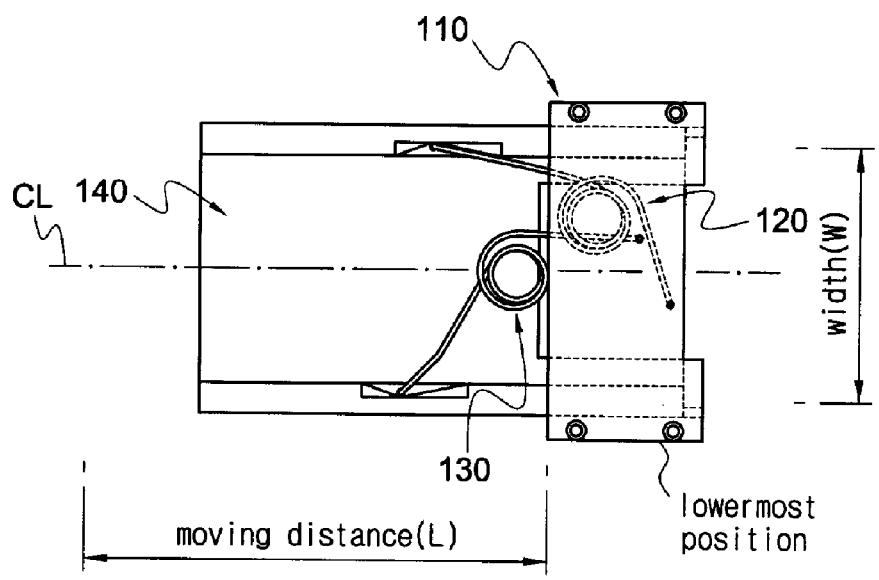

FIGS. 2 to 5 are plan views showing the assembled sliding mechanism apparatus 100 of FIG. 1, running between the uppermost position and the lowermost position thereof. When no external force is exerted, the torsion springs 120 and 130 are forced to spread as wide as possible. Thus, when no external force is exerted, as illustrated in FIG. 2, the slider member 110 is biased extremely towards the upper side of the guide member 140 (hereinafter, referred to as an "uppermost position or state"), or as shown in FIG. 5, the slider member 110 is biased extremely towards the lower side of the guide member 140 (hereinafter, referred to as a "lowermost position or state").

For example, at the uppermost state of FIG. 2, if a user exerts an external force to the upper and lower bodies of the cellular phone in opposite directions, then the slider member 110 moves downwards and the guide member 140 moves upwards. During this course of action, the first torsion spring 120 and the second torsion spring 130, which has been spread at an obtuse angle, are folded at an acute angle and the coils 122 and 132 of the two torsion springs 120 and 130 are placed in the lower half area of the guide member 140, as shown in FIG. 3. When the external force is continued, the slide member 110 moves further downwards and the coils 122 and 132 of the two torsion springs 120 and 130 are placed in the upper half area of the guide member 140, as shown in FIG. 4. After the coils 122 and 132 of the two torsion springs 120 and 130 are advanced into the upper half area of the guide member 140, the slider member 110 is spontaneously moved into the lowermost state, as shown in FIG. 5, due to the restoring force of the torsion springs 120 and 130, without necessity of exerting a further external force.

In this way, the slider member 110 travels from the uppermost position to the lowermost position. The positional change from the lowermost state to the uppermost state can be performed in the reverse order of the above, i.e., from FIG. 5 to FIG. 2.

At the uppermost state or the lowermost state, the two torsion springs 120 and 130 is forcibly biased upwardly or downwardly by means of their resilient force, thereby carrying out a latch function.

It should be noted in particular that the sliding mechanism apparatus 110 is designed such that the moving distance L of the slider member 110 relative to the width W of the guide member 140 can be maximized. In order to lengthen the maximum moving distance L of the slider member 110, the transversal spacing of the slider member 110 needs to be utilized maximally. For this purpose, the invention is especially designed, with respect to the connection positions of the two torsion springs 120 and 130 to the slider member 110 and the guide member 140. Specifically, in case where the end of one arm 124a in the first torsion spring 120 is placed near the edge of the guide member 140, the end of the other arm 124b thereof is placed within the left half area of the slider member 110 (within the area below the centerline CL in FIG. 2). Similarly, the arm 134b of the second torsion spring 130 is placed within the right half area of the slider member 110.

Dissimilar to the above mode (hereinafter, referred to as a "first mode"), if the arm 124b of the first torsion spring 120 is connected within the right half area of the slider member 110 and the arm 134b of the second torsion spring 130 is connected within the left half area of the slider member 110 (hereinafter, referred to as a "second mode"), the maximum moving distance L of the slider member 110 will be reduced significantly, as compared to the above first mode. This is because the transversal spacing (the width W) of the guide member 140 fails to be utilized in a maximal manner.

The maximum moving distance L of the slider member 110 and the width of the guide member 140 are related with each other. If the width W is reduced, the maximum moving distance L is restricted. The first mode is more favorable rather than the second mode, in order to obtain the maximum moving distance L with a reduced width W of the guide member 140. It is because the first mode utilizes the width W (transversal spacing) in a maximum fashion when the two torsion springs 120 and 130 are compressed and expanded while pivoting.

The cellular phone needs to be designed in a shorter, smaller and thinner form. The first mode is more preferable in order to obtain a desired maximum moving distance L while minimizing the width W of the slider member 110 and the guide member 140. Thus, when designing a cellular phone, the first mode is more suitable to conform to the shorter, smaller and thinner type of cellular phone.

Mode for the Invention

Figure 6:
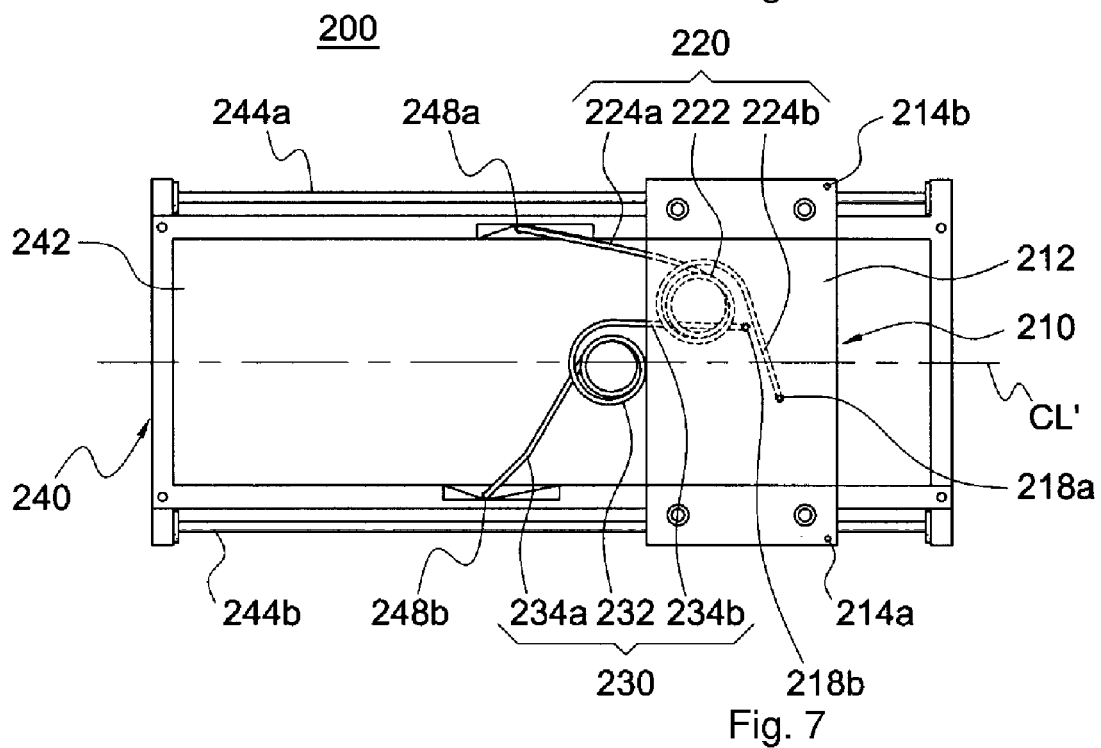
FIGS. 6 and 7 are plan view and rear view of a sliding mechanism apparatus according to a second embodiment of the invention where the mechanism is assembled.
Figure 7:
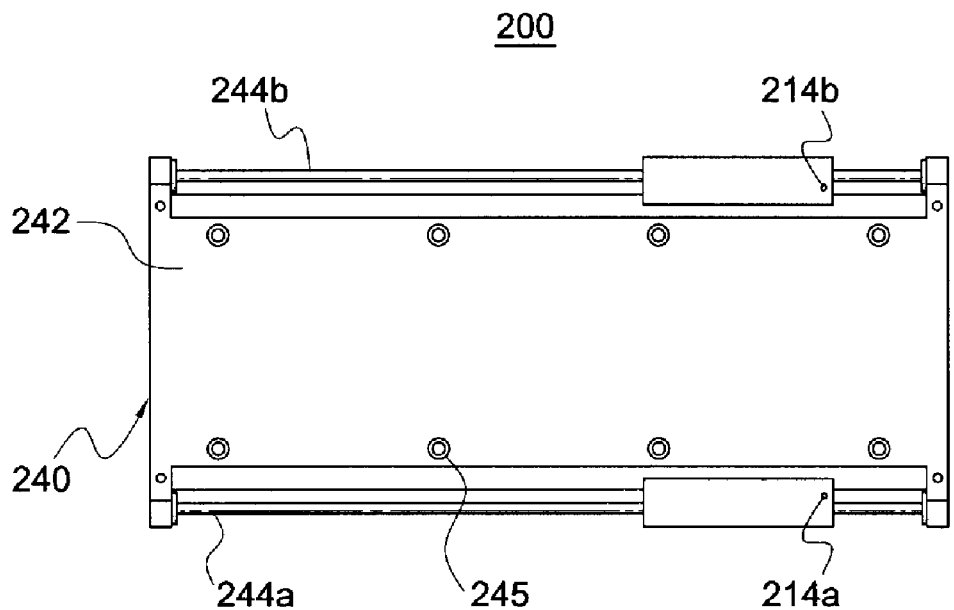

FIGS. 6 and 7 are plan view and rear view of a sliding mechanism apparatus according to a second embodiment of the invention where the mechanism is assembled and denoted at 200. The structure and coupling mode of a slider member 210 and a guide member 240 differ from the first embodiment.

The guide member 240 is formed of a rectangular plate 242 with a first and second guide bar 244a, 244b extended along the opposing parallel sides thereof. Near the middle of both edges of the rectangular plate 242 is formed V-shape grooves offset by a certain distance, at the apex of which a connection hole 248a, 248b is formed respectively. One arm 224a of a first torsion spring 220 and one arm 234a of a second torsion spring 230 are pivotably inserted into the two connection holes 248a and 248b respectively.

The slider member 210 is formed of a rectangular plate 212, in opposing parallel edges of which a slide-coupling hand 244a, 244b is formed in such a way as to be slidably inserted into the first and second guide bar 244a, 244b respectively. In addition, in the rectangular plate of the slider member 210 is formed a connection hole 218a, to which the other arm of the first torsion spring 220 is coupled, and a connection hole 218b, to which the other arm of the second torsion spring 230 is coupled.

The position of the two connection holes 248a and 248b in the guide member 240 and the position of the two connection holes 218a and 218b are configured in the same manner as in the previous first embodiment. In addition, similar to the first embodiment, the rear faces of the guide member 240 and the slider member 210 are provided with a plurality of connection holes 245 and 214b for combining the upper body and lower body of a cellular phone. Furthermore, the sliding mechanism apparatus 200 according to the second embodiment is operated in the same manner as in the first embodiment, and thus details thereon will not be repeated here.

Additionally, in the previously mentioned first embodiment, the widthwise spacing between the first connection hole 118a of the slider member 110 and the second connection hole 118b of the guide member 140 is preferred to be the same as the widthwise spacing between the second connection hole 118b of the slider member 110 and the first connection hole 148a of the guide member 140. If the two widthwise spacing is different from each other, the slide member 110 becomes biased to the right and left thereof so that a smooth sliding motion can not be achieved. This point is applied to the second embodiment in the same way.

Figure 8:
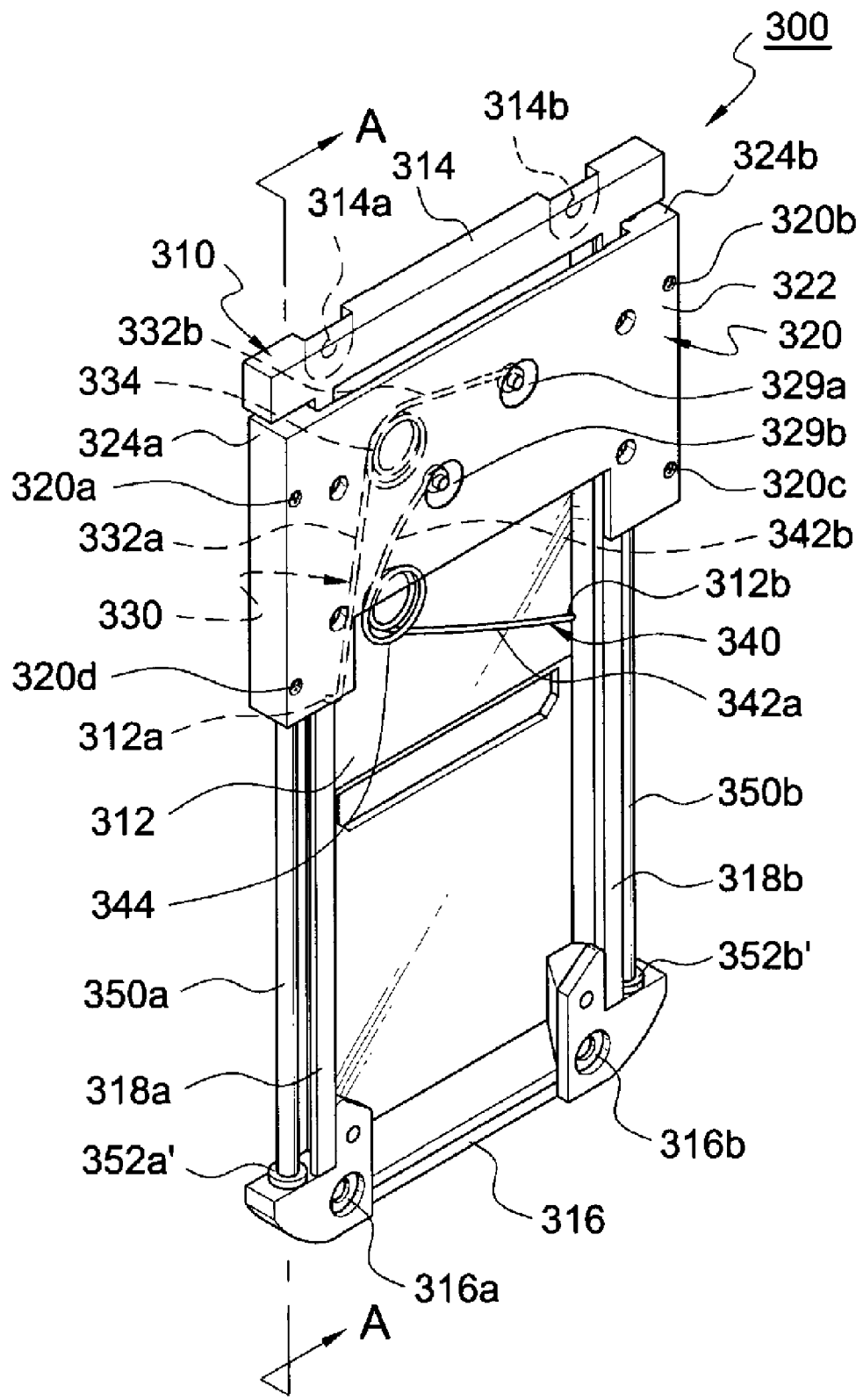
FIGS. 8 and 9 are respectively assembled and exploded perspective views of a sliding mechanism apparatus according to a third embodiment of the invention.
Figure 9:
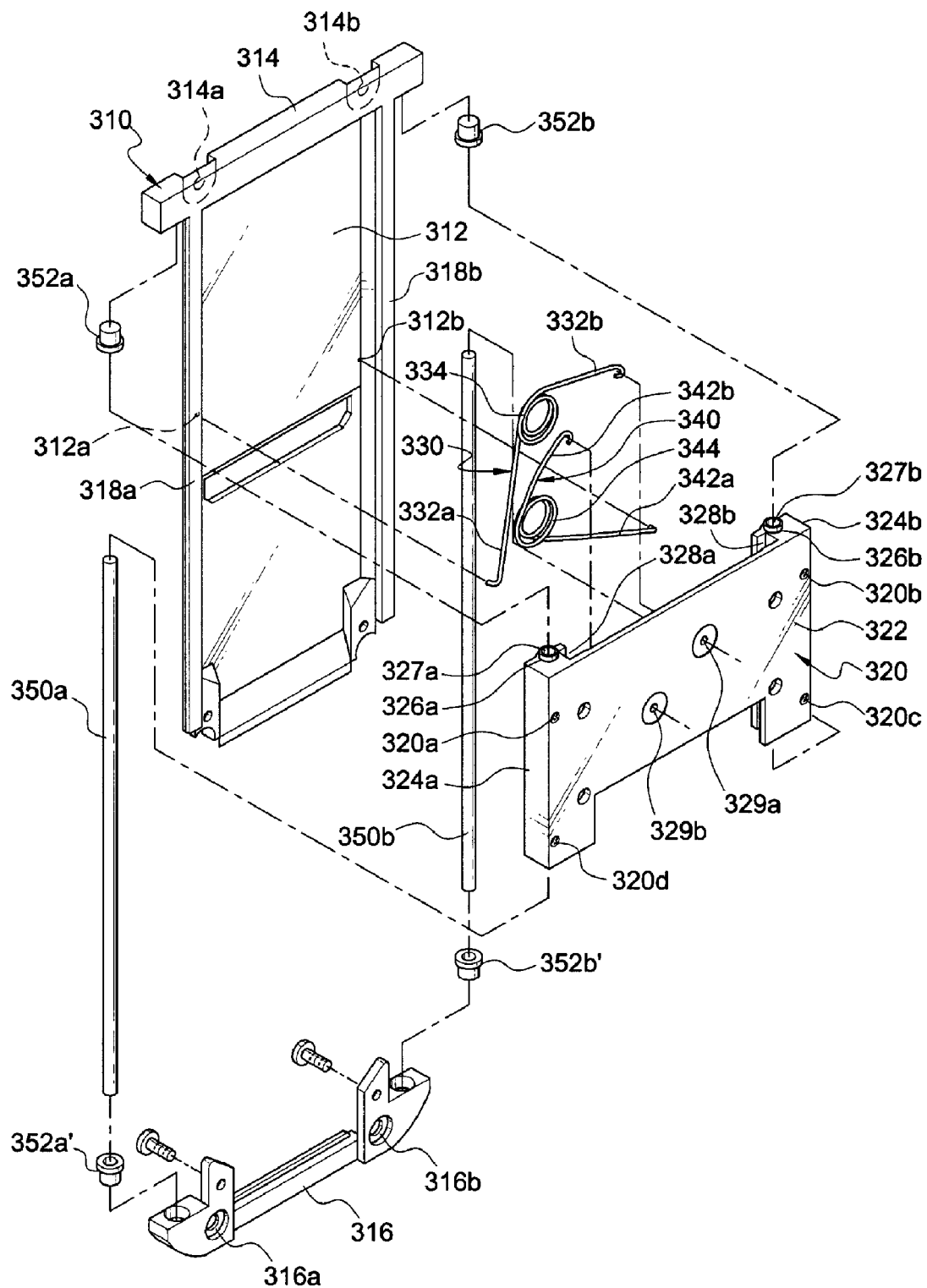
Figure 10:
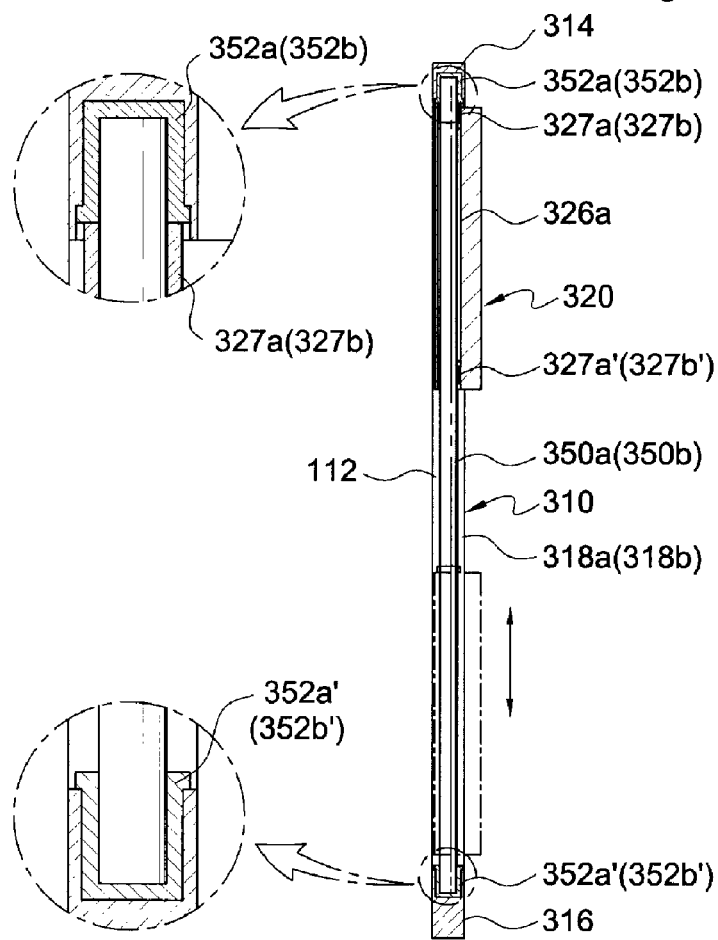
FIG. 10 is a cross section taken along the line A-A in FIG. 8.

FIGS. 8 to 10 illustrate a sliding mechanism apparatus according to a third embodiment of the invention where the mechanism is denoted at 300. FIGS. 8 and 9 are respectively assembled and exploded perspective views of a sliding mechanism apparatus according to the third embodiment of the invention, and FIG. 10 is a cross section taken along the line A-A in FIG. 8.

The sliding mechanism apparatus 300 of this embodiment comprises a guide member 310, a slider member 320 sliding on the guide member 310, and a first and second torsion spring 330, 340 assisting in the sliding movement of the slider member 320.

Specifically, the guide member 310 is comprised of a rectangular plate 312 and a first and second guide bar 350a, 350b mounted along both opposing parallel lateral faces of the rectangular plate 312. The first and second guide bar 350a, 350b is spaced apart by a certain distance from both lateral faces of the rectangular plate 312. Both ends of the guide bar are fixed to an upper and lower finishing crossbar 314, 316. In this embodiment, the first and second guide bar 350a, 350b is formed of a rod having a circular cross-section, but may be formed of a rod having a rectangular cross-section or a polygonal cross-section. The upper and lower ends of the first and second guide bar 350a, 350b is covered with a buffer rubber and then inserted and fixed into the upper and lower finishing crossbar 314, 316. The upper and lower buffer rubbers 352a, 352a', 352b, 352b' has a cap-like shape so as to cover the end portion of the first and second guide bar 350a, 350b. The buffer rubber functions to prevent the guide member 310 and the slide member 320 from being collided directly and further maintain the parallelism of the first and second guide bar 350a, 350b during sliding of the slide member 320.

Approximately at the middle of both edges of the rectangular plate 312 is provided a connection hole 312a, 312b respectively formed near the edge so as to be offset to each other by a certain distance. Into the two connection holes 312a and 312b are pivotably inserted one arm 332a of the first torsion spring 330 and one arm 342a of the second torsion spring 340. In the guide member 310 are formed connection holes 314a, 314b, 316a and 316b for fixing the upper body (commonly referred to as a "cover": not shown) of a cellular phone. The connection holes 314a, 314b, 316a, 316b are preferred to be formed one at the left and right side of the upper and lower finishing crossbar, i.e., one at each corner, totally four (4) connection holes. As illustrated, when the upper body is moved to the uppermost position relative to the lower body, the upper finishing crossbar 314 is exposed. Thus, inside the connection holes 314a and 314b formed in the left and right side of the upper finishing crossbar 314 is formed a female thread, through which the upper body can be bolt-fastened thereto, thereby not allowing the connection holes 314a, 314b to be exposed to the outside. The connection holes 316a and 316b, which are provided to the right and left of the lower finishing crossbar 316 and not exposed all the time, are more preferred to be made in the form of a through-hole, which can be used for a bolt-nut fastening.

In both lateral faces of the rectangular plate 312 are formed a first and second guide dams 318a and 318b, which faces respectively the first and second guide bars 350a and 350b. More specifically, the first guide dam 318a facing the first guide bar 350a and the second guide dam 318b facing the second guide bar 350b form a pair of parallel linear projections, which are extended along the lateral sides of the rectangular plate 312.

The slider member 320 is combined with the guide member 310 so as to enable to slide in a linear direction. For this purpose, the slider member 320 is provided with a first and second slide-coupling hand 324a, 324b formed along both opposing parallel edges of a rectangular base plate 322. In the first and second slide-coupling hand 324a, 324b is formed respectively a first and second guide hole 326a, 326b, which is inserted into the first and second guide bar 350a, 350b respectively so as to be slid thereon. The first and second guide hole 326a, 326b is provided with bearings 327a, 327a', 327b, 327b' inserted and mounted, in pairs, respectively at the upper and lower side thereof, in order to alleviate friction with the first and second guide bar 350a, 350b when sliding thereon. Among the bearings 327a, 327a', 327b, 327b', the upper bearings 327a, 327b is slightly protruded from the slide member 320 and the lower bearings 327a', 327b' are completed inserted and sunken inside the slide member 320. Correspondingly, an upper and lower buffer rubbers 352a, 352a', 352b, 352b' are covered on the upper and lower end portions of the first and second guide bars 350a and 350b of the guide member 310. The upper buffer rubbers 352a, 352b are completely inserted and sunken under the surface of the upper finishing crossbar 314 by a certain depth, and the lower buffer rubbers 352a' and 353b' is slightly protruded from the surface of the lower finishing crossbar 316. Thus, the buffer rubbers 352a and 352b is prevented from being exposed in the upper finishing crossbar 316, which may be exposed when sliding, thereby not spoiling the appearance thereof. By means of the above construction, the guide member 310 and the slider member 30 are not directly contacted, but the corresponding upper and lower bearings 327a, 327a', 327b, 327b' and the upper and lower buffer rubbers 353a, 352a', 352b, 352b' are contacted with each other, thereby lessening impact in-between and noise therefrom.

The first and second slide-coupling hand 324a, 324b is provided with a first and second rail 328a, 328b protruded inwards thereof and facing each other. The first rail 328a and the second rail 328b are slidably engaged respectively with the first guide dam 318a and the second guide dam 318b of the guide member 310. Here, a certain clearance is provided between the first and second rail 328a, 328b and the first and second guide dam 318a, 318b engaged therewith, so that they are not contacted with each other when sliding. The sliding movement is executed predominantly by the first and second guide bar 350a, 350b and the first and second guide hole 326a, 326b, and the first and second guide dam 318a, 318b and the first and second rail 328a, 328b function to prevent the sliding motion from being tilted or deviated from its horizontal movement, thereby enabling a stable travelling of the slider member 320 along the guide member 310.

In the central area of the rectangular base plate 322 of the slider member 320 are formed two connection holes 329a and 329b, to which one end of the first and second torsion spring 330 and 340 is fixed respectively. Each of two connections holes 329a, 329b is placed spaced apart from the centerline CL, which divides the width of the slider member 320 into two equal portions. Similarly, in the slider member 320 are formed a plurality of connection holes 320a to 320d for fixing the lower body (not shown) of a cellular phone.

The first torsion spring 330 is comprised of a first coil 334 wound generally in a circular form and two arms 332a and 332b extended from the first coil 334 by a certain desired distance. The end of the arms 332a, 332b is bent approximately at a right angle. The first torsion spring 330 is disposed in a space formed between the slider member 320 and the guide member 310 engaged with each other. In addition, the end of one arm 332a is pivotably inserted into the connection hole 312a of the guide member 310, and the end of the other arm 332b thereof is pivotably inserted into the connection hole 329a of the slider member 320.

Similar to the first torsion spring 330, the second torsion spring 340 is comprised of a second coil 344 and two arms 342a and 342b extended therefrom by a certain length. The ends of the two arms 342a and 342b are bent. The end of one arm 342a of the second torsion spring 340 is pivotably inserted into the connection hole 312b of the guide member 310 and the end of the other arm 342b thereof is pivotably inserted into the connection hole 329b of the slider member 320.

In the first torsion spring 330, the angle between the two arms 332a and 332b is preferred to be as wide as possible when no external force is exerted thereto. The second torsion spring 340 is the same as above. It is because the wider the angle between the two arms is, the longer distance the slider member 320 can travel.

As described above, the sliding mechanism apparatus 300 is assembled and then the upper body and the lower body of a cellular phone are thread-connected to the guide member 310 and the slider member 320 respectively, thereby completing a slider-type cellular phone (not shown). Typically, when a slider-type cellular phone is used, the lower body thereof is gripped by a user's hand and the upper body corresponding to the cover thereof is pushed upwardly. Practically, therefore, the guide member fixed to the upper body moves on the slider member fixed to the lower body. As described above, optimally the guide member and the slider member are fixed to the upper body and the lower body respectively of a cellular phone. However, since the slider member and the guide member perform a movement relatively to each other, the guide member may be attached to the lower body and the slider member may be attached to the upper body, without causing any operational interference.

Figure 11:
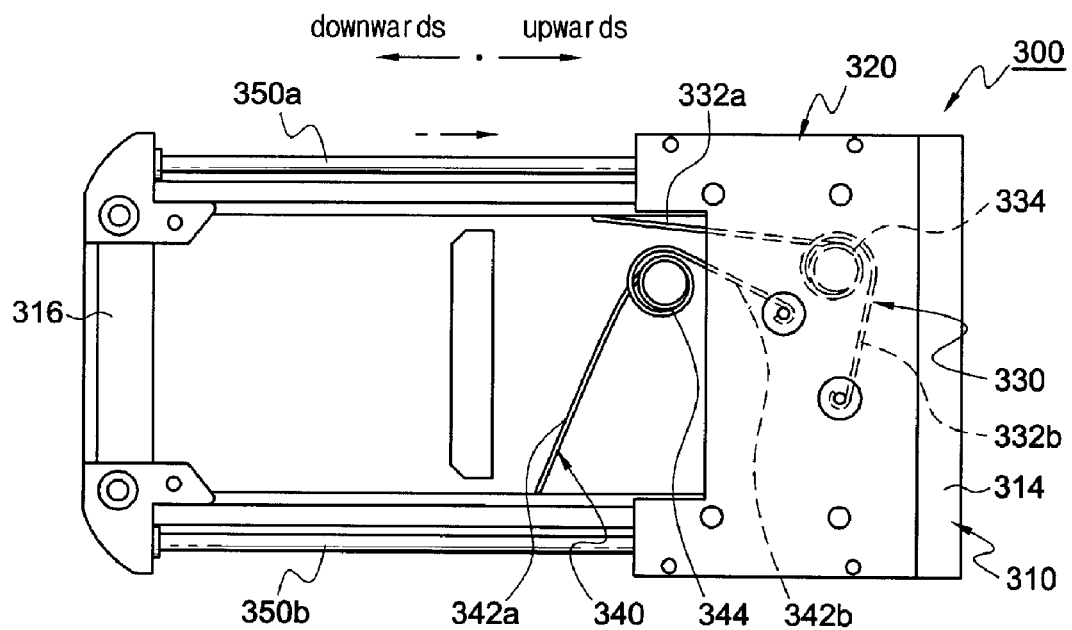
FIGS. 11 to 14 are plan views showing the assembled sliding mechanism apparatus of FIG. 8, running between the uppermost position and the lowermost position thereof.
Figure 12:
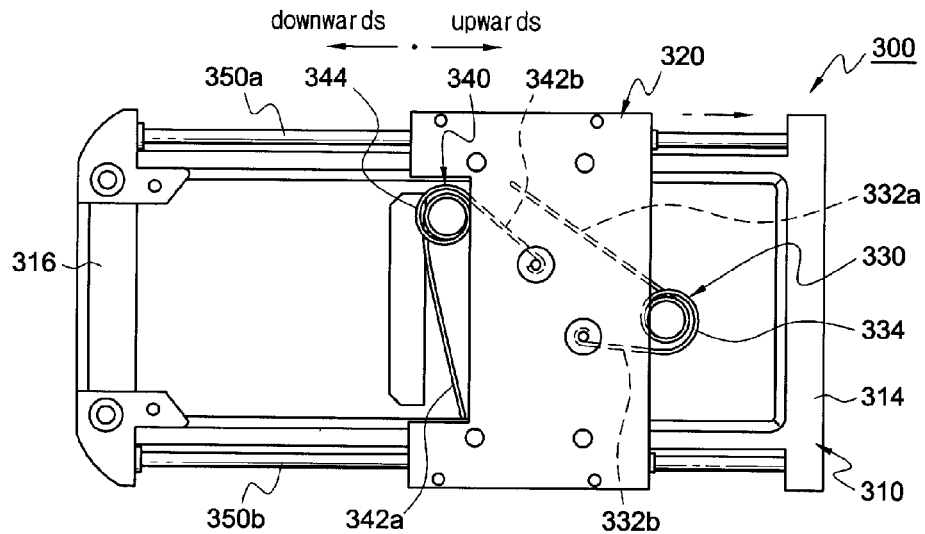
Figure 13:
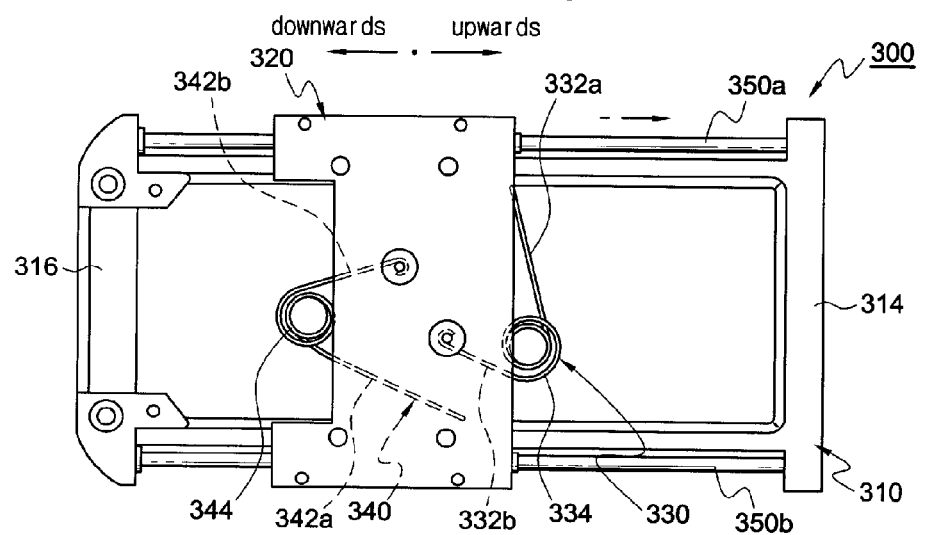
Figure 14:
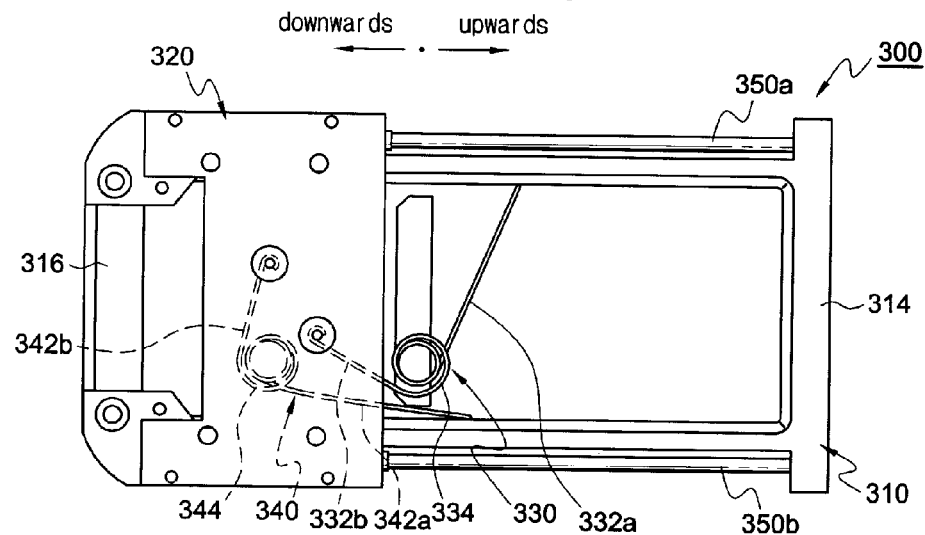

FIGS. 11 to 14 are plan views showing the assembled sliding mechanism apparatus 300 of FIG. 8, running between the uppermost position and the lowermost position thereof. When no external force is exerted, the torsion springs 330 and 340 are forced to spread as wide as possible. Thus, when no external force is exerted, as illustrated in FIG. 11, the slider member 320 is biased extremely towards the upper side of the guide member 310 (hereinafter, referred to as a "lowermost position or state"), or as shown in FIG. 14, the slider member 320 is biased extremely towards the lower side of the guide member 310 (hereinafter, referred to as an "uppermost position or state"). Here, assuming that the slider member 320 is fixed and the guide member 310 is moved on the slider member 320, the terms "uppermost position or state" mean where the guide member 310 is positioned relatively at the lowest position when the slider member 320 is placed in the highest side of the guide member 310. The term "lowermost position or state" means the opposite state.

For example, at the lowermost state of FIG. 11, if a user exerts an external force to the upper and lower bodies of the cellular phone in opposite directions, then the slider member 320 moves downwards and the guide member 310 moves upwards. During this course of action, the first torsion spring 330 and the second torsion spring 340, which has been spread at an obtuse angle, are folded at an acute angle and the coils 334 and 344 of the two torsion springs 330 and 340 are placed in the upper half area of the guide member 310, as shown in FIG. 12. When the external force is continued, the guide member 310 moves further upwards and the coils 334 and 344 of the two torsion springs 330 and 340 are placed in the lower half area of the guide member 310, as shown in FIG. 13. After the coils 334 and 344 of the two torsion springs 330 and 340 are advanced into the lower half area of the guide member 310, the guide member 310 is spontaneously moved into the uppermost state, as shown in FIG. 14, due to the restoring force of the torsion springs 330 and 340, without necessity of exerting a further external force.

In particular, the two torsion springs 330 and 340 biases the guide member 310 upwards or downward by means of its resilient force, so that the guide member can remain stopped in the uppermost position or the lowermost position.

Through the above course of action, the guide member 310 travels from the lowermost position to the uppermost position. The positional change from the uppermost state to the lowermost state can be performed in the reverse order of the above, i.e., from FIG. 14 to FIG. 11.

Figure 15:
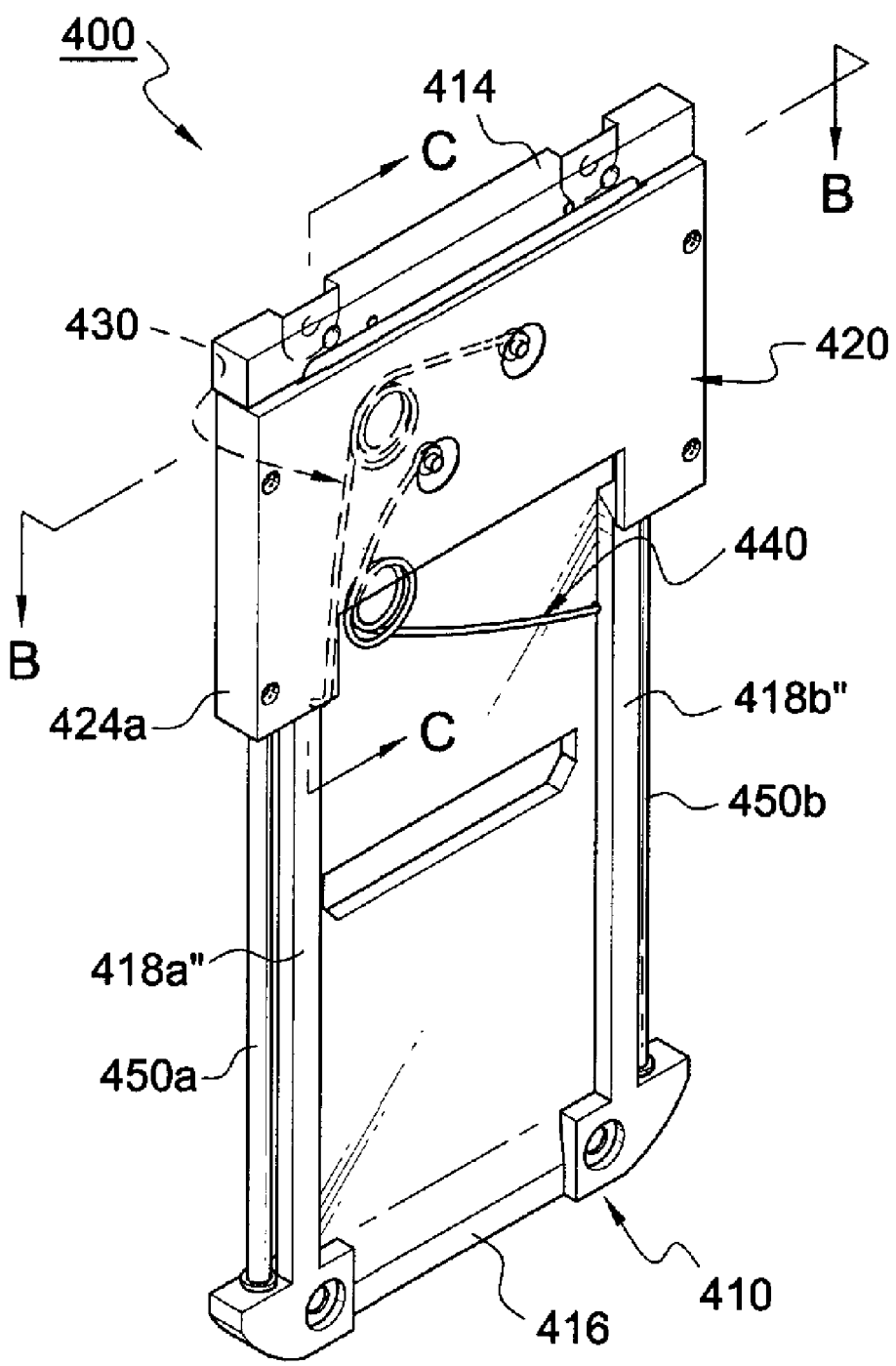
FIGS. 15 and 16 are respectively an assembled perspective view and an exploded perspective view of a sliding mechanism apparatus according to the fourth embodiment of the invention.
Figure 16:
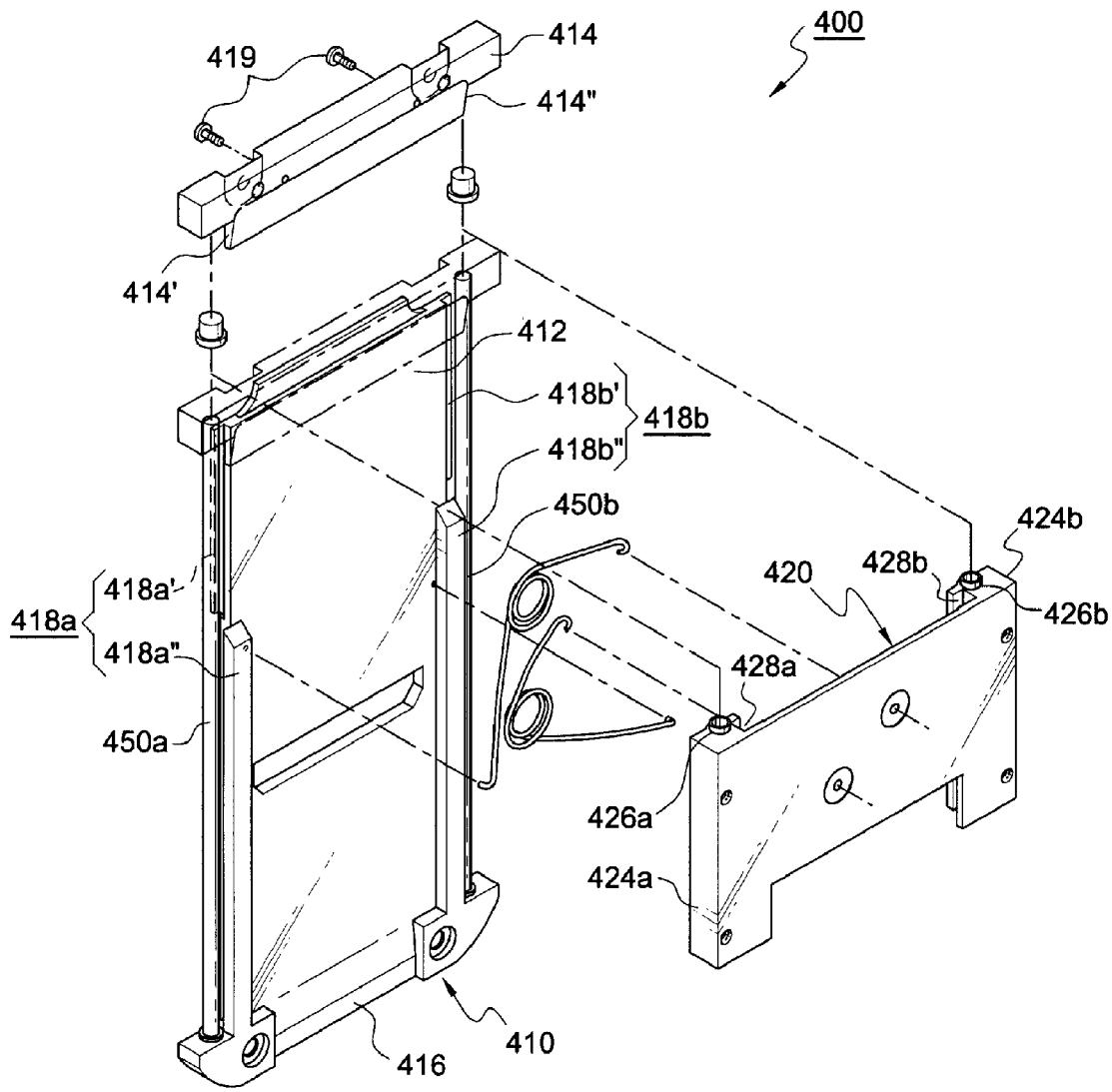
Figure 17:
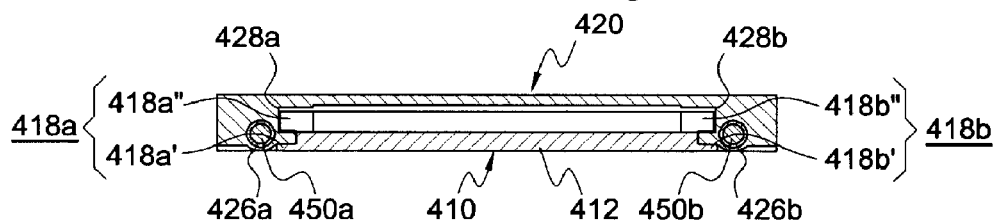
FIGS. 17 and 18 are cross-sections taken along the lines B-B and C-C respectively in FIG. 15.
Figure 18:
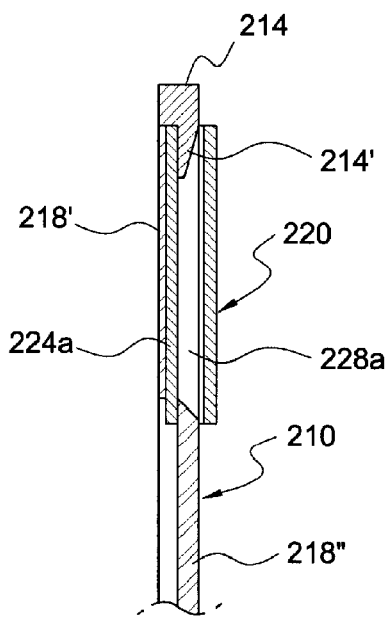

FIGS. 15 to 18 show a sliding mechanism apparatus according to a fourth embodiment of the invention where the mechanism is denoted at 400. FIGS. 15 and 16 are respectively an assembled perspective view and an exploded perspective view of a sliding mechanism apparatus according to the fourth embodiment of the invention. FIGS. 17 and 18 are cross-sections taken along the lines B-B and C-C respectively in FIG. 15. This embodiment differs from the third embodiment in the structure of a first and second guide dam 418a, 418b of a guide member 410 and a first and second rail 428a, 428b of a slider member 420, and their connection mode.

More specifically, a first and second guide dam 418a, 418b, which are formed in parallel along both lateral edges of the rectangular plate 412, are respectively divided into an upper first and second guide dam 418a', 418b' and a lower first and second guide dam 418a", 418b". The upper first and second guide dam 418a', 418b' is protruded from the rear side (opposite side of the slider member) and the lower first and second guide dam 418a", 418b" is protruded from the front side (the slider member side). In particular, the upper first and second guide dam 418a', 418b' protruded backwards is formed over the ⅓~¼ length of the rectangular plate 412, and the lower first and second guide dam 418a", 418b" is formed over the remaining length thereof. The upper first and second guide dam 418a', 418b' is made to have a length shorter than that of the slider member 420, so that a certain lower end portion of the first and second rail 428a, 428b can be engaged with the lower first and second guide dam 418a", 418b" when the slider member 420 is placed in the uppermost of the guide member 410. In addition, the upper finishing crossbar 414 is provided with an engaging dam 414', 414" protruded towards the rectangular plate 412 so as to have the same height and thickness as the lower first and second guide dam 418a", 418b", such that an upper certain portion of the first and second rail 428a, 428b is engaged therewith to thereby prevent from being released therefrom.

The first and second rail 428a, 428b of the slider member 420 is engaged with the lower first and second guide dam 418a", 418b" while accommodating them thereinside, and the upper first and second guide dam 418a', 418b' is closely contacted with the bottom face of the first and second rail 428a, 428b to thereby support the slider member 420. For this purpose, the bottom portion of the first and second rail 428a, 428b, which is to be contacted with the upper first and second guide dam 418a', 418b', is made to have a thinner thickness.

This embodiment has the same construction as in the third embodiment, excepting the above-mentioned features, and details on the same features will not be repeated here. However, in the third embodiment, the lower finishing crossbar 316 is fabricated separately from the rectangular plate 312 and fastened thereto using a bolt, but in the fourth embodiment, the upper finishing crossbar 414 is fabricated separately and fastened using a bolt 419.

Figure 19:
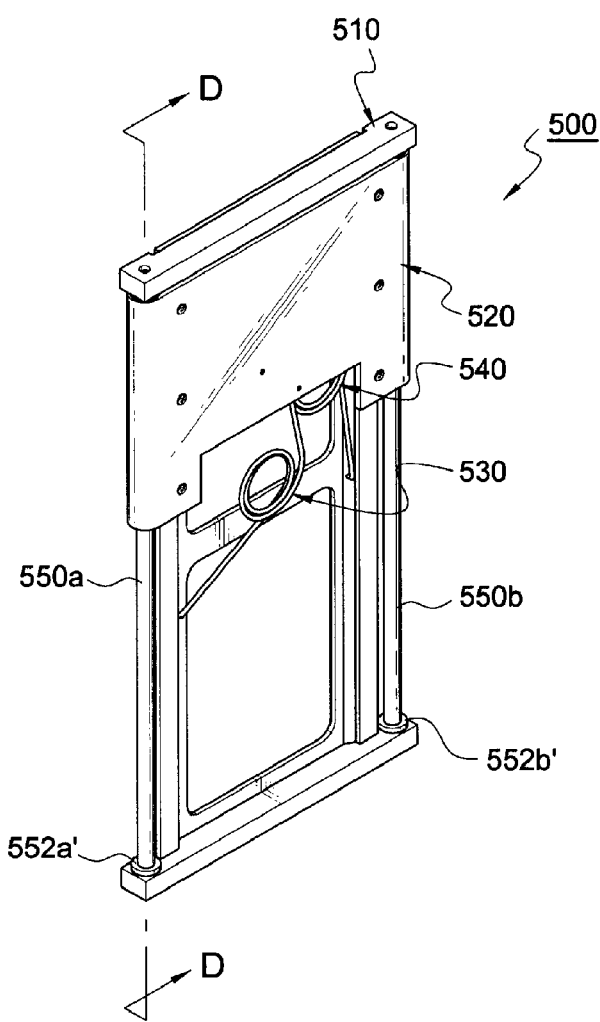
FIGS. 19 and 20 are respectively an assembled perspective view and an exploded perspective view of a sliding mechanism apparatus according to a fifth embodiment of the invention.
Figure 20:
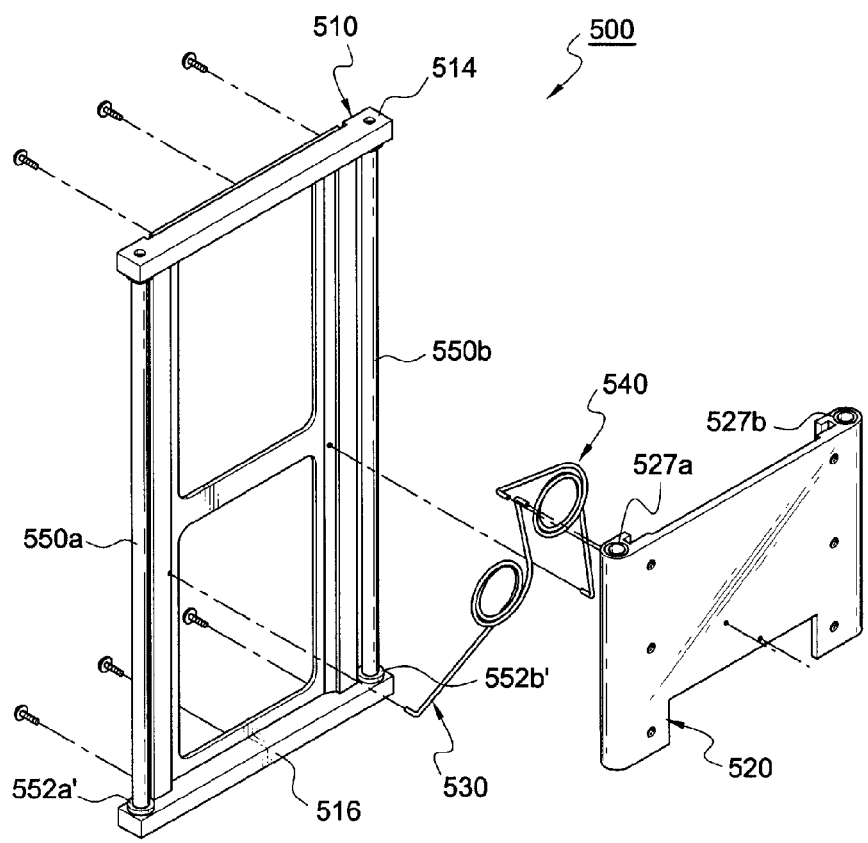
Figure 21:
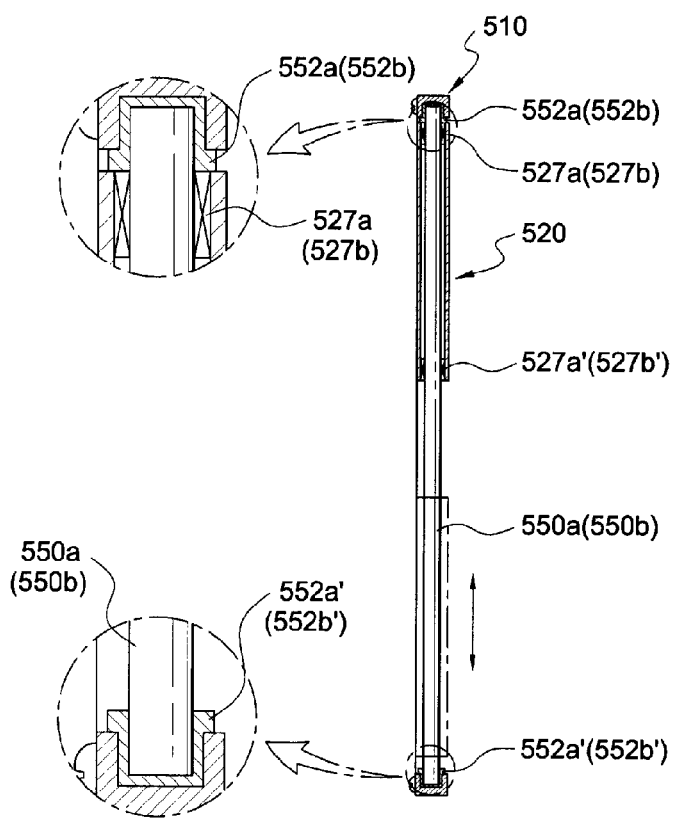
FIG. 21 is a cross-section taken along the line D-D in FIG. 19.

FIGS. 19 and 20 are respectively an assembled perspective view and an exploded perspective view of a sliding mechanism apparatus 500 according to a fifth embodiment of the invention. FIG. 21 is a cross-section taken along the line D-D in FIG. 19. The fifth embodiment is structured almost in the same manner as in the third embodiment, excepting a slight difference in the shapes of a guide member 510 and the slider member 520. However, in the third embodiment, the upper and lower bearing is protruded at one side thereof from the slider member and at the other side thereof sunken into the slider member, and correspondingly the upper and lower buffer rubber is buried, at one side thereof, into the guide member by a certain depth and, at the other side thereof, protruded from the guide member. Dissimilarly, in this embodiment, an upper and lower bearings 527a, 527a', 527b, 527b' are all sunken inside and a buffer rubbers 552a, 552a', 552b, 552b' to be contacted with the bearings are all protruded. In this case, the appearance may be slightly spoiled, but the operation thereof doe not cause any problem. That is, when the upper body of a cellular phone slides upwards, the upper buffer rubber 552a, 552b comes to be exposed so that it might spoil the external appearance thereof. However, on the contrary, in case where the buffer rubber is installed so as to protrude, the assembling procedure can be simplified to thereby improve the assembling efficiency, as compared with the case of burying the buffer rubber. In addition, the upper and lower bearings may be all protruded, and the corresponding upper and lower buffer rubbers may be all buried, so as to be contacted with each other.

Figure 22:
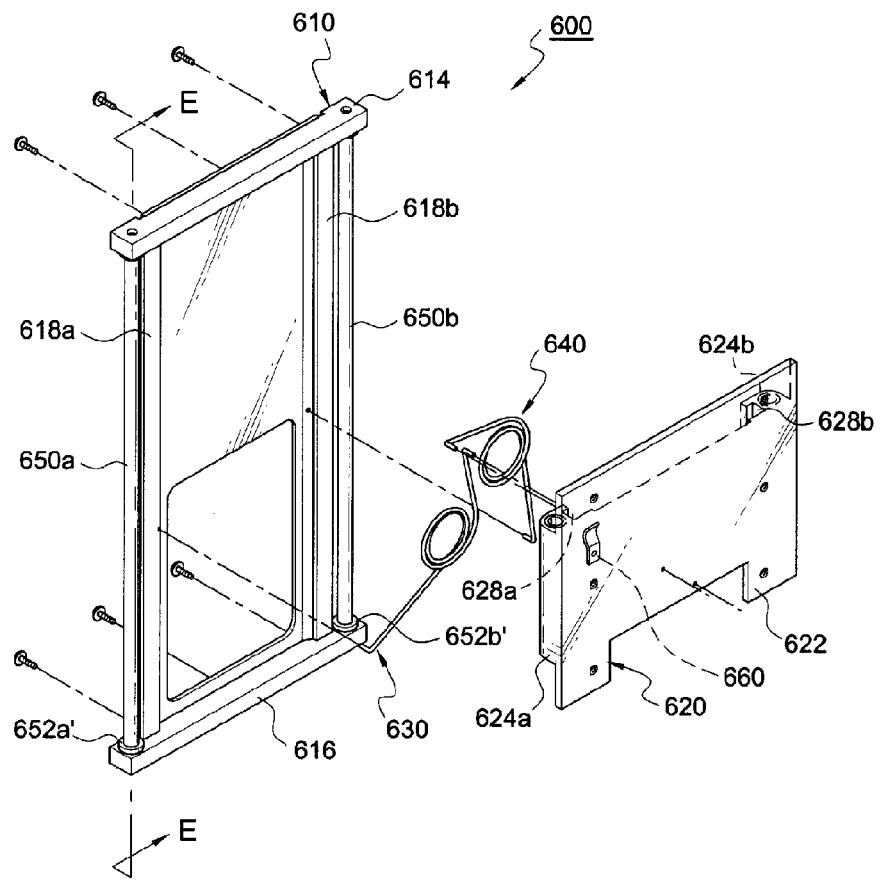
FIGS. 22 and 23 are respectively an exploded perspective view and an assembled cross-section of a sliding mechanism apparatus according to a sixth embodiment of the invention.
Figure 23:
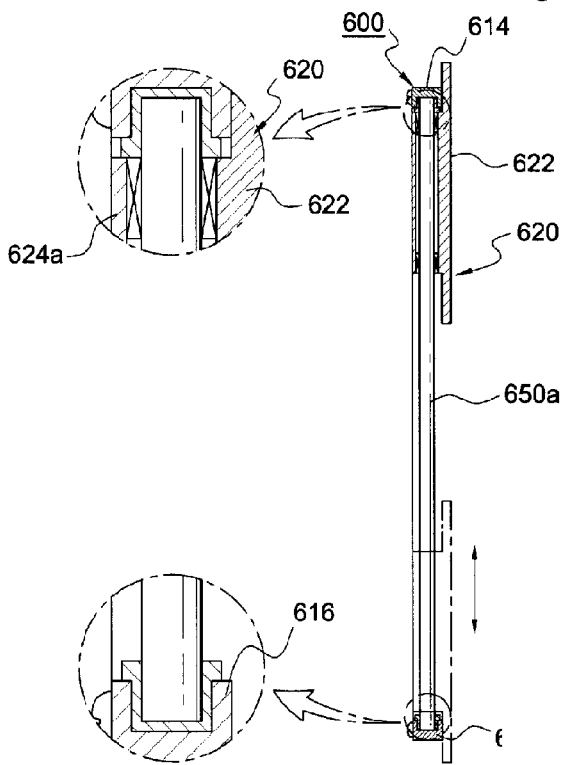

On the other hand, the fifth embodiment as described above may be slightly modified into those constructions shown in FIGS. 22 and 23.

FIGS. 22 and 23 are respectively an exploded perspective view and an assembled cross-section of a sliding mechanism apparatus according to a sixth embodiment of the invention. As illustrated in FIGS. 22 and 23, a first and second slide-coupling hand 624a, 624b, which is provided in both sides of a rectangular base plate 622 in a slider member 620, is formed so as to be shorter than the length of the rectangular base plate 622, not over the entire length thereof. Thus, when in the uppermost or lowermost position, the rectangular base plate 622 of the slider member 620 can run beyond an upper and lower finishing crossbar 614, 618, thus extending the sliding distance of a slider-type cellular phone. That is, if the rectangular base plate 622 of the slider member 620 and the guide bar 650a, 650b of the guide member 610 have the same length as in the fifth embodiment, a more extended operating distance can be achieved.

Figure 24:
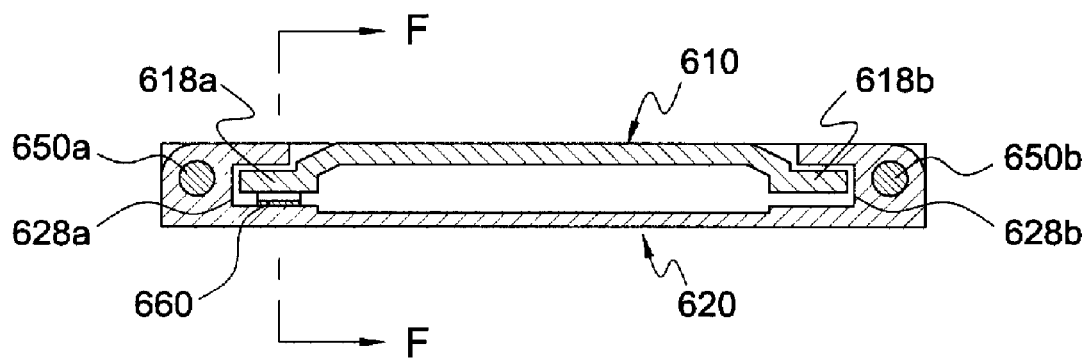
FIGS. 24 and 25 are assembled cross-sections of FIG. 22.
Figure 25:
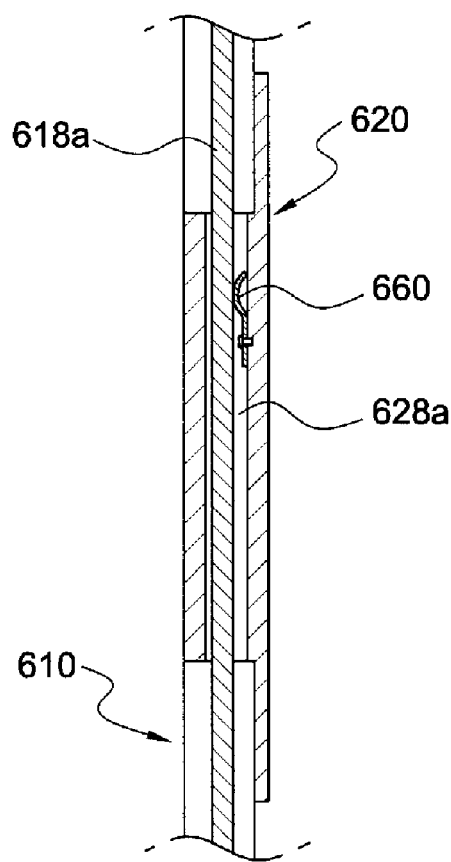

Further, the slider member 620 and the guide member 610 are formed of a conductive metallic material and are all a mobile member, which can affect the transmitting and receiving electromagnetic wave of a cellular phone. In order to minimize the effect of these two members on the transmitting and receiving electromagnetic wave of a cellular phone, the electric potential of the two members needs to be made the same as the reference potential of the cellular phone. As one approach for this purpose, the two members are electrically connected respectively to the reference potential point of the cellular phone. As an alternative, the conductive slider member 620 and the guide member 610 are made to be electrically contacted with each other, even while carrying out a sliding movement, thereby avoiding a potential difference between the two members, and at the same time, the electrically integrated two members are electrically connected to the reference potential point of the cellular phone. That is, as shown in FIGS. 24 and 25, preferably, a contact plate 660 is fixed to the inner side of the rail 628a of the slider member 620, which faces the guide dam 618a of the guide member 610, thereby allowing for an electrical contact between the two members. Here, the contact plate 660 is preferred to be formed of a leaf spring having resilience. Thus, when the slider member 620 and the guide member 610 preform a relative sliding movement, the contact plate 60 fixed inner side of the rail 628a is moved while maintaining an elastic contact with the guide dam 628a. The contact plate 660 may be fixed by means of a fastener member such as a small bolt or screw, or may be welded to the slider member. The contact plate 660 may be installed in any places, so long as it can electrically connect the slider member and the guide member with each other. This contact plate may be applied to the previous third to fifth embodiments as well.

Figure 26:
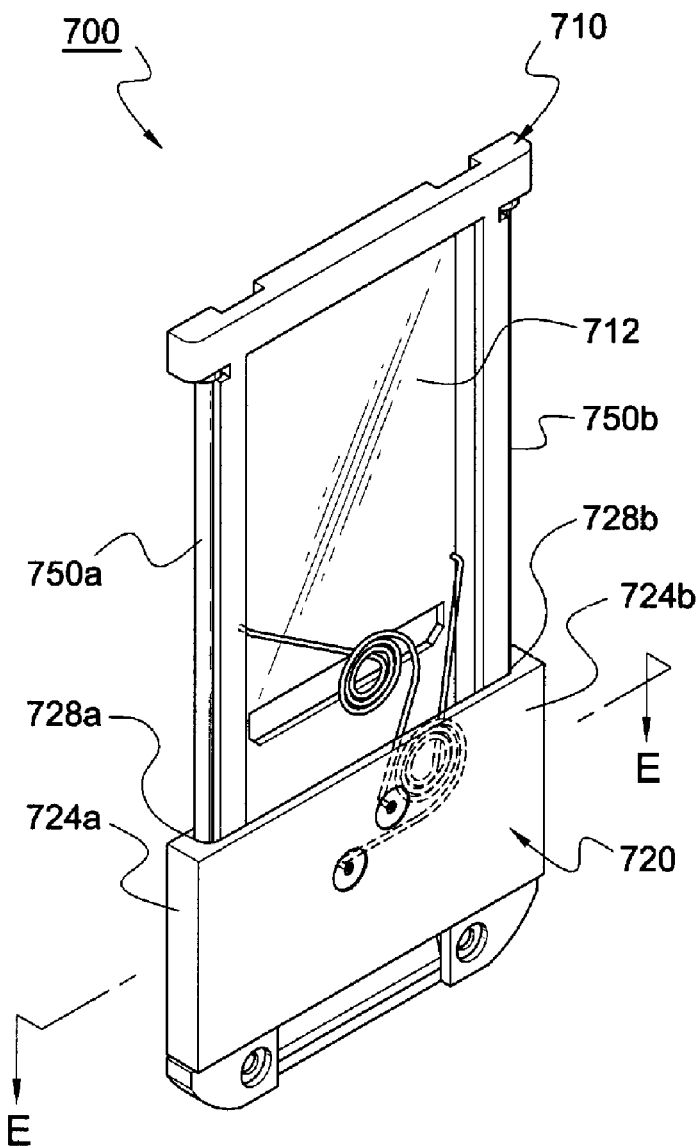
FIG. 26 is an assembled perspective view of a sliding mechanism apparatus according to a seventh embodiment of the invention.
Figure 27:
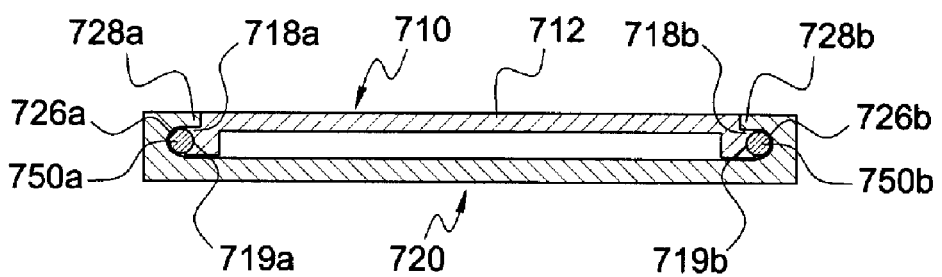
FIG. 27 is a cross-section taken along the line E-E line in FIG. 26.

FIG. 26 is an assembled perspective view of a sliding mechanism apparatus 700 according to a seventh embodiment of the invention, and FIG. 27 is a cross-section taken along the line E-E line in FIG. 26. In this embodiment, which is modified from the third embodiment, a guide dam 718a, 718b of a guide member 710 is protruded along both lateral edges of the rectangular plate 712, and a guide bar 750a, 750b is combined so as to be closely contacted with the side face of the guide dam 718a, 718b. Here, the side face of the guide dam 718a, 718b is provided with an inserting groove 719a, 719b conforming to the curvature of the guide bar 750a, 750b, a certain portion of which thereby can be inserted. On the other hand, the pair of first and second guide holes 726a, 726b, which are combined with the pair of first and second guide bar 750a, 750b, are formed inwards of the slide-coupling hands 724a, 724b and facing each other. The first and second guide hole 726a, 726b is opened inwards thereof so as to have an arcuate cross-section and wraps around part of the surface of the first and second guide bar 750a, 750b. In this way, the first and second guide hole 726a, 726b is opened towards one lateral side thereof to thereby substantially constitute a groove, but is defined as a hole, for the purpose of convenience of describing and defining terms. In addition, outwards of the guide hole 726a, 726b are formed guide rails 728a, 728b to be engaged with the guide dams 718a, 718b.

According to the above-described construction, a double guiding structure is formed in such a manner that the slide-coupling hands 724a, 724b of the slider member 720 wrap around a certain portion of the guide bars 750a, 750b, and at the same time the guide rail 728a, 728b is engaged with the guide dam 718a, 718b of the guide member 710. This structure is operated almost the same manner as in the third embodiment and thus provides almost the same effect as in the third embodiment. Therefore, specific explanations thereon will not be repeated here.

Figure 28:
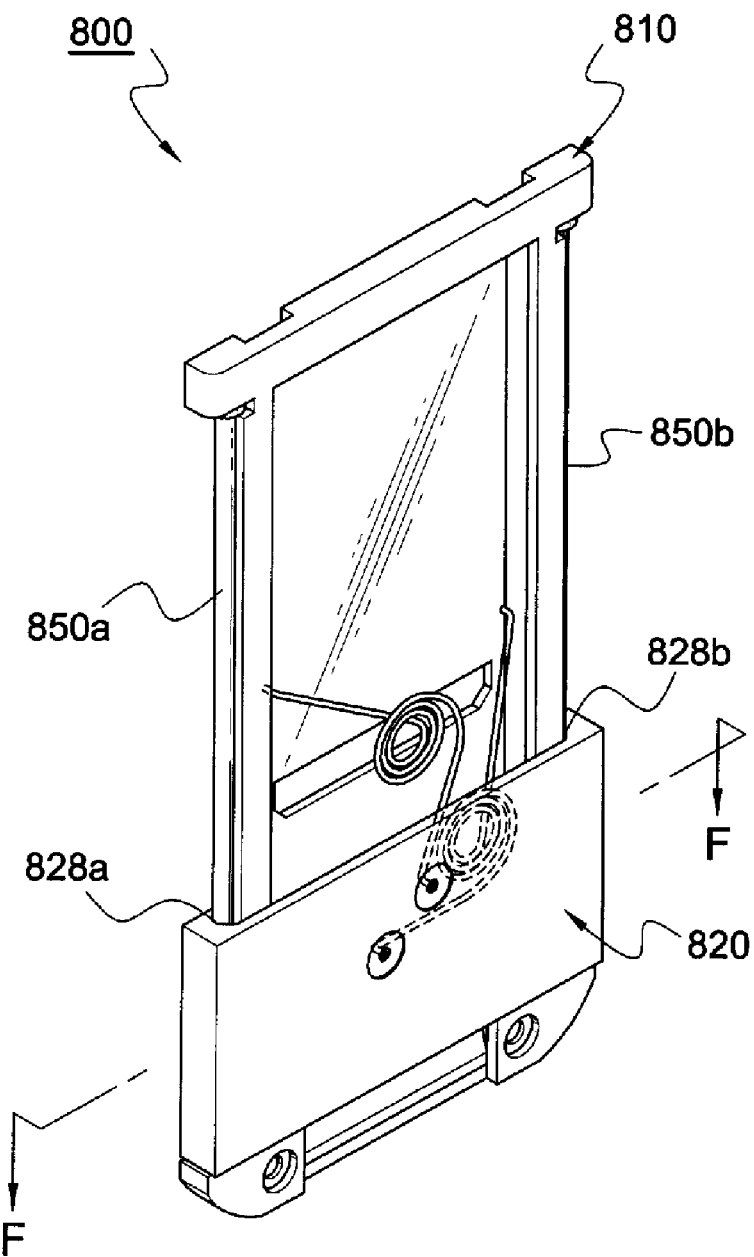
FIG. 28 is an assembled perspective view of a sliding mechanism apparatus according to an eighth embodiment of the invention.
Figure 29:
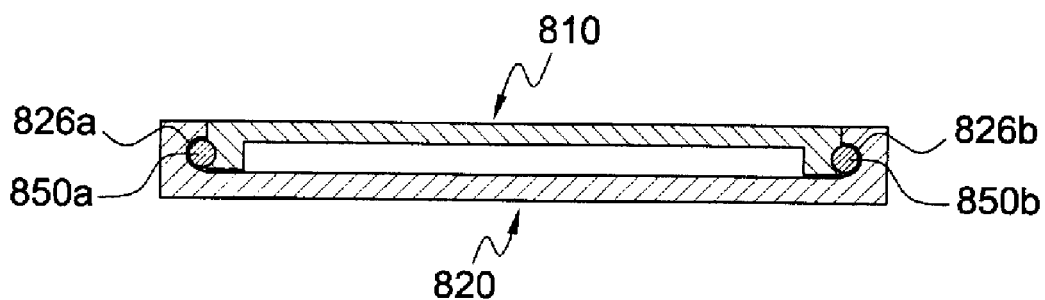
FIG. 29 is a cross-section taken along the line F-F in FIG. 28.

FIG. 28 is an assembled perspective view of a sliding mechanism apparatus 800 according to an eighth embodiment of the invention, and FIG. 29 is a cross-section taken along the line F-F in FIG. 28. In this embodiment, the guide dam and guide rail structures are removed, and the relative sliding of a guide member 810 and a slider member 820 is guided through the engaging structure of guide bars 850a, 850b and guide holes 826a, 826b. In this sliding and guiding structure, the stability therefor is slightly inferior to the previous embodiments, but the slider member can be slid and guided without any hitch.

Figure 32:
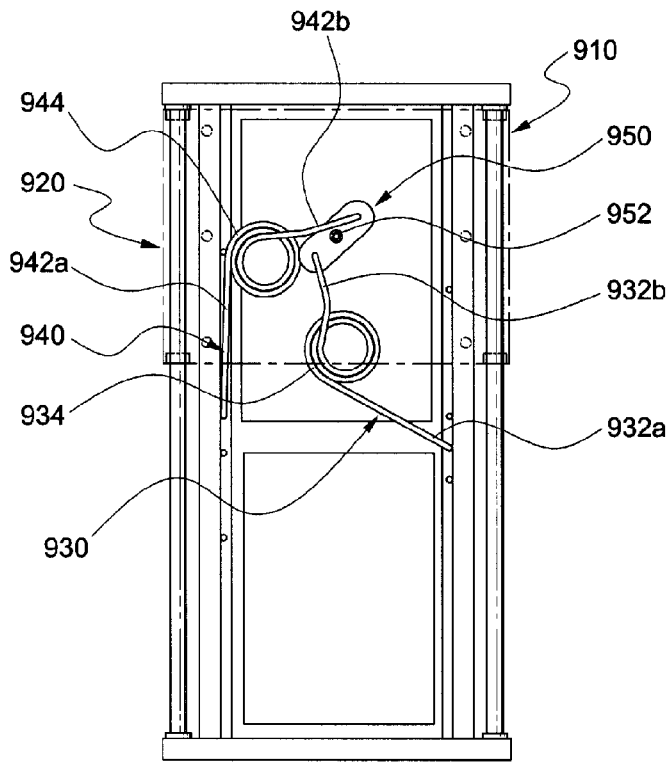

FIGS. 30 to 32 are plan views explaining a sliding mechanism apparatus 900 according to a ninth embodiment of the invention.

As illustrated in the figures, a slider member 920 is slidably coupled with a guide member 910. Between the guide member 910 and the slider member 920 is inserted a first and second torsion spring 930, 940, which provides a driving force for a sliding motion. That is, the first and second torsion spring 930, 940 forms an obtuse angle by a pair of arms 932a, 932b, 942a, 942b extended from the coil portion 934, 944 thereof. One arm 932a, 942a is fixed to the guide member 910 and the other arm 932b, 942b is fixed to the slider member 920. When the guide member 910 and the slider member 920 start a relative sliding motion, the arms 932a, 932b, 942a, 942b of the first and second torsion spring 930, 940 are compressed into an acute angle and then return to the original state (obtuse angle), depending on the position thereof. Therefore, if the first and second torsion spring 930, 940 goes beyond the compression limit therefor, then they are restored and expanded out, thus providing a moving force to enable to reach the final destination point thereof.

As mentioned in the background art section, appliances such as a cellular phone or the like using a sliding mechanism have become gradually miniaturized. Thus, in order to reduce the width of the sliding mechanism apparatus and increase the sliding distance, the end portion of the arms of the first and second torsion spring, which is fixed to the central area of the slider member, is placed in both side of the widthwise centerline (which is parallel to the sliding direction) in such a way that they are spaced apart from the centerline and offset to each other. As the result, when the slider member slides on the guide member, a dead point (halting section) occurs a lot. In the present invention, the end of the other variable arm 932b, 942b of the first and second torsion spring 930, 940 is not fixed directly to the slider member 920. In order to solve the above problem, however, they are pivotably fixed to a variable link 950 so as to face each other with the link shaft 952 placed in-between. The variable link 950 is configured so as to pivot at a certain angle approximately at a central area of the slider member 920.

More specifically, the variable link 950 is rotatably fixed, at its center, to the central area of the slider member 950 through the link shaft 952. With the link shaft 952 placed in-between, the end of the variable arm 932b of the first torsion spring 930 is pivotably coupled to the left of the variable link 950, and the end of the variable arm 942b of the second torsion spring 940 is pivotably coupled to the right of the variable link 950. Here, the variable arm 932b, 942b of the first and second torsion spring 930, 940 is slightly bent such that the operation angle of the springs is reduced to thereby lessen the fatigue. Also, when the first and second torsion spring 930, 940 is pivoted, interference with the variable link 950 can be avoided, thereby overcoming the spatial limitation and improving the restoring force of spring. According to the above coupling structure of the variable link 950, the fixing point (pivot axis) of the end portion of the variable arms 932b, 942b of the first and second torsion spring 930, 940 is varied as the guide member 910 and the slider member 920 slides relative to each other. Here, the end portions of the fixed arms 932a, 942b of the first and second spring 930, 940 are rotatably fixed at both edges of the guide member 910 in such a way as to be slightly offset from the middle of the edges and rotate at its own position. In this embodiment, the fixed arm 932a of the first torsion spring 930 is fixed, in the left edge of the guide member 910, at a position slightly lower than the lengthwise centerline of the guide member 910. The fixed arm 942a of the second torsion spring 940 is fixed, in the right edge of the guide member 910, at a position slightly higher than that of the fixed arm 932a of the first torsion spring 930.

When the slider member 920 is placed in the lowermost position, the variable link 950, to which the variable arm 932b, 942b of the first and second torsion spring 930, 940 is fixed, is inclined at a certain angle relative to the vertical line, as shown in FIG. 30. At this time, the tilt angle q of the variable link 950 is preferred to be 20~60 degrees, more preferably 30~50 degrees. At this state, when the slide member 920 slides on the guide member 910 upwardly, the first and second torsion spring 930, 940 is compressed such that the variable arms 932b, 942b thereof pushes the connection points of the variable link 950, which thereby rotates about the link shaft 952 clockwise to reach almost a horizontal state. Accordingly, the coil portion 934, 944 of the first and second torsion spring 930, 940 is rotated along a certain trajectory. As the result, a halting phenomenon occurs at a point where the first and second torsion spring 930, 940 has the same restoring force, but in opposite directions to each other. According to the invention, when the restoring forces of the first and second torsion spring 930, 940 become identical to each other, the variable link 950 is turned in cooperation with the action of the coil portions 934, 944 such that the restoring forces can be exerted in a same direction, thereby avoiding creation of dead points. Therefore, when the slide member 920 slides on the guide member 910 or vice versa, the halting phenomenon, which occurs where the spring forces of the two torsion springs are balanced, can be prevented. That is, as shown in FIG. 31, when the forces of the first and second torsion spring 930, 940 are balanced, the variable link 950 comes to place in the horizontal level, which is approximately perpendicular to the sliding direction. Thus, the restoring forces of the two springs 930, 940 are made to exert in the same direction, i.e., in the sliding direction, so that the sliding movement can be continued, without a halting action. As the result, the slider member 920 comes to reach the uppermost position on the guide member 910, as shown in FIG. 32. In the uppermost state, the first and second torsion spring 930 is expanded into their original states, i.e., into the obtuse angle. At this state, the variable arm 932b pulls down the left fixing point of the variable link 950 and the variable arm 942b of the second torsion spring 940 pulls up the right fixing point of the variable link 950, thereby turning the variable link counterclockwise about the link shaft 952. In addition, the variable arm 942b of the second torsion spring 940 is caught in the link shaft 952 of the variable link 950 and thus the right fixing point, to which the variable arm 942 is fixed, is pulled up to thereby strengthen the turning force of the variable link. Therefore, at the uppermost position, the variable link 950 remains tilted at a certain angle, preferably, 30~50 degrees. Resultantly, the sliding (travelling) distance is extended by a displacement in the sliding direction, correspondingly to the change of the variable link 950 from the horizontal level to a tilted state. In view of the above results, the turning angle of the variable link 950 can be designed, considering the fact that, at the uppermost or the lowermost position, the closer the variable link 950 is tilted to the vertical line, the longer the sliding distance is extended.

In particular, in the first and second torsion spring 930, 940, the ratio of the length of the fixed arm 932a, 942a to that of the variable arm 932b, 942b is preferred to be 1.5~2:1. In addition, the variable arms 932b, 942b of the first and second torsion spring 930, 940 fixed to the variable link 950 are bent so as to expand the angle formed by the variable arms 932b, 942b. Therefore, during the action of the torsion springs 930 and 940, interference with the variable link 950 can be minimized and consequently the spatial limitation can be alleviated.

Figure 33:
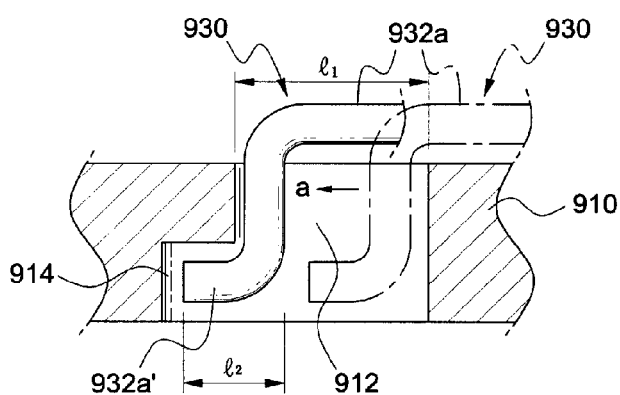
FIGS. 33 and 34 are a cross-sectional view and a bottom view explaining a fixing configuration of the fixed arm of a torsion spring in the invention.
Figure 34:
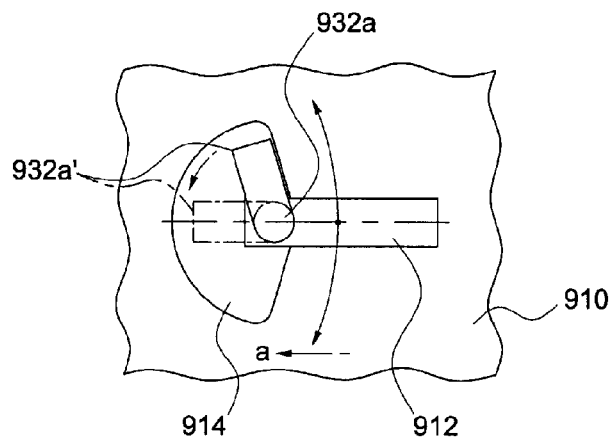

FIGS. 33 and 34 are a cross-sectional view and a bottom view explaining the fixing configuration of a fixed arm of a torsion spring in the invention, which is a modified structure to solve the prior art problem in connecting a fixed end of the conventional torsion spring. In FIGS. 33 and 34, only the first torsion spring is illustrated since the second torsion spring has the same fixing structure as the first one.

Referring to FIGS. 33 and 34, the fixed arm 932a of the torsion spring 930 is pivotably fixed to a fixed point of the guide member 910 in such a way that an elongated hole 912 is formed in the guide member 910 in the radial direction of rotation and the bent end of the fixe arm 932a of the torsion spring 930 is inserted into the elongated hole 912 so as to be retreated to the rearmost of the hole 912 by means of the resilience of the spring, thus being fixed. Then, the bent end 932a' thereof is placed inside a guide groove 914 formed in the rear face of the elongated hole 912 and fixed thereto. Since the spring force always acts outwardly (the arrow a), the fixed arm 932a is prevented from being escaped when turning at its own position. Here, the length l1 of the elongated hole 912 is made slightly longer than the length l2 of the bent end 932a', and the width of the elongated hole 912 is made almost the same as the diameter of the fixed arm 932a, thereby avoiding wobbling of the fixed arm 932a in the widthwise direction after being inserted. Thus, as depicted in the one-dot chain line in FIG. 33, if the bent end 932 is inserted from above and then released, the compressed spring is spread and at the same time the bent end 932a' advances forward to thereby be caught onto the guide groove 914. That is, the end of the fixed arm 932 is bent beforehand and then can be simply inserted into the elongated hole 912 formed in the radial direction, thereby enabling a simple and easy fixing of torsion springs in the miniaturized sliding shutter structure, as compared with the conventional way. In the conventional method, a fixed arm is inserted into a circular connection hole having a diameter slightly larger than that of the fixed arm (iron wire) and then its end portion is bent from the behind and fixed. In particular, in this connection structure, the elongated hole 912 is formed in the radial direction of rotation and the resilient force of the bend end 932a' acts outwards, so that the fixed arm 932a is biased outwards inside the elongated hole 912 and thus always closely contacted against the outermost inner wall of the elongated hole 912. Also, the fixed arm 932a is inserted so as not to be wobbled in the widthwise direction, so that friction can be minimized when the fixed arm 932a turns and thus the friction noise can be reduced. Furthermore, since the bent end 932a' is not wobbled in the connection area and turns at its own position in a stable manner, thereby extending the service life thereof, due to reduction in load and fatigue when in use.

Figure 35:
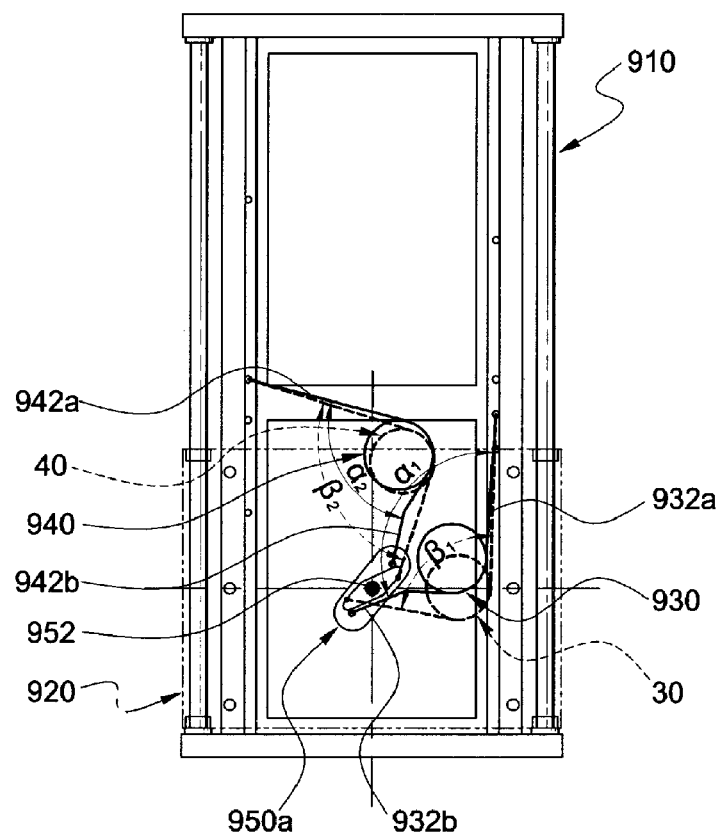
FIGS. 35 to 37 show a motion trajectory of torsion springs in two different embodiments of the present invention.
Figure 36:
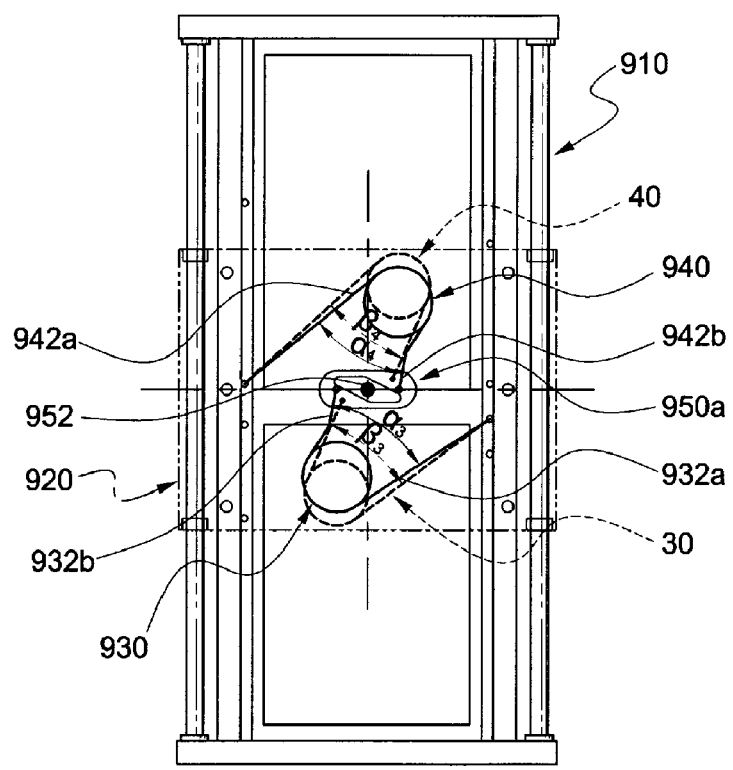
Figure 37:
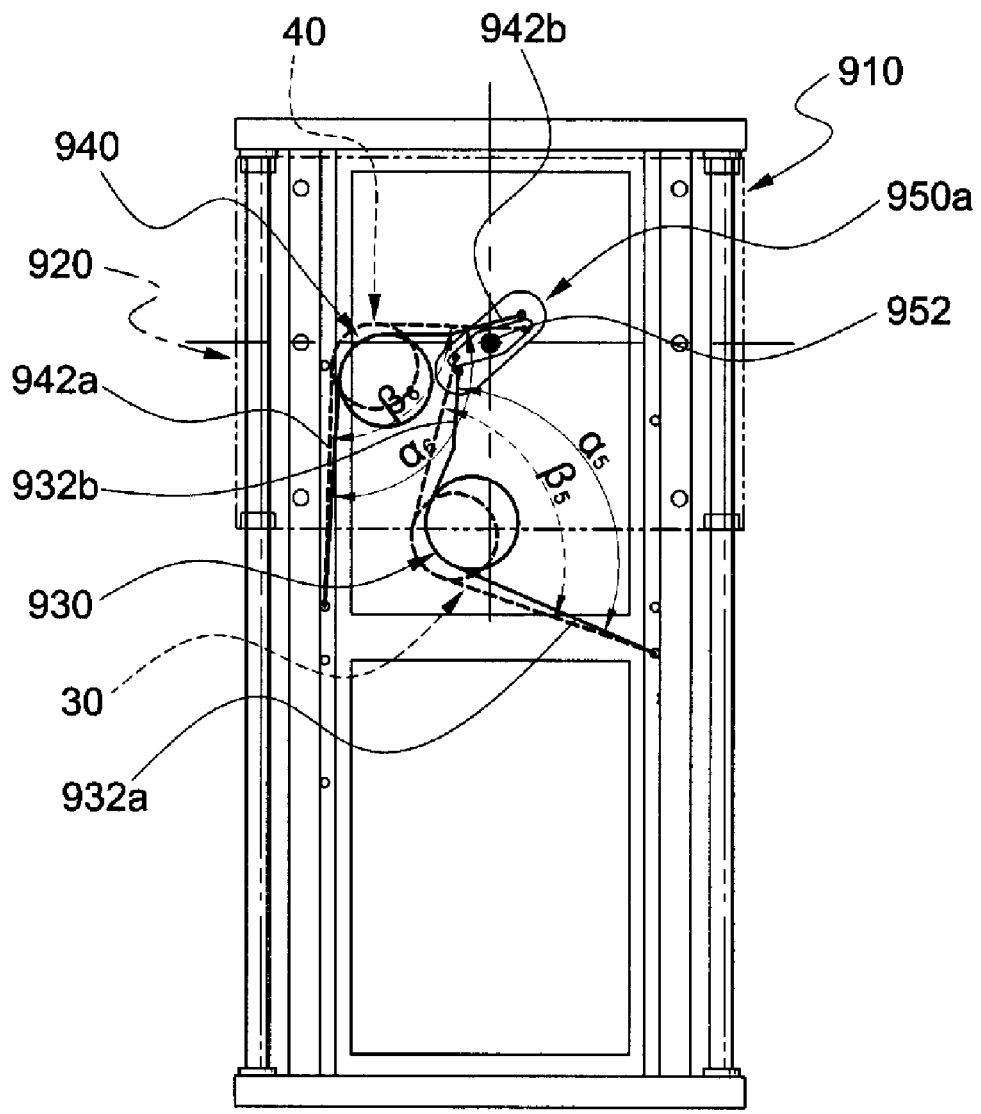

FIGS. 35 to 37 show a motion trajectory of torsion springs in two different modes of the present invention, where the solid line indicates a first mode having a variable link and the dot line indicates a second mode without having a variable link. In the figures, assuming that the first and second modes of the invention employ torsion springs having a same spring force, the trajectories at the lowermost, middle, and uppermost state only are illustrated. Here, the angle of uncompressed spring is 130 degrees and the angle of maximally compressed spring is 20 degrees. When the slider member slides on the guide member, the trajectories of the first and second torsion springs are shown in FIGS. 35 to 37 and the resultant compression angle is summarized in the following table.

TABLE 1

Torsion spring angles in the first and second mode of the invention

| First mode | | Second mode | |
|---|---|---|---|
| a1 | 110° | b1 | 95° |
| a2 | 130° | b2 | 120° |
| a3 | 65° | b3 | 45° |
| a4 | 65° | b4 | 45° |

TABLE 1-continued

Torsion spring angles in the first and second mode of the invention

| First mode | | Second mode | |
|---|---|---|---|
| a5 | 130° | b5 | 120° |
| a6 | 120° | b6 | 115° |

In the above table, a1, a3, a5 indicate an angle between the fixed arm 932a and the variable arm 932b of the first torsion spring 930 at the lowermost, middle, uppermost position thereof and its value is 110, 65, and 130 degrees respectively. It means that the angle between the arms is variable within 65 degrees. In addition, a2, a4, a6 indicate an angle between the fixed arm 942a and the variable arm 942b of the second torsion spring 940 at the lowermost, middle, uppermost position thereof and its value is 130, 65, and 120 degrees respectively. It means that the angle between the arms is variable within 65 degrees, which is the maximum operation angle.

In contrast, in case of the second mode, the angle b1, b3, b5 of the first torsion spring 30 at the lowermost, middle, uppermost position is 95, 45, and 120 degrees respectively, and it is operated within 75 degrees of maximum operation angle. Similarly, the angle b2, b4, b6 of the first torsion spring 40 at the lowermost, middle, uppermost position is 120, 45, and 115 degrees respectively, and it is operated within 75 degrees of maximum operation angle.

As described above, in the first mode of the invention, the first torsion spring 930 has a maximum 65 degrees of operation angle. In contrast, the second mode of the invention has a maximum 75 degrees of operation angle, which is 10 degrees more than the present invention. Thus, the second mode causes more fatigue. In case of the second torsion spring 940, 40, the first mode has a maximum 65 degrees of operation angle, but the second mode has a maximum 75 degrees of operation angle, which is 10 degrees more than the first mode and thus leads to more fatigue when in use. In addition, the second one is operated in a wider range of compression angle (120~45 degrees), rather than the first mode (130~65 degrees), based on the original angle of 130 degrees.

Furthermore, the variable link 950 remains tilted at the lowermost position, while sliding, assumes a horizontal level, and remains tilted in the opposite direction at the uppermost position. At this time, the tilting is executed by means of the restoring force and interference of the torsion springs 930, 940. At the lowermost state, the variable arm 932b of the first torsion spring 930 pulls down the left side of the variable link 950 and the variable arm 943b of the second torsion spring 940 pushes up the right side of the variable link 950, thereby biasing the variable link counterclockwise about the link shaft 952. In addition, at the uppermost position, the variable arm 932b of the first torsion spring 930 pulls down the left side of the variable link 950 and the variable arm 942b of the second torsion spring 940 pushes up the right side of the variable link 950, thereby biasing the variable link counterclockwise about the link shaft 952. Therefore, at the lowermost position, the sliding distance is extended downwards by a distance d1, as compared with the second mode having a fixed end. At the uppermost state, the sliding distance is extended upwardly by a distance d2. If the distances d1 and d2 are identical, the first mode of mechanism can extend the sliding distance by twice d1 (or d2), relatively to the second mode mechanism according to the invention. It should be noted that both the above modes are included in the present invention, which solves the prior art problems.

Figure 38:
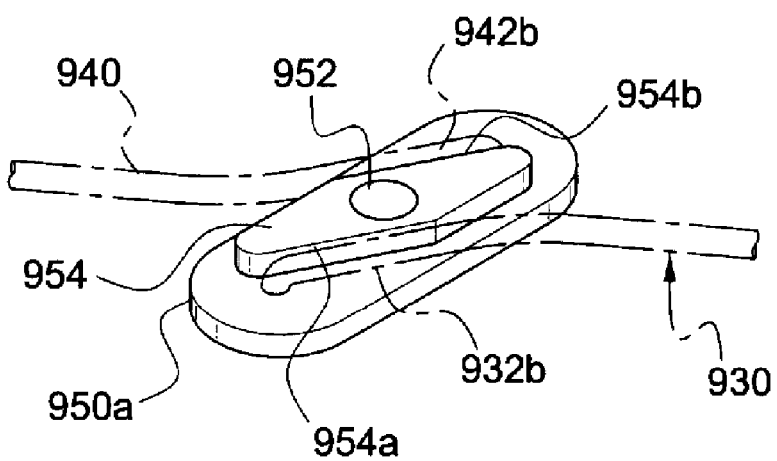
FIG. 38 is a perspective view of a modification of the variable link in FIGS. 30 to 32.

FIG. 38 is a perspective view of a modification of the variable link in FIGS. 30 to 32, and FIGS. 39 and 40 are plan view showing the operation of a sliding mechanism apparatus using the variable link of FIG. 38.

In this embodiment, in the face of the variable link 950a, which faces the variable arms 932b, 942b of the first and second torsion spring 930, 940, is formed a pivot guide projection 954, preferably which enables a more smooth tilting of the variable link 950a at the uppermost position and the lowermost position. The pivot guide projection 954 is provided with a first slant face 954a and a second slant face 954b, which face each other with the link shaft 953 in-between. At the lowermost state, the first slant face 954a is contacted with the variable arm 932b of the first torsion spring 930, thereby pivoting the variable link 950a. At the uppermost position, the second slant face 954b is contacted with the variable arm 942b of the second torsion spring 940, thereby pivoting the variable link 950a.

Figure 39:
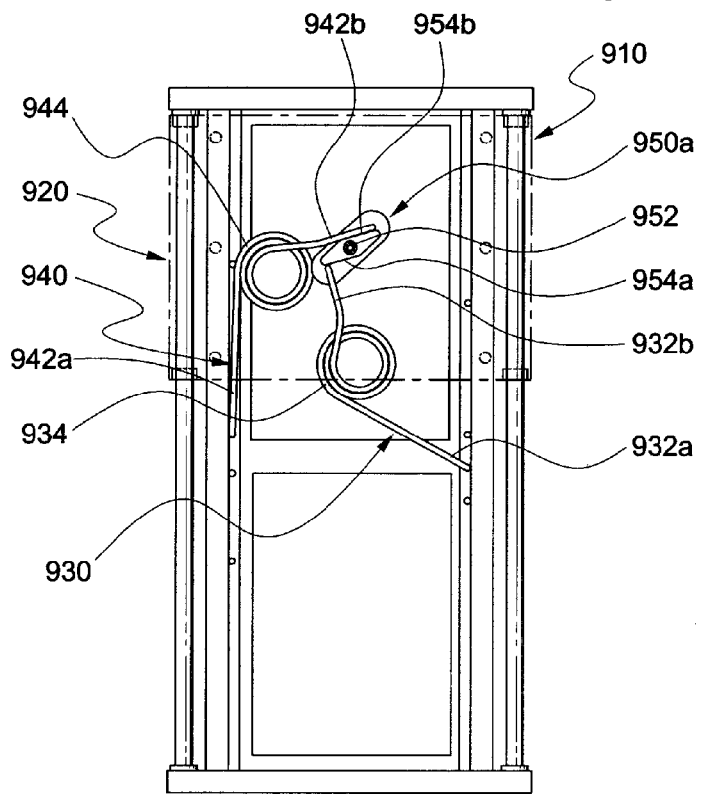
FIGS. 39 and 40 are plan views showing the operation of a sliding mechanism apparatus using the variable link of FIG. 38.
Figure 40:
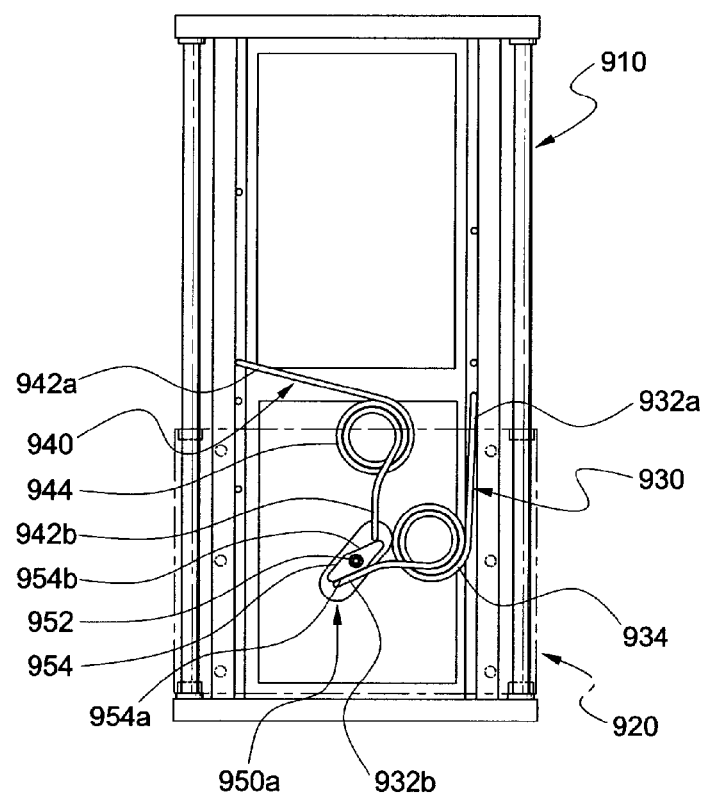

By means of the pivot guide projection 954 having the first slant face 954a and the second slant face 954b, the variable link 950a performs a more reliable and smooth tilting (pivoting) at the uppermost position and the lowermost position. For example, when the slider member 920 slides on the guide member 910 to reach the uppermost position, as shown in FIG. 39, the end portion of the variable 942b of the second torsion spring 940 is turned while pressing the facing second slant face 954b of the pivot guide projection 954, thereby turning the variable link 950a about the link shaft 952. Accordingly, the slider member 920 can come to further slide as much as the variable link 950a is pivoted to extend the sliding distance. On the contrary, when the slider member 920 slides down on the guide member 910 to reach the lowermost state, as shown in FIG. 40, the variable arm 932b of the first torsion spring 930 is turned while pressing the first slant face 954a, thereby pivoting the variable link 950a about the link shaft 952. In this case, similarly, the slider member 920 further slides as much as the variable link 950a is pivoted to extend the sliding distance. The mechanism of the invention extends the sliding distance as much as the variable link 950a is pivoted in the sliding direction, at the uppermost and lowermost state.

Figure 41:
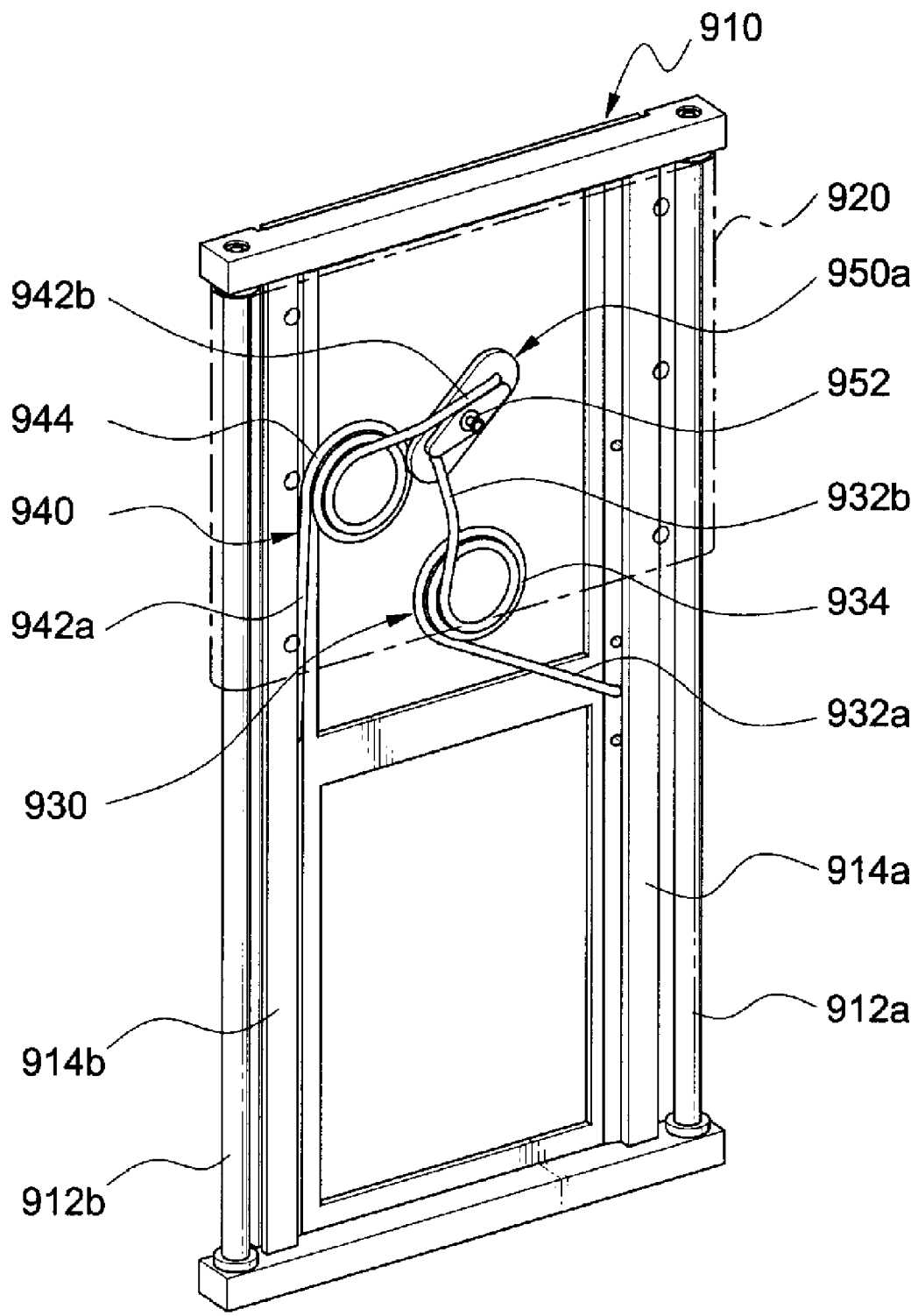
FIGS. 41 and 42 are respectively an assembled and exploded perspective view of a tenth embodiment of the invention shown in FIGS. 35 to 40.
Figure 42:
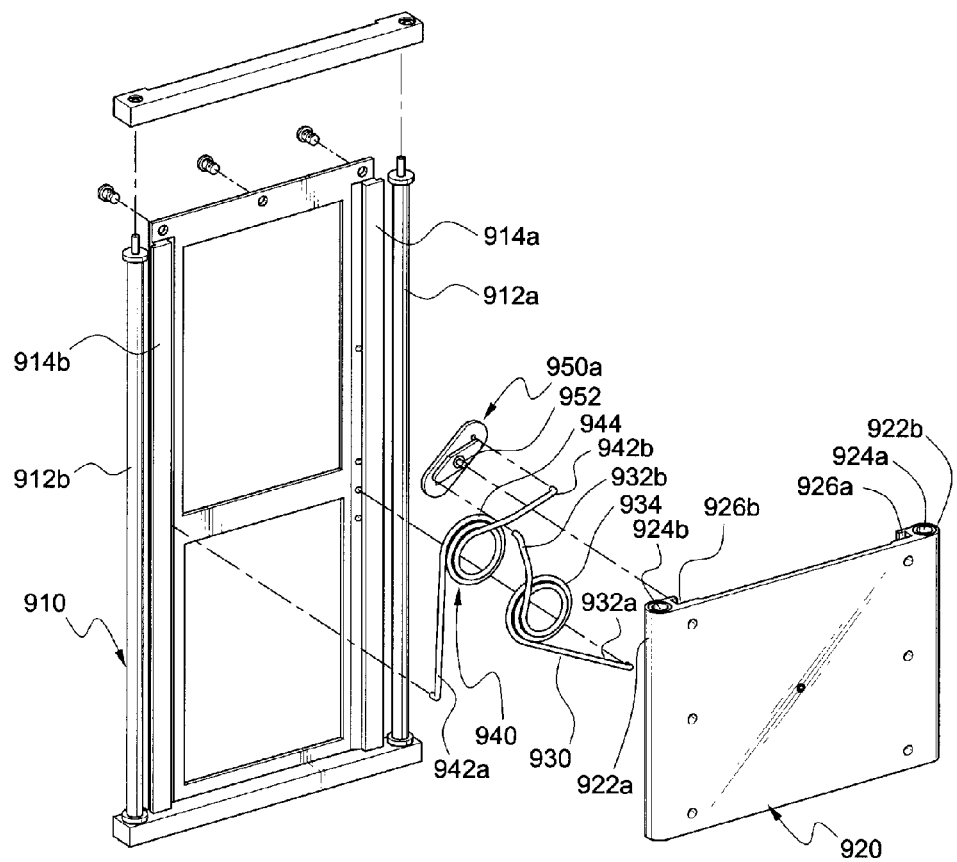

FIGS. 41 and 42 are respectively an assembled and exploded perspective view of the tenth embodiment of the invention shown in FIGS. 35 to 40.

In this embodiment, the guide member 910 is provided with a first and second guide bar 912a, 912b spaced apart from both edges thereof, and a first and second guide dam 914a, 914b formed at both lateral edges thereof. The slider member 920 is provided with coupling hands 922a and 922b at both edges thereof, which are slidably joined with the guide member 910. The coupling hands 922a and 922b are provided with a first and second guide hole 924a, 924b through which the first and second guide bar 912a, 912b passes, and a first and second rail 926a, 926b into which the first and second guide dam 914a, 914b is inserted.

In the above connection configuration of the guide member 910 and the slider member 920, a first and second torsion spring 930, 940 is disposed between the guide member and the slider member such that the operating force can be increased when sliding relative to each other. In the first and second torsion spring 930, 940, one end thereof is pivotably fixed approximately at the middle of both edges of the guide member 910 and the other end thereof is pivotably fixed to the slider member 920 through a variable link 950a.

The variable link 950a is rotatably connected approximately to the central area of the slider member 920 through the link shaft 952, and the variable ends of the first and second torsion spring 930, 940 are coupled to both ends of the variable link 950*a*. The variable link of this embodiment employs the previous variable link 950 or 950*a*, of which structure and operation has been explained above and will not be repeated here.

The first and second torsion spring 930, 940 is comprised of a central coil portion 934, 944 and a pair of straight arms 932*a*, 932*b*, 942*a*, 942*b* extended from the coil portion 934, 944 and forming a certain angle. The end portions of these arms 932*a*, 932*b*, 942*a*, 942*b* are fixed to the guide member 910 and the slider member 920. In particular, the end portion of the arm 932*b*, 942*b* is not directly fixed to the guide member 920, but pivotably coupled thereto through a variable link 950*a*. Therefore, when the slider member 920 slides on the guide member 910 or vice versa, the first and second torsion spring 930, 940 is turned while compressing and expanding, and accordingly, the variable link 950*a* is tilted and returned repeatedly on the slider member 920 within a certain range of angle. Resultantly the sliding distance is lengthened and the halting phenomenon at a dead point can be avoided. The principle thereof has been described above in detail.

Figure 43:
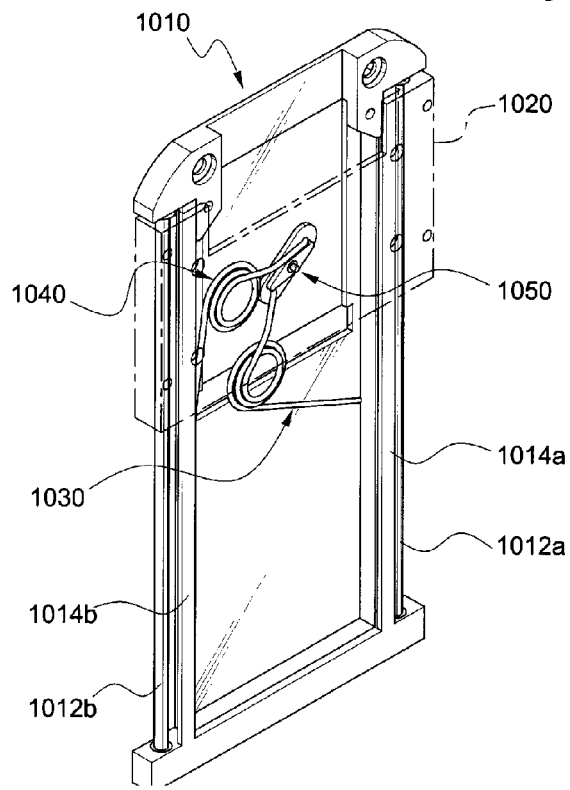
FIGS. 43 and 44 are respectively an assembled and exploded perspective view of a sliding mechanism apparatus according to an eleventh embodiment of the invention.
Figure 44:
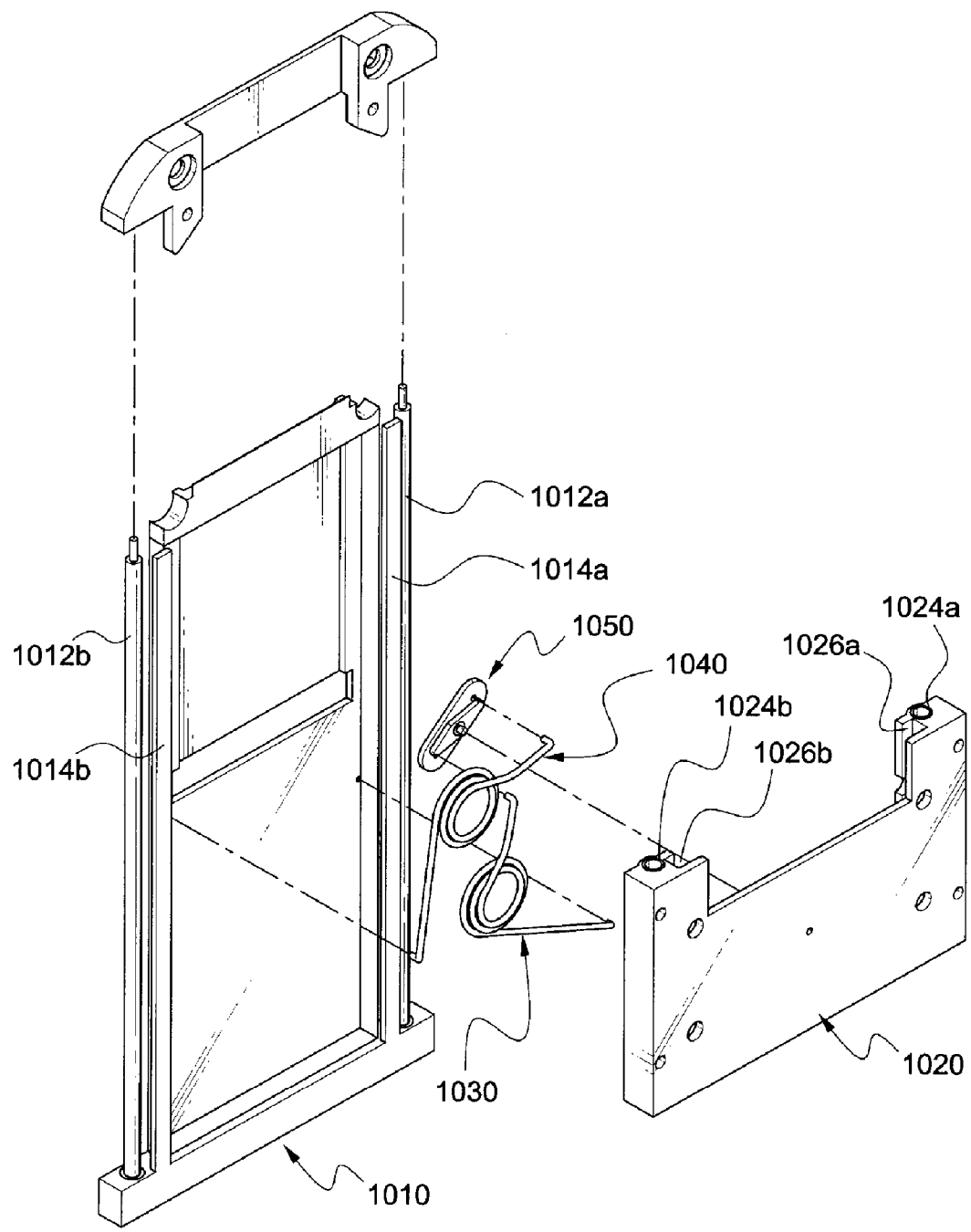

FIGS. 43 and 44 are respectively an assembled and exploded perspective view of a sliding mechanism apparatus according to an eleventh embodiment of the invention.

This embodiment has almost the same structure as in the previous embodiment illustrated in FIGS. 41 and 42. In this embodiment, a first and second guide holes 1024*a*, 1024*b* of the slider member 1020 moves along a first and second guide bar 1012*a*, 1012*b* provided in both sides of the guide member 1010. Additionally, a first and second rail 1026*a*, 1026*b* is guided and moved along a first and second guide dam 1014*a*, 1014*b* of the guide member 1010. At this time, the driving force for sliding is provided through the first and second torsion spring 1030, 1040 and the variable link 1050, which are connected to the guide member 1010 and the slider member 1020 in the same manner as in the previous embodiment. In the sliding mechanism apparatus having the above double-guiding configuration, the first and second torsion spring 1030, 1040, which is a major feature of the invention, may employ a variable link 1050 to provide a variable shaft structure in the same manner as in the previous embodiment. Thus, details thereon will not be repeated here.

Figure 45:
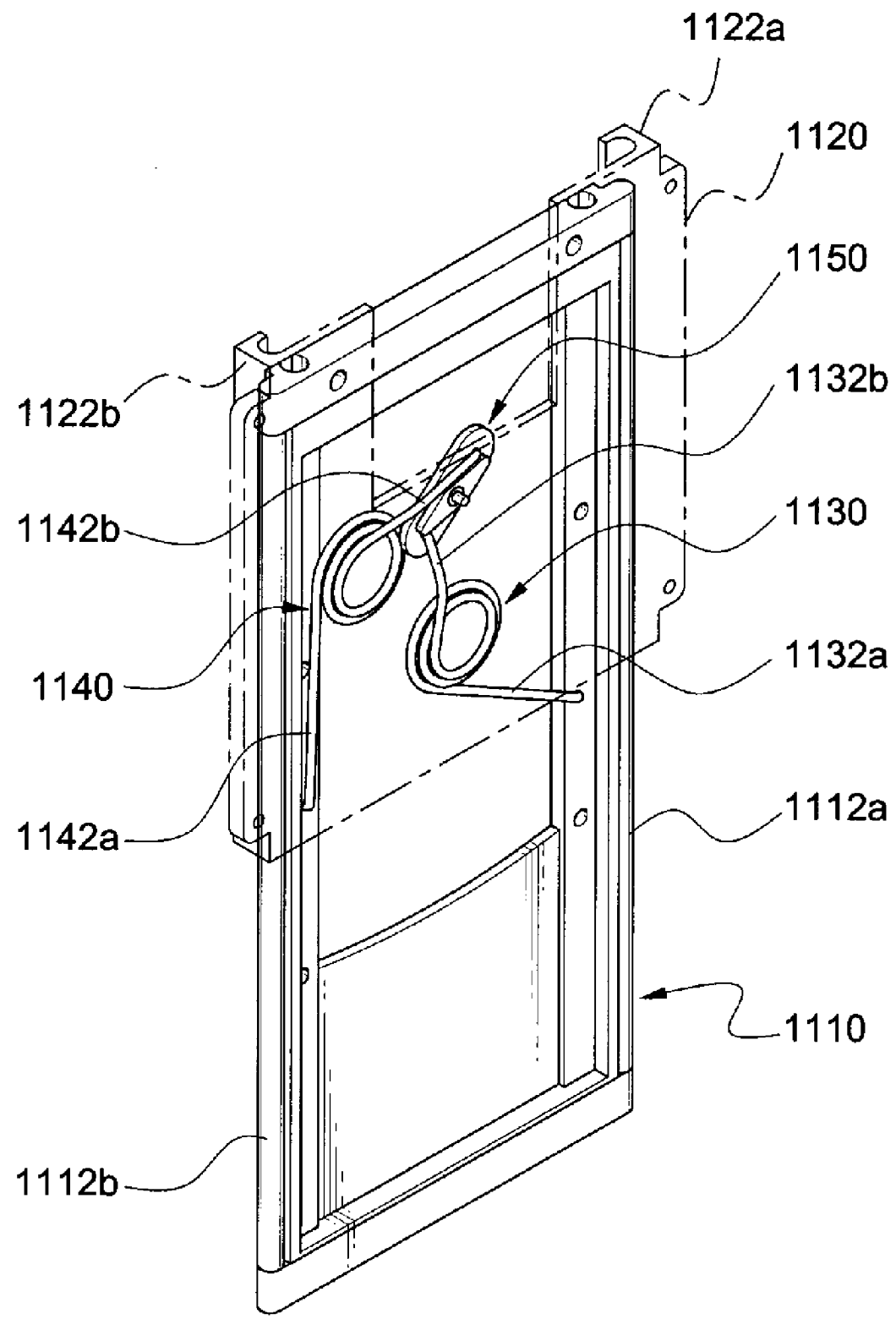
FIGS. 45 and 46 are respectively an assembled and exploded perspective view of a sliding mechanism apparatus according to a twelfth embodiment of the invention.
Figure 46:
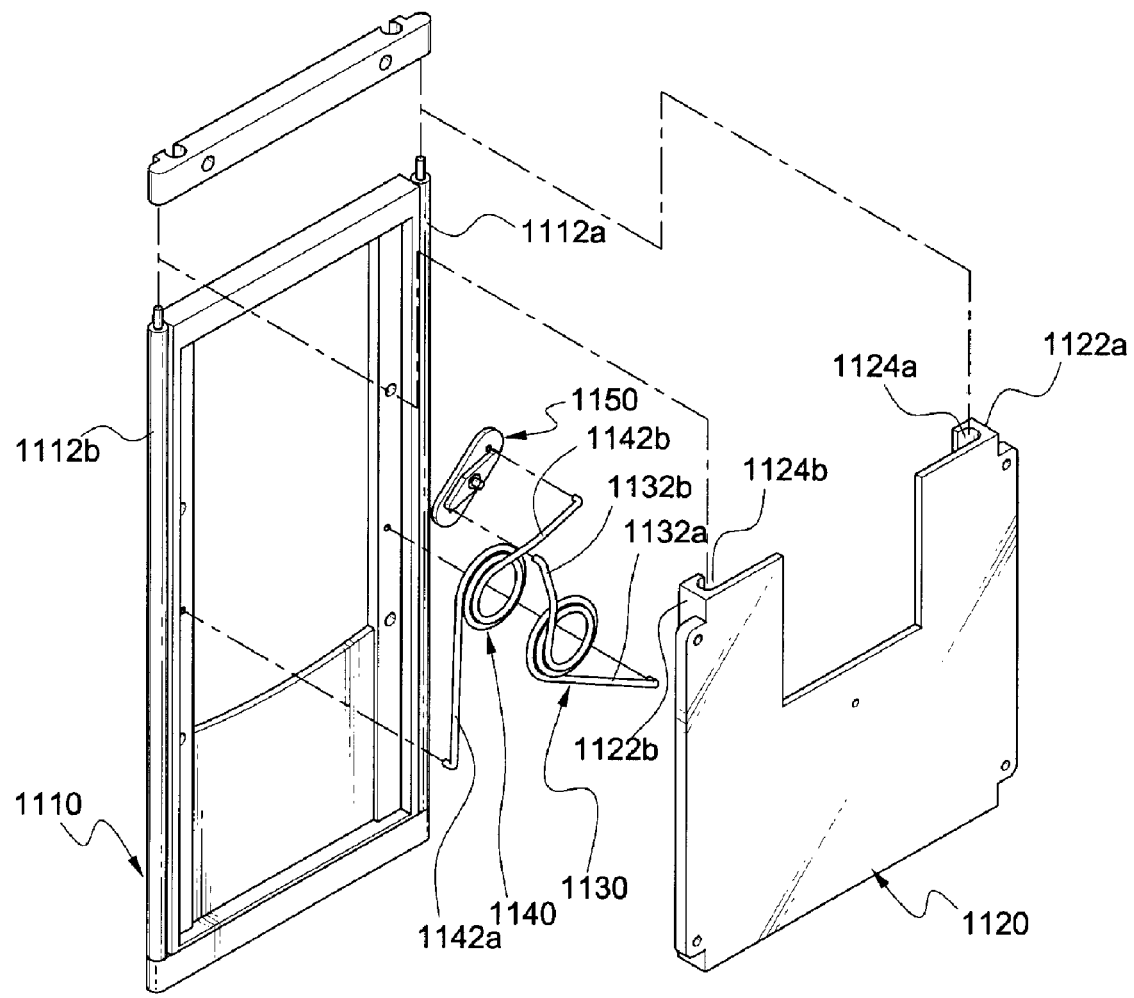

FIGS. 45 and 46 are respectively an assembled and exploded perspective view of a sliding mechanism apparatus according to a twelfth embodiment of the invention.

In this embodiment, a first and second guide bar 112*a*, 112*b* is mounted on both edges of the guide member 1110, and the slider member 1020 is provided with a coupling hand 1122*a*, 1122*b* having a first and second guide hole 1124*a*, 1124*b* formed therein so as to be slidably engaged with the first and second guide bar 1112*a*, 1112*b*. In addition, the fixed arm 1132*a*, 1142*a* of a first and second torsion spring 1130, 1140 is connected to the guide member 1110 so as to rotate about its connection point. The variable arm 1132*b*, 1142*b* thereof is coupled to the slider member 1020 through a variable link 1050 so as to be pivoted while moving the supporting point (pivot axis). In this embodiment, the variable and fixing configuration of the torsion springs 1130 and 1140, which constitutes the major feature of the invention, employs the principles of FIGS. 30 to 32 as they are, excepting the slide-guiding structure. The coupling structure of the fixed end of the torsion springs 1130 and 1140 employs those of FIGS. 33 and 34. These are described above in detail and thus will not be repeated here.

Figure 47:
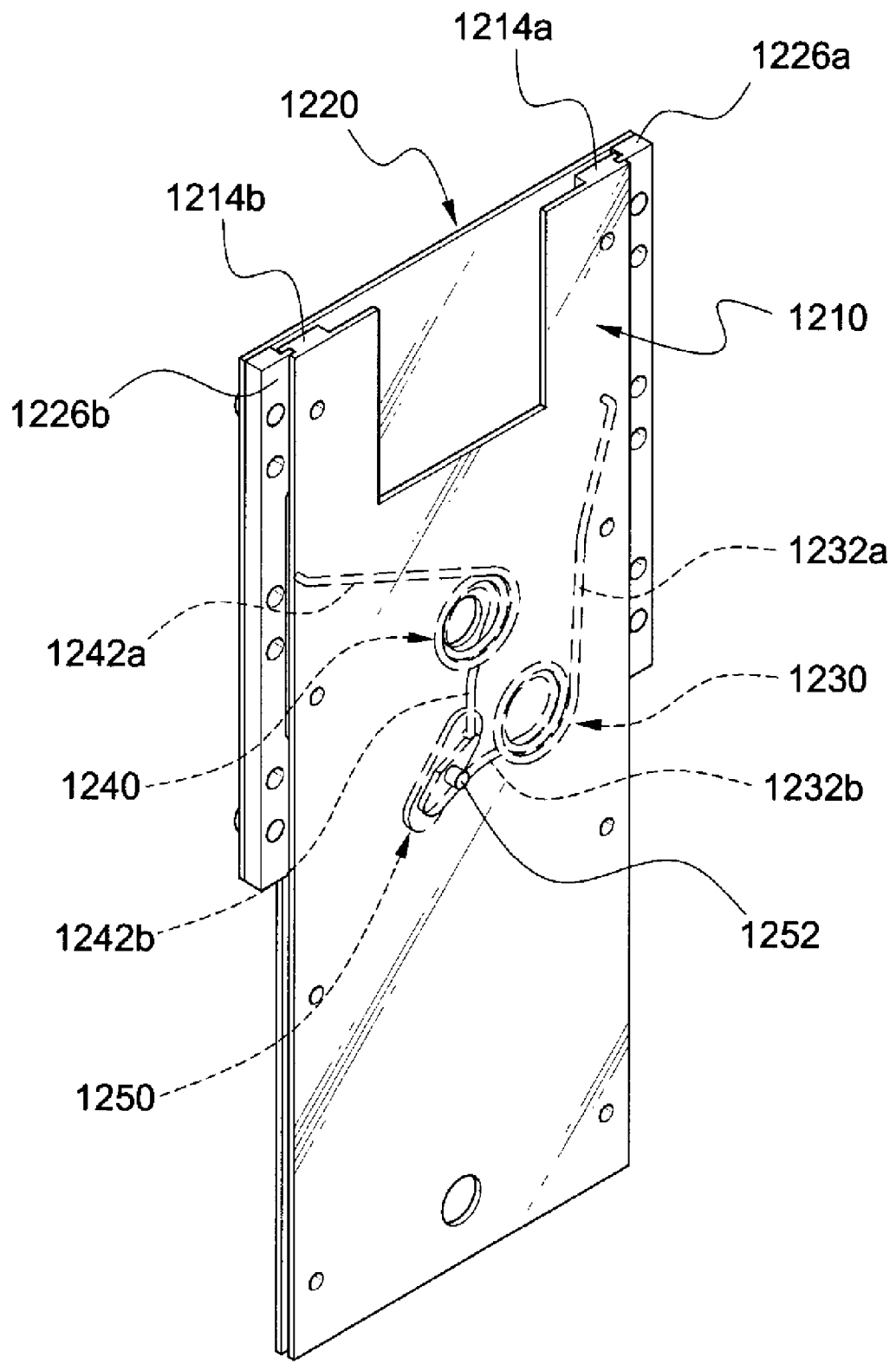
FIGS. 47 and 48 are respectively an assembled and exploded view of a sliding mechanism apparatus according to a thirteenth embodiment of the invention.
Figure 48:
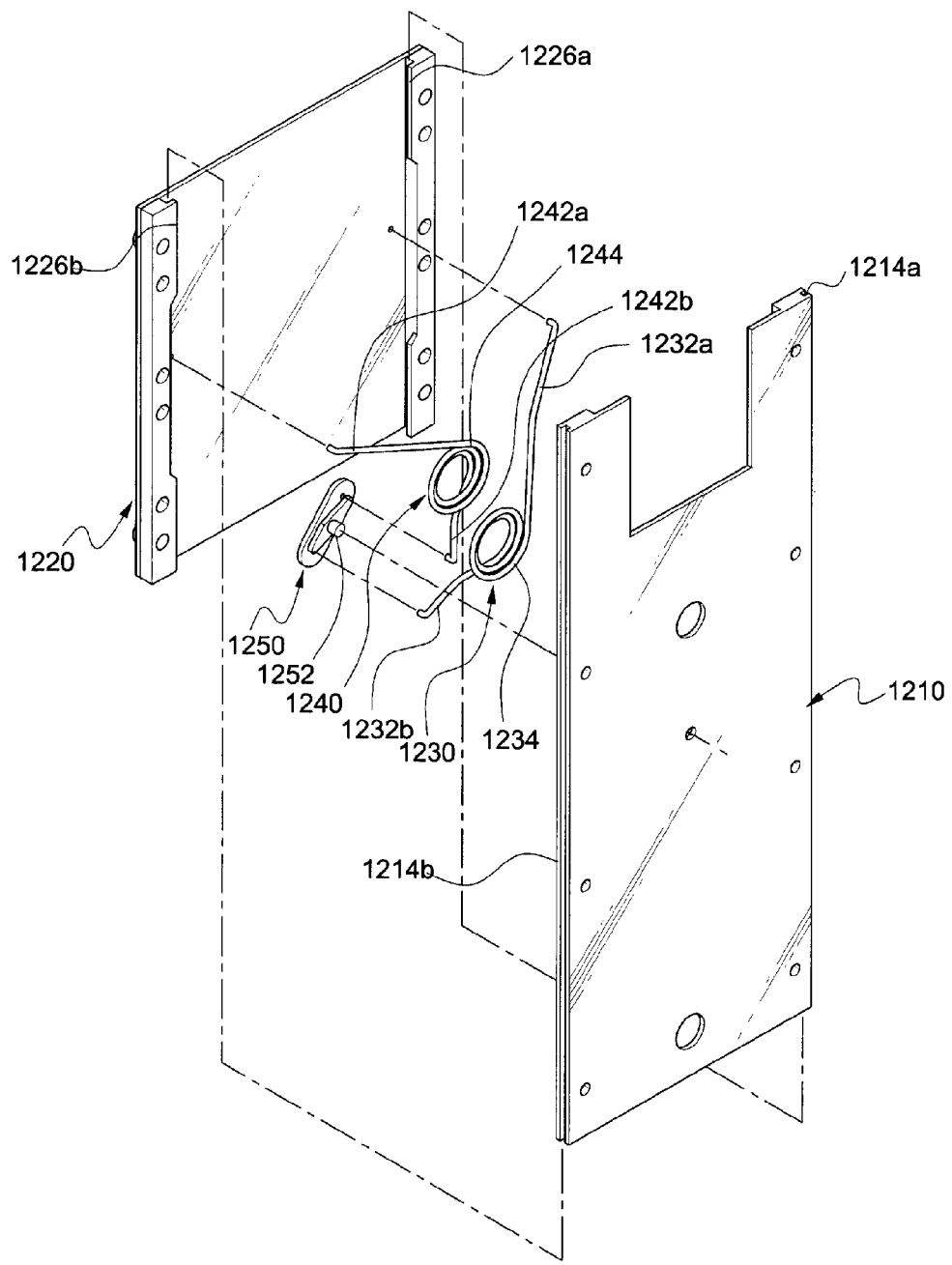

FIGS. 47 and 48 are respectively an assembled and exploded view of a sliding mechanism apparatus according to a thirteenth embodiment of the invention. In this embodiment, the fixed arm and the variable arm of the first and second torsion spring is connected to the slider member and the guide member respectively, the opposite to the previous embodiments. Thus, the variable link is coupled with the guide member.

As illustrated, the variable link 1250 is rotatably fixed approximately to the center of the guide member 1210 through the link shaft 1252. In the first and second torsion spring 1230, 1240, the end portion of the variable arm 1232*b*, 1242*b* is pivotably coupled to both sides of the variable link 1250, and the end portion of the fixed arm 1232*a*, 1242*a* is pivotably connected near the widthwise left and right edge of the slider member 1220. The above construction of this embodiment is operated in the same way as in the previous embodiments. In this embodiment, the arms 1232*a*, 1232*b*, 1242*a*, 1242*b* of the first and second torsion spring 1230, 1240 are connected in the opposite manner to the previous embodiments, and the variable link 1250 is fixed to the guide member 1210. However, the operation and effect therefor are the same as in the previous embodiments and thus will not be described here.

In this embodiment, additionally, the guide member 1210 is provided with a guide dam 1214*a*, 1214*b* having a "⊏" shaped cross-section formed at both edges thereof, and the slider member 1220 is provided with a rail 1226*a*, 1226*b* at both sides thereof so as to be engaged correspondingly with the "⊏" shape guide dam 1214*a*, 1214*b*. In the above structure, the rails 1126*a*, 1226*b* are not formed over the entire section. That is, the rails 1126*a*, 1126*b* are formed in such a way as to be protruded only at both front and rear portions thereof by a certain length, thereby preventing the sliding of the slider member 1210 from being interrupted, even when the guide member 1210 is slightly distorted or bent. Conventionally, an elongated rail is formed in the slider member so as to be protruded over the entire length of both edges thereof and these rails are engaged with the guide member over the entire length thereof. Thus, even in case where the guide member is slightly bent, the sliding of the slider member is interrupted disadvantageously. In the present invention, as described above, the rails 1226*a*, 1226*b* are formed in the front and rear portion of the slider member 1220, and thus the slider member 1220 comes to be engaged, only at the upper and lower portions thereof, with the guide member 1210, thereby enabling a smooth sliding, even when the guide member 1210 is slightly bent.

Figure 49:
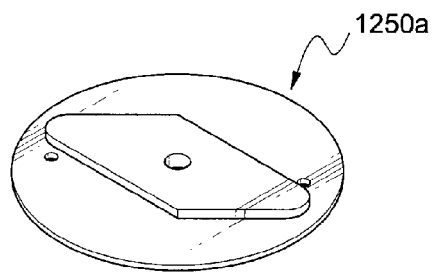
FIG. 49 is a perspective view of another embodiment of the variable link according to the invention.

FIG. 49 is a perspective view of another embodiment of the variable link according to the invention. The variable link is preferred to have a straight form, i.e., a rectangular shape, but may have various other forms. For example, FIG. 49 illustrates a variable link 1250*a* having the shape of a circular disk, and a first and second torsion spring is coupled to both sides of the circular variable link 1250*a*, with a center placed in-between.

The variable link may have the form of a lozenge, a square, an oval, or the like, along with the above circular shape or straight form.

Figure 50:
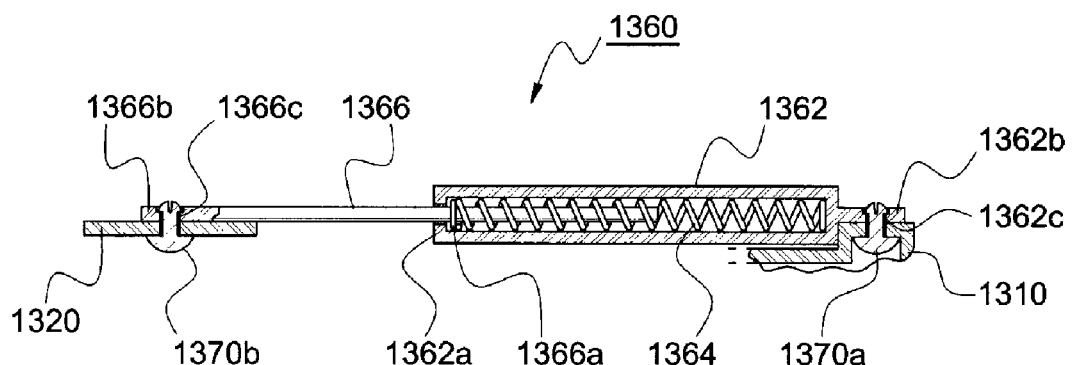
FIG. 50 is a cross-section showing a cylinder-type spring, which can replace the torsion spring illustrated previously.
Figure 51:
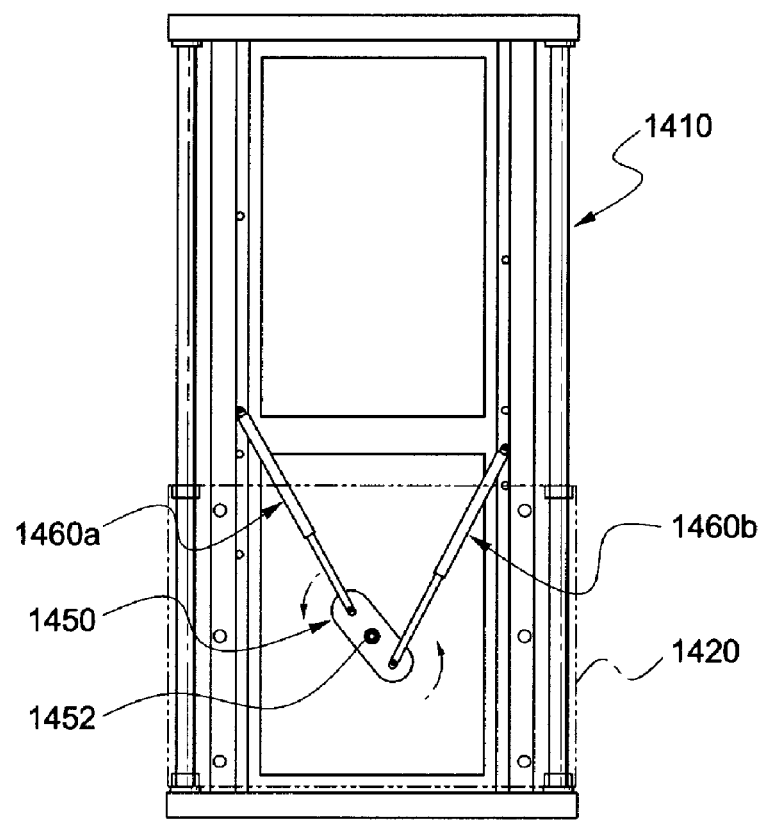
FIGS. 51 and 52 illustrate sliding mechanism apparatus according to another embodiment of the invention, where the cylinder-type spring of FIG. 50 is applied.
Figure 52:
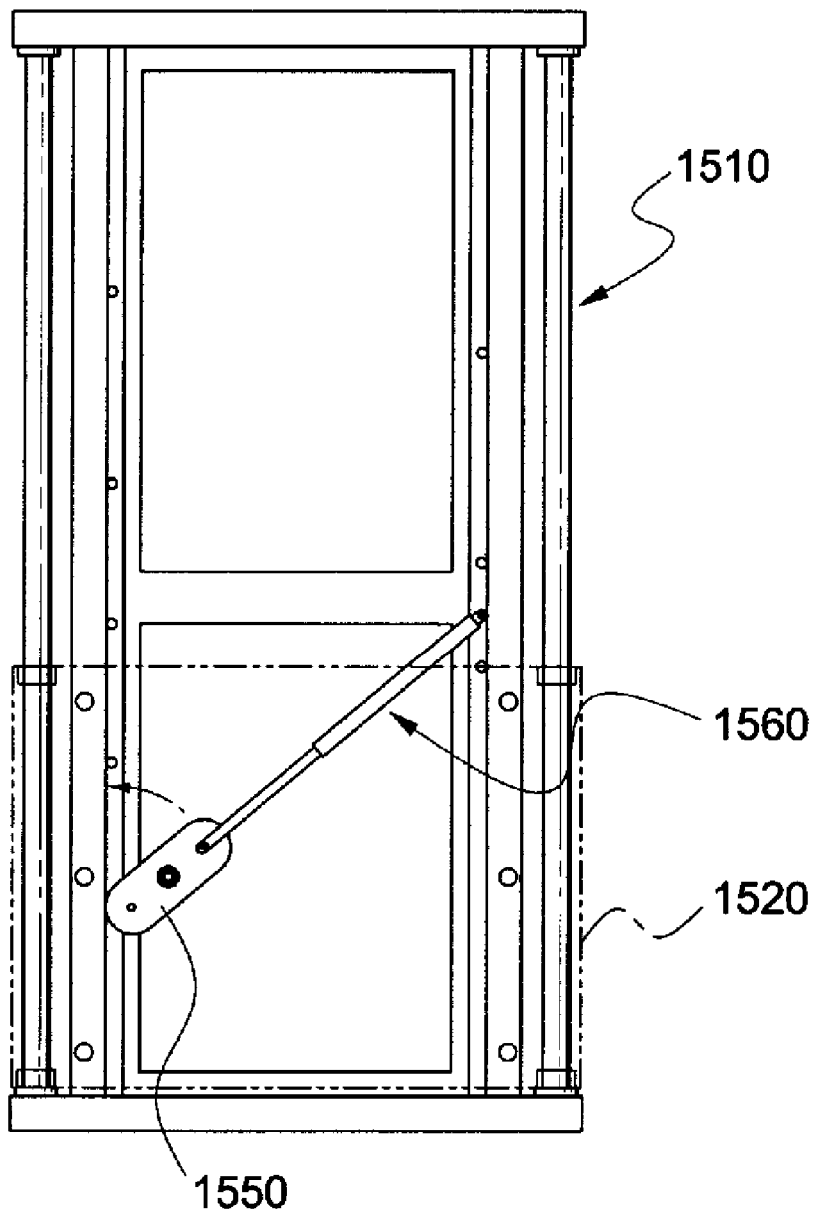

FIG. 50 is a cross-section showing a cylinder-type spring, which can replace the torsion spring illustrated previously. FIGS. 51 and 52 illustrate sliding mechanism apparatus according to another embodiment of the invention, where the cylinder-type spring of FIG. 50 is applied. In particular, as shown in FIG. 51, two cylinder-type springs may be applied to the left and right of the mechanism, and a single cylinder-type spring may be employed, as shown in FIG. 52.

In stead of the torsion spring as illustrated above, a cylinder-type spring of FIG. 50 may be employed. As shown in FIG. 50, the cylinder-type spring 1360 is comprised of a cylinder 1362 having an opening 1362*a* at one end thereof, a coil spring 1364 received inside the cylinder 1362, and a rod 1366 inserted into the coil spring 1364 in such a way that part of the rod 1366 is protruded to the outside through the opening 1362*a*. In particular, in the surface of the rod 1366 is formed a latching projection 1366*a* such that one end of the coil spring 1364 is caught by the latching projection 1366*a* and the other end thereof is restricted by the closed end of the cylinder 1362, thereby providing a restoring force of the spring when the rod 1366 is retracted. In addition, preferably the latching projection 1366*a* of the rod 1366 is designed such that it is restricted by an opening 1362*a* side projection to thereby prevent the rod 1366 from being released from the cylinder 1362. Furthermore, a fixing portion 1362*b*, 1366*b* is provided respectively at one end of the cylinder 1362 and the opposite side end of the rod. In the fixing portions 1362*b* and 1366*b* is formed fixing hole 1362*c*, 1366*c* respectively. These fixing holes 1362*c*, 1366*c* are engaged with fixing plates 1370*a*, 1370*b* of the slider member 1320 and the guide member 1360 such that the cylinder-type spring 1360 is pivotably combined therewith.

The first and second torsion spring in the previous embodiment can be replaced by the above described cylinder-type spring. That is, as illustrated in FIG. 51, a first and second cylinder-type spring 1460*a*, 1460*b* may be coupled to the slider member 1420 and the guide member 1410 in the same positions as in case of the torsion springs and according to the connection method as shown in FIG. 50. At this time, one end of the first and second cylinder-type spring 1460*a*, 1460*b* is pivotably connected to both sides of a variable link 1452. Here, the first cylinder-type spring 1460*a* connected to the left side of the guide member 1410 is connected to the left side of the link shaft 1452 in the variable link 1450 so as to be movable within the left half area of the slider member 1420. The second cylinder-type spring 1460*b* connected to the left side of the guide member 1410 is coupled to the right side of the link shaft 1452 in the variable link 1450 so as to be movable within the right half area of the slider member 1420. In this way, a pivotable variable link 1450 is employed to thereby extend the moving range of the cylinder-type spring. Needless to say, one end of the first and second cylinder-type spring may be pivotably connected to the slider member directly, without using a variable link.

In another embodiment, a single piece of cylinder-type spring 1560 is employed. That is, as shown in FIG. 52, the cylinder-type spring 1560 can be combined with the slider member 1520 and the guide member 1510 through a variable link 1550 so as to be operated in the same way. In case where a single cylinder-type spring 1560 is employed, it may be coupled directly to the guide member 1510 or the slider member 1520, without any intermediate variable link 1550.

As described above, the duel type using two cylinder-type springs as shown in FIG. 51 and the mono-type using a single cylinder-type spring as shown in FIG. 52, they are all operated in the same manner as in the previous embodiments, by means of the variable link. The operation thereof will not be described here. However, the torsion spring generates the operational force by means of the compression and expansion between the two arms thereof, in contrast, the cylinder-type spring provides the operational force by means of the retraction and expansion of the rod into and from the cylinder.

Figure 53:
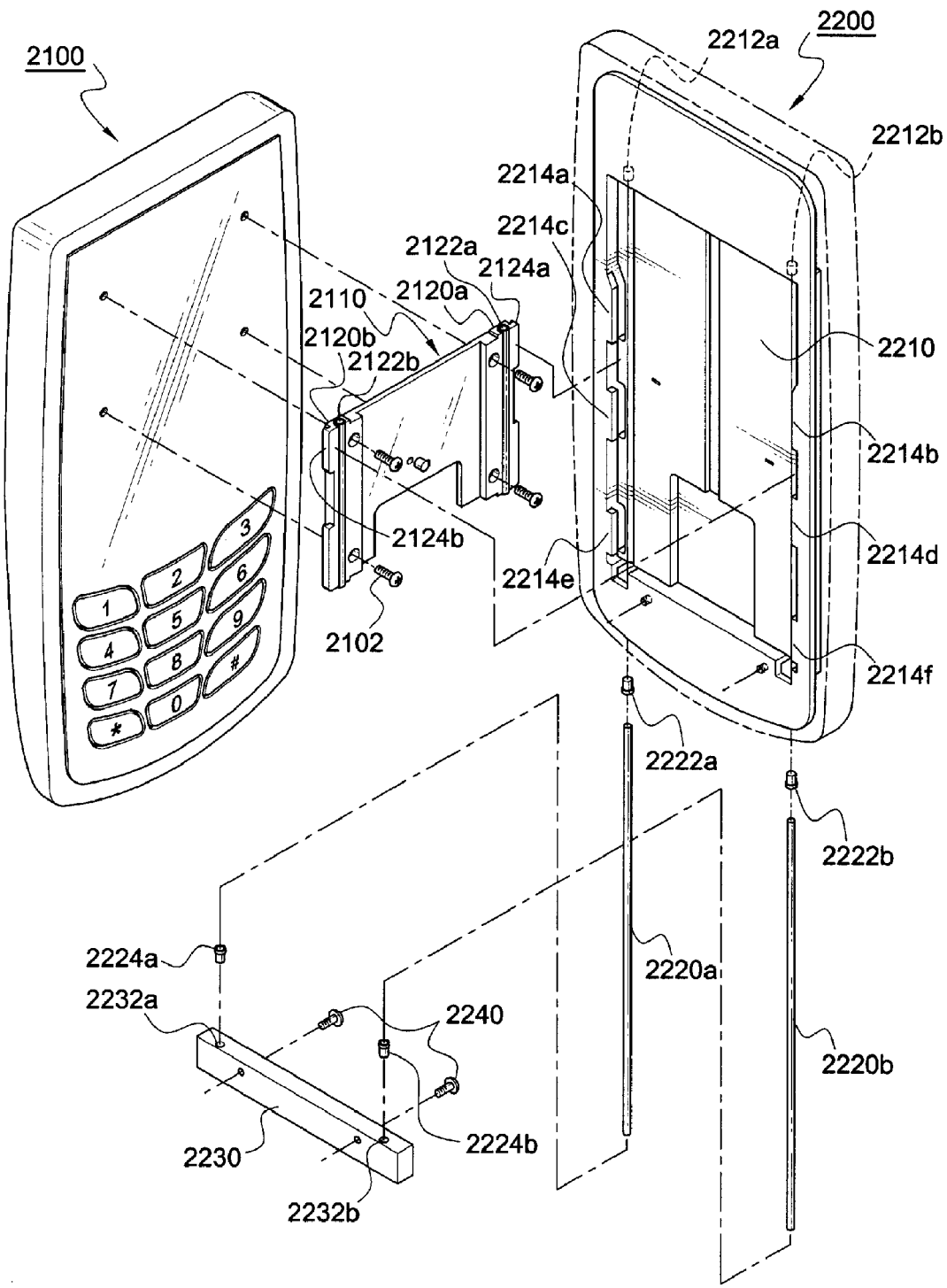
FIG. 53 is an exploded perspective view of an appliance integrated with a sliding mechanism apparatus according to a fourteenth embodiment of the invention.
Figure 54:
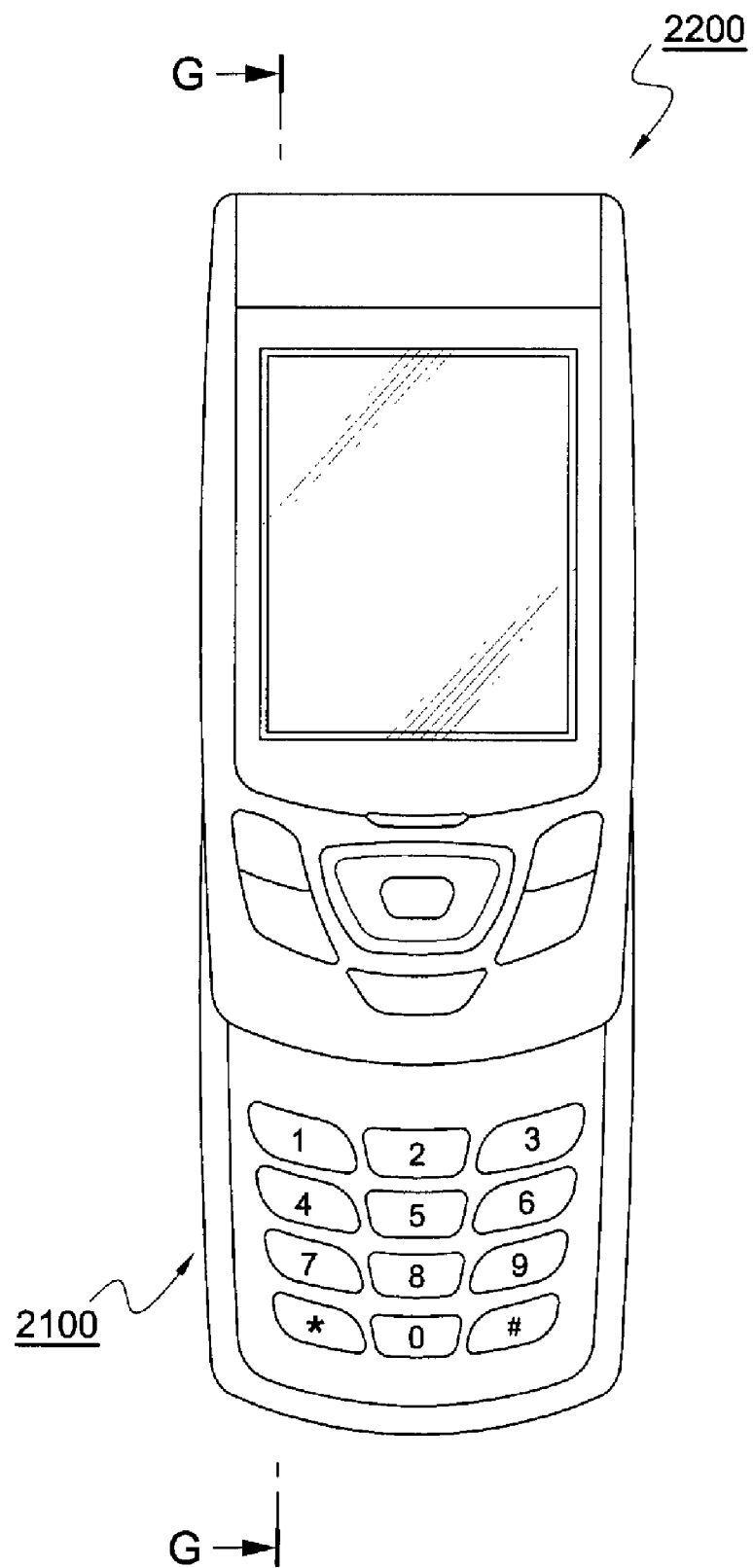
FIG. 54 is a front view of the assembled appliance of FIG. 53.
Figure 55:
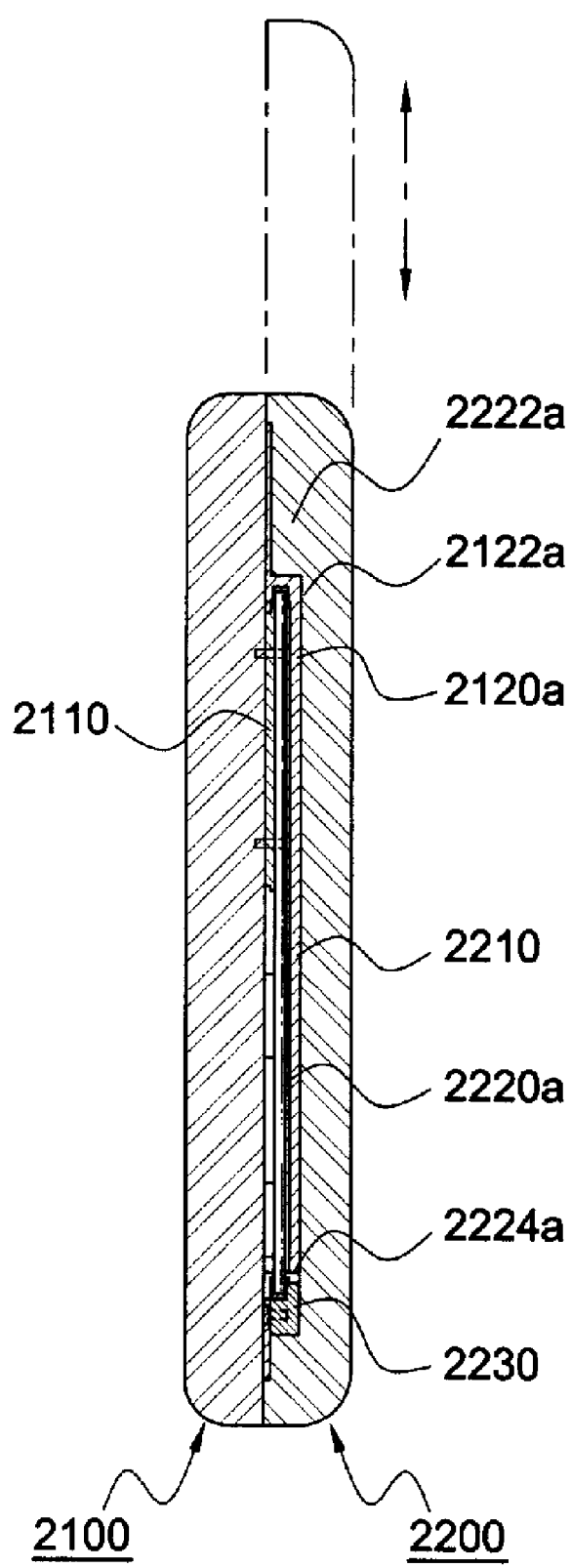
FIG. 55 is a cross-section taken along the line G-G in FIG. 54.

FIG. 53 is an exploded perspective view of an appliance integrated with a sliding mechanism apparatus according to a fourteenth embodiment of the invention. FIG. 54 is a front view of the assembled appliance of FIG. 53, and FIG. 55 is a cross-section taken along the line G-G in FIG. 54. This example illustrates a slider-type cellular phone as the appliance, and a sliding mechanism apparatus using a guide bar is integrated with the slider-type cellular phone.

As previously mentioned, a cellular phone is comprised of a main body 2100 and a cover 2200 mounted above the main body 2100 and sliding thereon. In order for the cover 2200 to be slid on the main body 2100, a sliding mechanism is installed between the cover 2200 and the main body 2100. This is, in this embodiment, a guide rail structure is formed in the rear face of the cover 220. A slider structure to be slid on the guide rail structure is formed in the upper portion of the front face of the main body 2100, which faces the rear face of the cover 2200. In the above guide rail structure, most of their elements are formed integrally in the rear face of the cover 2200. The slider structure in the main body 2100 is formed of a separate plate material and mounted on the upper portion of the front face of the main body 2100.

More specifically, in the rear face of the cover 2200 is provided a sliding space 2210, in which the slide structure of the main body 2100 is accommodated so as to enable to slide in the sliding direction. The sliding space 2210 formed to be depressed in the rear face of the cover 2200 is designed, considering a sliding distance in the sliding direction. Inside the sliding space 2210, a pair of guide bars 2220*a*, 2220*b* is mounted adjacent to the right and left side wall thereof. In order to fix the guide bars 2220*a*, 2220*b* to the cover 2200, one end of the guide bar 2220*a*, 2220*b* is inserted into a fixing hole 2212*a*, 2212*b*, which is formed in the rear face of the cover so as to be opened towards the inside of the sliding space 2210. The other end of the guide bar 2220*a*, 2220*b* is inserted into a fixing hole 2232*a*, 2232*b* formed in a gripping plate 2230, which is then attached to the upper end portion of the sliding space 2210 and fixed using a bolt 2240 or the like. At this time, both ends of the guide bar 2220*a*, 2220*b* is covered with a rubber packing 2222*a*, 222*b*, 2224*a*, 2224*b* and inserted and fixed into the fixing hole 2212*a*, 2212*b*, 2232*a*, 2232*b*. Alternatively, the guide bars 2220*a* and 2220*b* may be inserted directly into the fixing holes 2212*a*, 2212*b*, 2232*a*, 2232*b* without the rubber packing. The former case is more preferable in order to compensate for an assembling clearance and provide a buffering force when sliding. Needless to say, in case where the fixing holes 2212*a* and 2212*b* is formed in the lower portion of the sliding space and the gripping plate 2230 is constructed in the upper portion of the sliding space, the same operation and effects can be achieved, as in the above describe guide rail structure.

The front face of the main body 2100, which corresponds to the sliding space in the rear face of the cover 2200, is provided with a sliding structure, where the guide rail structure slides. The sliding structure is formed of a slider member 2110 fabricated separately from the main body 2100. This slider member 2110 is fixed to the upper portion of the front face of the main body 2100 by means of a bolt 2102. The slider member 2110 is provided with a pair of left and right coupling hands 2120*a*, 2120*b* in the sliding direction. In the coupling hands 2120*a* and 2120*b* is formed a guide hole 2122*a*, 2122*b* along the sliding direction, into which the left and right guide bar 2220*a*, 2220*b* mounted in the rear face of the cover 2200 is inserted respectively. Alternatively, the above sliding structure may be constructed integrally with the main body 2100, which will be hereinafter detailed, in conjunction with FIG. 56.

In addition, according to the invention, a rail guide structure is provided, along with the above guide bar structure. More specifically, in the sliding space 2210 in the rear face of the cover 2200, a guide rail 2214a to 2214f is formed in the left and right side wall of the sliding space 2210 in such a way to be protruded inwards of the sliding space 2210. Correspondingly, in the coupling hands 2120a and 2120b of the main body 2100, which is to be accommodated into the sliding space of the cover 2200, is formed a guide dam 2124a to 2124b in the outer lateral face thereof so as to be engaged with the guide rails 2214a to 2214f. As shown in FIG. 53, the guide rails 2214a to 2214f are divided into an upper portion, an intermediate portion, and a lower portion along the sliding direction. In particular, the spacing between the guide rails 2214a to 2214f is configured such that a guide dams 2124a and 2124b to be engaged with the guide dams 2124a, 2124b can be inserted into the sliding space 2210 from the front side thereof. As above, the guide rail 2214a to 2214f is provided in the upper, intermediate and lower side of the sliding space 2210 to thereby strengthen the retention between the main body and the cover 2200 in the uppermost and lowermost static positions. More clearly, when the cover 2200 is placed in the lowermost position, i.e., the cover 2200 covers the main body 2100, the upper guide rail 2214a, 2214b descends to thereby be engaged with the guide dam 2124a, 2124b of the coupling hand 2120a, 2120b, thereby strengthening the retention force between the main body 2100 and the cover 2200 and preventing them from being released from each other, due to an external impact or the like. When the cover 2200 is placed in the uppermost position, i.e., the cover 2200 is slid upwards to open the main body 2100, the lower guide rail 2214e, 2214f ascends to thereby be engaged with the guide dam 2124a, 2124b of the coupling hand 2120a, 2120b, thereby reinforcing the retention force between the main body 2100 and the cover 2200. When in use, usually the cover 2200 of a cellular phone remains in the uppermost position or the lowermost position, and thus only if the guide rail 2214a to 2214f is constructed at the above two places, the retention force can be strengthened. Alternatively, the guide rail may be formed, in multiple pieces, at regular intervals along the sliding direction, or may be formed in a continuous form so as to be protruded along the sliding direction. As described above, preferably, the guide bar and the guide rail are employed together as a sliding and guiding structure in order to guarantee a linear and straightened movement when sliding.

In this embodiment, the sliding space 2210 is formed in a single piece of space to thereby accommodate the pair of coupling hands 2120a, 2120b together. However, the sliding space 2210 may be structured in the form of two separate straight grooves so as to accommodate the coupling hand 2120a, 2120b individually. Furthermore, the guide dam 2124a, 2124b may be formed in the coupling hand 2120a, 2120b in such a way to be protruded inwards thereof, and the guide rail 2214a to 2214f may be formed inside the sliding space 2210 so as to be engage with the inwardly protruded guide dam.

Figure 56:
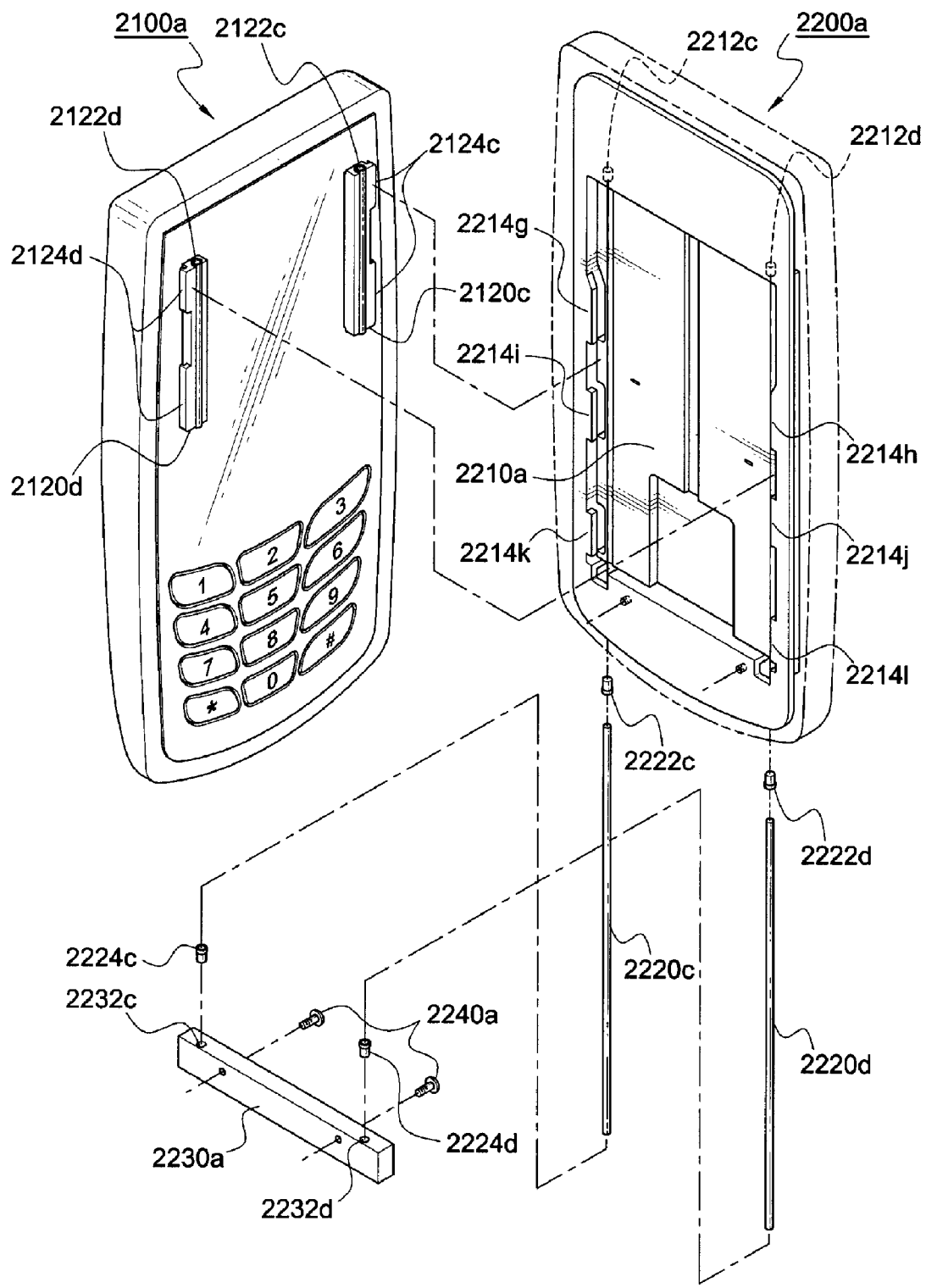
FIG. 56 is an exploded perspective view of an appliance according to another embodiment of the invention, where a guide bar sliding mechanism is applied.
Figure 57:
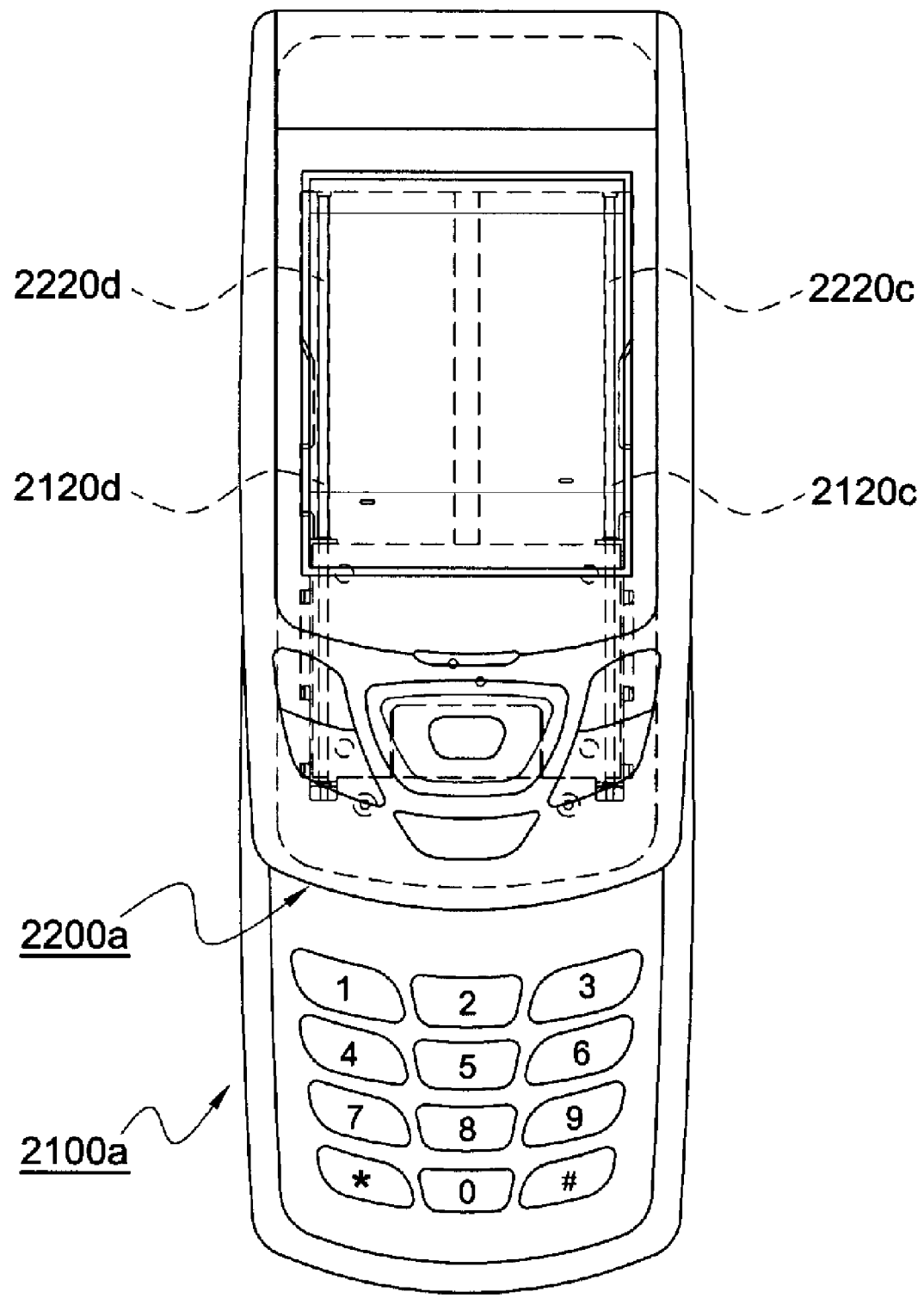
FIG. 57 is a front view of the assembled device of FIG. 56, showing the sliding mechanism schematically.

FIG. 56 is an exploded perspective view of an appliance according to another embodiment of the invention, where a guide bar sliding mechanism is applied. FIG. 57 is a front view of the assembled device of FIG. 56, schematically showing the sliding mechanism.

In the sliding mechanism of this embodiment, the guide bar is structured and operated in the same manner as those described in connection with FIGS. 53 to 55, and details thereon will not be repeated here.

In this embodiment, the slider structure itself is formed integrally with the main body 2100a, dissimilar to the separate slider member in the previous embodiment, thereby simplifying the structure of a cellular phone and improving the assembling efficiency. In this integral construction, a pair of coupling hands 2120c and 2120d is provided in the front face of the main body 2100a in such a way to be protruded from both sides of the upper portion thereof. The coupling hands 2120c and 2120d are structured and shaped in the same way as in the previous embodiment.

In this embodiment, the rail guide structure may be omitted and only the guide bar 2220c, 2220d and the guide hole 2122c, 2122d may be used to achieve an accurate sliding motion. That is, the guide rail 2214g to 2214l and the guide dam 2124c, 2124d can be removed, without causing any operational hitch. If the rail guide structure is added, a more precision and stable operation can be guaranteed, but it may lead to a rather complicated manufacturing die and assembling work.

Figure 58:
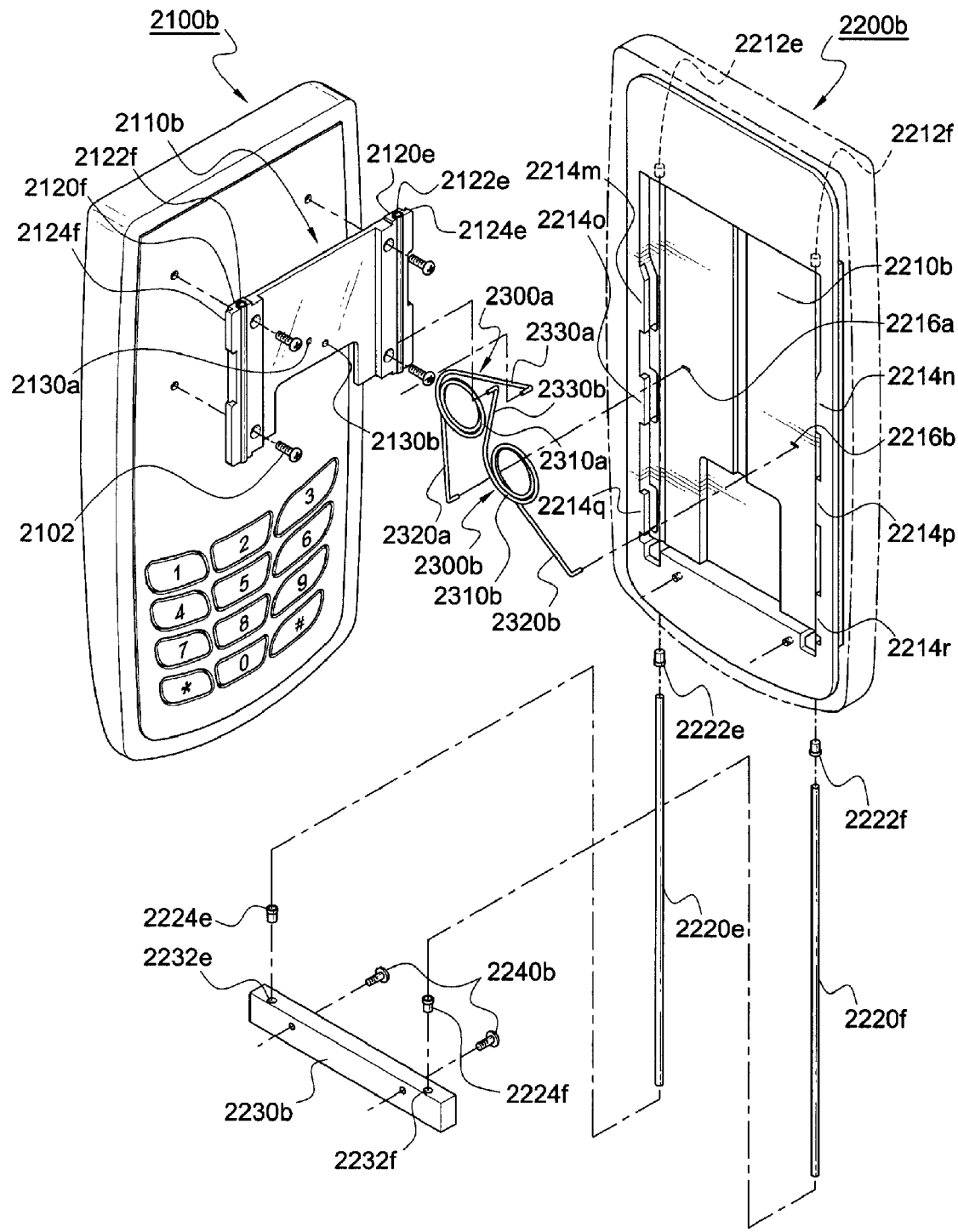
FIG. 58 is an exploded perspective view of another embodiment where a torsion spring is installed to obtain the operational force of the sliding mechanism.

FIG. 58 is an exploded perspective view of another embodiment where a torsion spring is installed to increase the operational force of the sliding mechanism. In this embodiment, a pair of torsion springs is added to the embodiment of FIGS. 53 to 55 to thereby enhance the driving force for the sliding movement.

Hereinafter, the same constitutional elements as in the previous embodiment will be briefly described since they have been previously explained in detail.

The cover 2200b is provided with a sliding space 2210b formed in the rear face thereof so as be depressed therein, and a pair of left and right coupling hands 2120e, 2120f are inserted into the sliding space 2210b. Here, a guide bar 2220e, 2220f provided in the left and right side of the sliding space 2210b is inserted into a guide hole 2122e, 2122f of the coupling hands 2120e, 2120f. In addition, a guide rail 2214m to 2214r provided in the left and right ends of the sliding space 2210b is engaged with the guide dam 2124e, 2124f. Then, by the sliding space 2210b in the rear face of the cover 2200b and the coupling hands 2120e and 2120f in the front face of the main body 2100b is defined a space, where a first and second torsion spring 2300a, 2300b is disposed.

The first torsion spring 2300a is comprised of a first coil 2310a wound generally in a circular form and two arms 2320a and 2330a extended from both ends of the first coil 2310a by a certain length. The end portion of the two arms 2320a, 2330a are bent approximately at a right angle. The end of one arm 2320a is pivotably inserted and fixed into a connection hole 2216a, which is formed in the left intermediate portion of the sliding space 2210b, and the end of the other arm 2330a is pivotably inserted and fixed into a connection hole 2130a, which is formed approximately in the center of the coupling hand 2120e, 2120f of the main body 2100b.

The second torsion spring 2300b is structured in the same way as in the first one, excepting the fixing position of the both ends thereof. The second torsion spring 2300b is comprised of a second coil 2310b and two arms 2320b and 2330b extended from both ends of the second coil 2310b by a certain length. The end portion of the two arms 2320b, 2330b are also bent. The end of one arm 2320b is pivotably inserted and fixed into a connection hole 2216b, which is formed in the right intermediate portion of the sliding space 2210b, and the end of the other arm 2330b is pivotably inserted and fixed into a connection hole 2130b, which is formed approximately in the center of the coupling hand 2120e, 2120f of the main body 2100b.

In the first torsion spring 2300a, the angle formed by the two arms 2320a and 2330a is preferred to be as wide as possible when no external force is exerted thereto. The second torsion spring 2300b is the same as above. It is because the wider the angle between the two arms is, the longer distance the slider structure can slide.

The configuration and operation of the first and second torsion springs 2300a and 2300b are previously described in detail and thus will not be repeated here.

Figure 59:
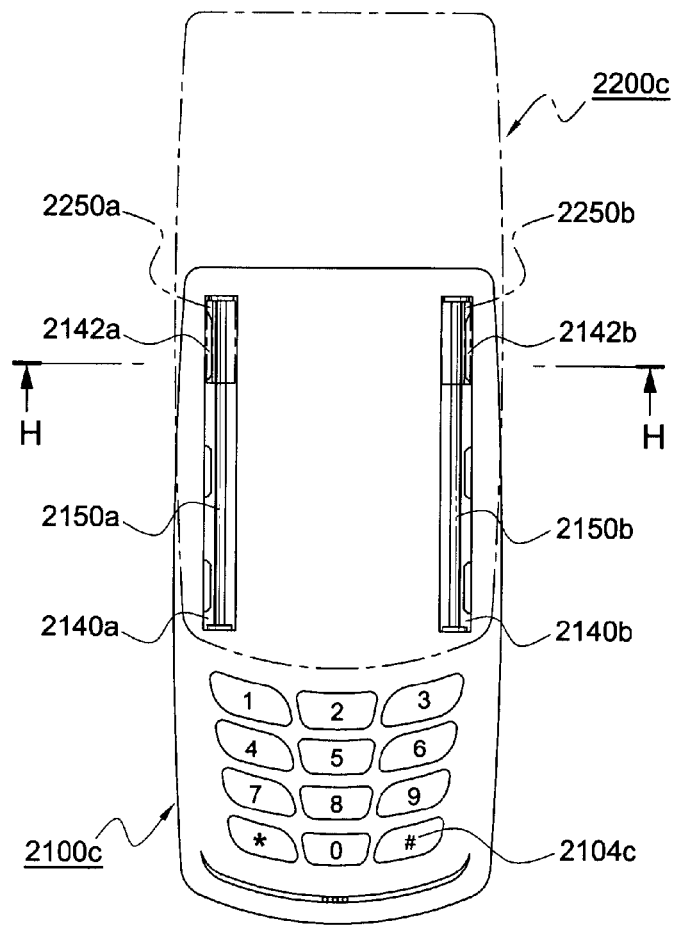
FIG. 59 is a font view showing an appliance integrated with a sliding mechanism apparatus according to another embodiment of the invention.
Figure 60:
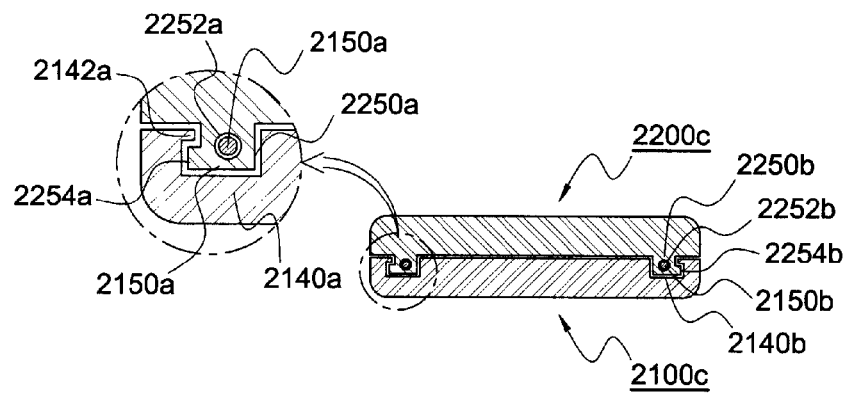
FIG. 60 is a cross-section taken along the line H-H in FIG. 59.

FIG. 59 is a font view showing an appliance integrated with a sliding mechanism apparatus according to another embodiment of the invention. FIG. 60 is a cross-section taken along the line H-H in FIG. 59. In this embodiment, dissimilar to the previous embodiment, the guide rail structure is formed in the main body of a cellular phone, and the slider structure is formed in the cover of the cellular phone.

As illustrated, in the front face of the main body 2100c, excepting the area where buttons 2104c are provided, a sliding space 2140a, 2140b depressed to have a "U" shaped cross-section is formed, in pairs, adjacent to the left and right edge thereof. A guide bar 2150a, 2150b is mounted in the sliding space 2140a, 2140b respectively, i.e., both upper and lower ends of the guide bar 2150a, 2150b are fixed in the same manner as in the previous embodiment, preferably in the center of the sliding space 2140a, 2140b. In the side wall of the sliding space 2140a, 2140b is provided a guide rail 2142a, 2142b protruded from the side wall near the front surface of the main body. This guide rail 2142a, 2142b may be formed only in an upper and lower portion of the sliding space 2140a, 2140b, or may be formed over the entire section of the sliding space 2140a, 2140b. In addition, the guide rail 2142a, 2142b may be formed in either the inward wall or the outward wall of the sliding space 2140a, 2140b, or may be formed in both of the inward and outward walls thereof.

In the rear face of the cover 2200c is formed a coupling hand 2250a, 2250b to be inserted into the left and right sliding space 2140a, 2140b in such a manner to be protruded in a position corresponding to the sliding spaces. Thus, the coupling hands 2250a and 2250b are inserted into the sliding space 2140a, 2140b respectively and slides along the sliding spaces 2140a, 2140b. When inserted into the sliding space 2140a, 2140b, the coupling hands are inserted into guide bars 2150a, 2150b and engaged with guide rails 2142a, 2142b, thereby providing an adequate retention force for stable sliding. For this purpose, the coupling hand 2250a, 2250b is provided with a guide hole 2252a, 2252b formed in a vertical (sliding) direction, and a guide dam 2254a, 2254b formed in an area corresponding to the guide rail 2142a, 2142b so as to be engaged therewith.

As described above, a pair of sliding spaces 2140a, 2140b and guide rails 2142a, 2142b may be formed integrally with the main body 2100c, i.e., integrally formed, in pairs, at the left and right side in the front face thereof, and the guide bar 2150a, 2150b may be mounted inside the sliding space 2140a, 2140b, thereby providing a guide rail structure. Similarly, the slider structure may be formed integrally with the cover 2200c. That is, a pair of left and right coupling hands 2250a and 2250b may be formed in the rear face of the cover 2200c so as to be protruded therefrom, and when molding, the guide hole 2252a, 2252b and the guide dam 2254a, 2254b may be made to be integrally formed with the coupling hand 2250a, 2250b. Thus, the assembling procedure can be simplified and the part price can be reduced. On the other hand, the above slider structure may be designed in such a manner that a plate-like slider member having a coupling hand at both sides thereof is fabricated and then attached to the rear face of the cover.

The above-described mechanism may be modified in various ways. Several examples are explained below, with reference to FIGS. 61 and 64.

Figure 61:
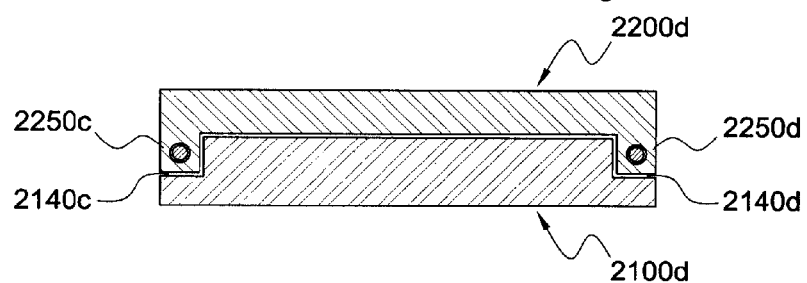
FIG. 61 is a cross-section of an appliance integrated with a sliding mechanism apparatus according to another embodiment of the invention.
Figure 62:
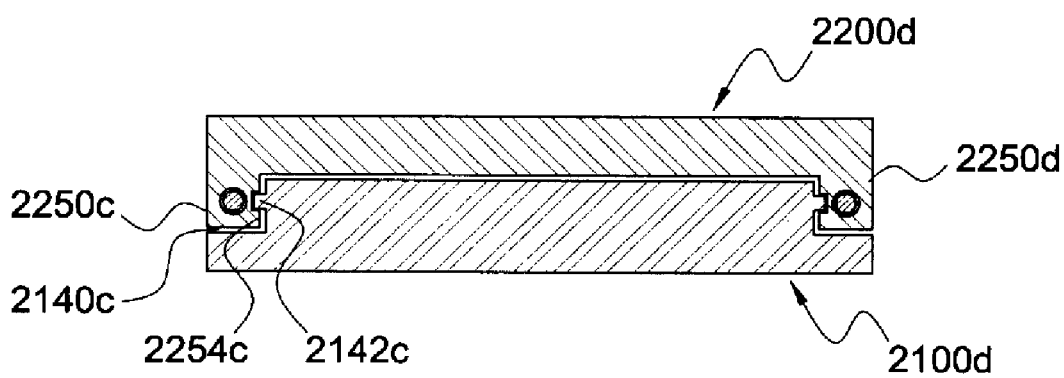
FIG. 62 is a cross section showing another embodiment of the guide rail and the guide groove in FIG. 61.
Figure 63:
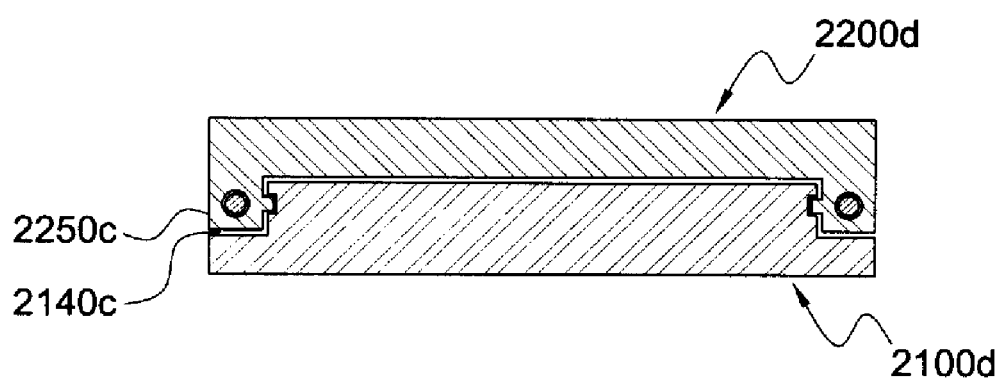
FIG. 63 is a cross-section showing yet another embodiment of the guide rail and the guide groove in FIG. 61.

FIG. 61 is a cross-section of an appliance integrated with a sliding mechanism apparatus according to another embodiment of the invention. FIG. 62 is a cross section showing another embodiment of the guide rail and the guide groove in FIG. 61. FIG. 63 is a cross-section showing yet another embodiment of the guide rail and the guide groove in FIG. 61.

These embodiments of FIGS. 61 to 63 are slightly modified from those illustrated in FIGS. 59 to 60. As shown in FIG. 61, the sliding space 2140c, 2140d are extended to the lateral face of the main body 2100d so as to be open thereto and have an "L" shape cross-section. The coupling hand 2250c, 2250d corresponding thereto is formed so as to be aligned with the lateral face of the cover 2200d and, at the same time, extended towards the rear face thereof. In this case, the lateral face of the main body 2100d and that of the cover 2200d are aligned with each other, but the pair of left and right coupling hands 2250c and 2250d constitutes part of the lateral face of the cover 2200d and encloses part of the lateral face of the main body 2100d. Here, as shown in FIG. 62, the guide rail 2142c may be formed in the outer side face of the main body 2100d, and the guide dam 2254c may be formed in the inner side face of the coupling hand 2250c, 2250d of the cover 2200d so as to face the guide rail 2142c and be engaged therewith. Alternatively, as shown in FIG. 63, the guide rail and dam structure may be constructed in the opposite manner to that of FIG. 62.

Figure 64:
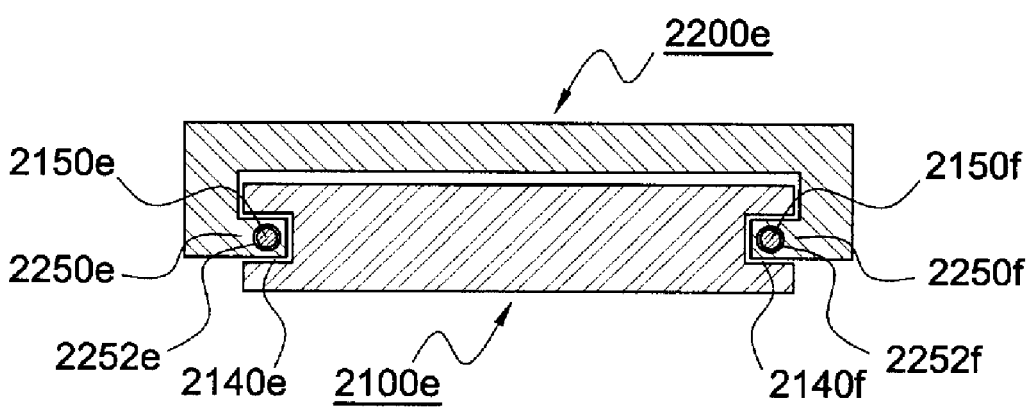
FIG. 64 is a cross-section of an appliance integrated with a sliding mechanism apparatus according to a further embodiment of the invention.

FIG. 64 is a cross-section of an appliance integrated with a sliding mechanism apparatus according to another embodiment of the invention.

As depicted, the sliding mechanism apparatus of the invention may be implemented in the lateral face of an appliance. More specifically, a sliding space 2140e, 2140f having a "⊐" shape cross section is formed in both lateral faces of the main body 2100e of a cellular phone and a guide bar 2150e, 2150f is mounted in the respective sliding spaces 2140e, 2140f by fixing both ends of the guide bar.

The cover 2200e is structured such that the area thereof is made to be larger than the main body 2100e, the lateral face thereof is extended in such a way to enclose the lateral face of the main body 2100e, and the left and right coupling hand 2250e, 2250f is bent inwardly so as to be inserted into the sliding space 2140e, 2140f respectively. In this way, the lateral face of the cover 2200e is bent to thereby form the coupling hands 2250e, 2250f, in which a guide hole 2252e, 2252f is formed. The guide hole 2252e, 2252f is inserted into the guide bar 2150e, 2150f respectively. Therefore, the coupling hand 2250e, 2250f slides along the guide bar 2150e, 2150f inserted into the guide hole 2252e, 2252f, and consequently the cover 2200e comes to slide on the main body 2100e.

At the same time, in the upper end or lower end of one side of both sides of the sliding spaces 2140e, 2140f may be formed a guide rail (not shown), or which may be formed over the entire sliding length. In addition, in the side face of the coupling hand 2250e, 2250f may be formed a guide dam (not shown) so as to correspond to the guide rail of the main body 2100e and be engaged therewith. Thus, along with the relative sliding of the guide bar 2150e, 2150f and the guide hole 2252e, 2252f, the guide dam is guided along the guide rail and thus the coupling hand 2250e, 2250f travels inside the sliding space 2140e, 2140f, thereby enabling a more stable sliding movement.

On the contrary, the sliding spaces 2140e and 2140f may be formed in the lateral face of the cover 2200e and the coupling hands 2250e and 2250f may be formed in the main body 2100e, in order to achieve the same operation and effects as above.

INDUSTRIAL APPLICABILITY

As described above, in the appliance integrated with a sliding mechanism apparatus according to the invention, a guide rail structure and a slider structure slidably engaged with the guide rail structure are integrally formed and coupled to the main body and the cover of the device so as to correspond to each other. Thus, the guide rail and slider structures formed of plate materials do not need to be fabricated, thereby reducing the number of parts to be assembled and thus simplifying the assembling procedures. Consequently, the sliding mechanism apparatus of the invention contributes to simplify the structure of appliances and improve the assembling efficiency therefor, which will result in a reduction in the manufacturing cost and time.

In the description, the sliding mechanism apparatus has been explained, illustrating a cellular phone, but not limited thereto. That is, the sliding mechanism apparatus may be applied to a variety of devices, as long as they are comprised of two components, which are desired to slidably open and close relative to each other.

Although the present invention has been described with reference to several preferred embodiments, the description is illustrative of the invention and not to be construed as limiting the invention. Various modifications and variations may occur to those skilled in the art without departing from the scope and spirit of the invention, as defined by the appended claims.

The invention claimed is:

1. An appliance integrated with a sliding mechanism apparatus, the appliance comprising:
   a) a main body including at least one coupling hand, the coupling hand being protruded frontward and having a guide hole in a sliding direction;
   b) a cover having a sliding space depressed in the rear face thereof so as to slidably accommodate the coupling hand of the main body, wherein the sliding space is provided with at least one guide bar, which is inserted into the guide hole of the coupling hand to thereby guide sliding of the main body; and
   wherein the coupling hand and the guide bar are formed, in pairs, in the left and right portion of the main body and the cover so as to correspond to each other; and
   wherein a fixing hole is formed in an upper and lower inner wall of the sliding space so as to be opened inwards of the sliding space, and both ends of the guide bar are inserted and fixed into the upper and lower fixing hole respectively.

2. The appliance according to claim 1 wherein the coupling hand and the guide bar are formed, in pairs, in the left and right portion of the main body and the cover so as to correspond to each other.

3. The appliance according to claim 2 wherein the pair of coupling hands is integrally formed near a left and right edge of a slider member having a plate-like form, and the slide member is fixed to a front face of the main body.

4. The appliance according to claim 2 wherein the pair of coupling hands is integrally formed, in pairs, in the left and right portion of the front face of the main body so as to be spaced apart from each other by a certain desired distance.

5. The appliance according to claim 2, wherein at least one torsion spring is disposed in the sliding space, and one end of the torsion spring is pivotably coupled to the main body and the other end thereof is pivotably coupled to the cover.

6. The appliance according to claim 1, wherein the cover is provided with a guide rail in the sliding space of the rear face thereof so as to be protruded along the sliding direction, and the main body is provided with a guide dam formed at a lateral face of the coupling hand thereof so as to be engaged with the guide rail.

7. The appliance according to claim 6 wherein the guide rail is comprised of a plurality of guide rail sections protruded at regular intervals along both lateral faces of the sliding space, and a spacing between the guide rail sections are configured such that the coupling hand can be inserted from the front side.

8. The appliance according to claim 1 wherein a rubber packing is interposed between the fixing hole and the guide bar.

9. The appliance according to claim 8 wherein either the upper fixing hole or the lower fixing hole is formed in a separate finishing plate, and the finishing plate is mounted in the upper portion or the lower portion of the sliding space.

10. An appliance integrated with a sliding mechanism apparatus, the device comprising:
    a) a main body having buttons and at least one straight sliding space in a sliding direction, the sliding space being formed in either the right or left side or both sides of the front face of the main body along the peripheral area thereof, a guide bar being mounted in the sliding space along the sliding direction; and
    b) a cover having at least one coupling hand in the rear face thereof, the coupling hand being received inside the sliding space of the main body and having a guide hole formed so as to be inserted into the guide bar, which thereby is slid and guided; and
    wherein the coupling hand and the guide bar are formed, in pairs, in the left and right portion of the main body and the cover so as to correspond to each other, and
    wherein a fixing hole is formed in an upper and lower inner wall of the sliding space so as to be opened inwards of the sliding space, and both ends of the guide bar are inserted and fixed into the upper and lower fixing hole respectively.

11. The appliance according to claim 10, wherein the sliding space is provided with a guide rail protruded along the sliding direction, and the coupling hand is provided with a guide dam formed so as to be engaged with the guide rail.

12. The appliance according to claim 10, wherein the sliding space is formed, in pairs, in the left and right side of the main body in such a way to be depressed to have a "U" shaped cross-section, and the coupling hand is formed, in pairs, at a position corresponding to the sliding space, the lateral face of the coupling hand being placed inwards of the lateral face of the cover.

13. The appliance according to claim 10 wherein the sliding space is formed, in pairs, in a left and right side of the main body in such a way to be depressed to have an "L" shaped cross-section and be opened to the left and right lateral face, and the coupling hand is formed, in pairs, at a position corresponding to the sliding space, the lateral face of the coupling hand being aligned with the lateral face of the cover.

14. A slider-type appliance having a main body and a cover to be opened and closed while sliding on the main body, wherein at least one straight sliding space is provided in a sliding direction along at least one of the left and right lateral faces of one of the main body and the cover, and a guide bar is installed in the sliding space along the sliding direction; and wherein the other one of the main body and the cover is received inside the sliding space while wrapping around a certain portion of the lateral face of the one of the main body and the cover, and at least one coupling hand is provided in the rear face thereof, the coupling hand having a guide hole formed so as to be inserted into the guide bar and slidably guided; and wherein the coupling hand and the guide bar are formed, in pairs, in the left and right portion of the main body and the cover so as to correspond to each other; and wherein a fixing hole is formed in an upper and lower inner wall of the sliding space so as to be opened inwards of the sliding space, and both ends of the guide bar are inserted and fixed into the upper and lower fixing hole respectively.

15. The appliance according to claim 14 wherein the sliding space is formed, in pairs, in the left and right thereof in such a way to be depressed so as to have a "⊏" shaped cross-section, and the coupling hand is formed, in pairs, in a position corresponding to the sliding space in such a way to enclose the pair of sliding spaces.

16. The appliance according to claim 15, wherein the sliding space is provided with a guide rail formed along the sliding direction, and the coupling hand is provided with a guide dam formed to be engaged with the guide rail.

* * * * *